United States Patent
Chalmers et al.

(10) Patent No.: US 12,551,799 B1
(45) Date of Patent: Feb. 17, 2026

(54) SYSTEMS AND METHODS FOR PROMOTING GAMES AND INCENTIVIZATION IN METAVERSES

(71) Applicant: United Services Automobile Association (USAA), San Antonio, TX (US)

(72) Inventors: Timothy Blair Chalmers, San Antonio, TX (US); Robert Lee Black, San Antonio, TX (US); Subhalakshmi Selvam, Allen, TX (US); Shayla Leigh Callis, Simi Valley, CA (US); Roberto Virgillio Jolliffe, San Antonio, TX (US); Timothy Benjamin Czerlinsky, Dallas, TX (US); Sean Michael Wayne Craig, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 253 days.

(21) Appl. No.: 18/305,829

(22) Filed: Apr. 24, 2023

(51) Int. Cl.
| *A63F 13/52* | (2014.01) |
| *A63F 13/35* | (2014.01) |
| *A63F 13/60* | (2014.01) |

(52) U.S. Cl.
CPC .............. *A63F 13/60* (2014.09); *A63F 13/35* (2014.09); *A63F 2300/8082* (2013.01)

(58) Field of Classification Search
CPC ... A63F 13/60; A63F 13/35; A63F 2300/8082
USPC .......................................................... 463/42
See application file for complete search history.

(56) References Cited

U.S. PATENT DOCUMENTS

| 9,836,798 | B2 * | 12/2017 | White | H04L 51/52 |
| 10,135,776 | B1 * | 11/2018 | Brown | H04L 63/08 |
| 12,400,025 | B1 * | 8/2025 | Chalmers | G06F 21/6245 |
| 2019/0121913 | A1 * | 4/2019 | Singh | G06F 16/9554 |
| 2019/0205727 | A1 * | 7/2019 | Lin | G06F 18/217 |
| 2021/0350488 | A1 * | 11/2021 | Hossain | G06F 21/604 |
| 2022/0184505 | A1 * | 6/2022 | Natali, Jr. | G06Q 40/06 |
| 2022/0197989 | A1 * | 6/2022 | Rakshit | G06F 3/017 |
| 2023/0316942 | A1 * | 10/2023 | Varas Cohen | G09B 5/06 434/308 |

FOREIGN PATENT DOCUMENTS

| KR | 20220002138 A | * | 1/2022 | |
| WO | WO-2023286019 A1 | * | 1/2023 | G06Q 30/0201 |

* cited by examiner

*Primary Examiner* — Michael A Cuff
(74) *Attorney, Agent, or Firm* — Fletcher Yoder P.C.

(57) ABSTRACT

Systems and methods for promoting games and incentivization to metaverse users. For example, a metaverse user affiliation system may be used to continuously monitor data relating to activity of a metaverse user with respect to one or more metaverses; to automatically generate game-related data to be presented to the metaverse user via the one or more metaverses based at least in part on the data relating to the activity of the metaverse user with respect to the one or more metaverses, wherein the game-related data relates to a virtual game being played by a plurality of metaverse users, and wherein the virtual game relates to personal behavior of the plurality of metaverse users with respect to the one or more metaverses; and to transmit the game-related data to one or more metaverse servers to enable presentation of the game-related data to the metaverse user via the one or more metaverses.

17 Claims, 37 Drawing Sheets

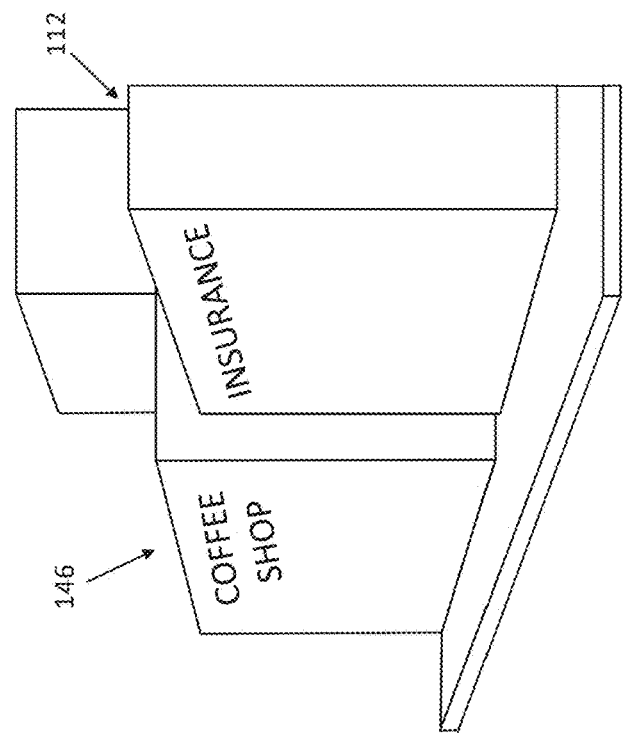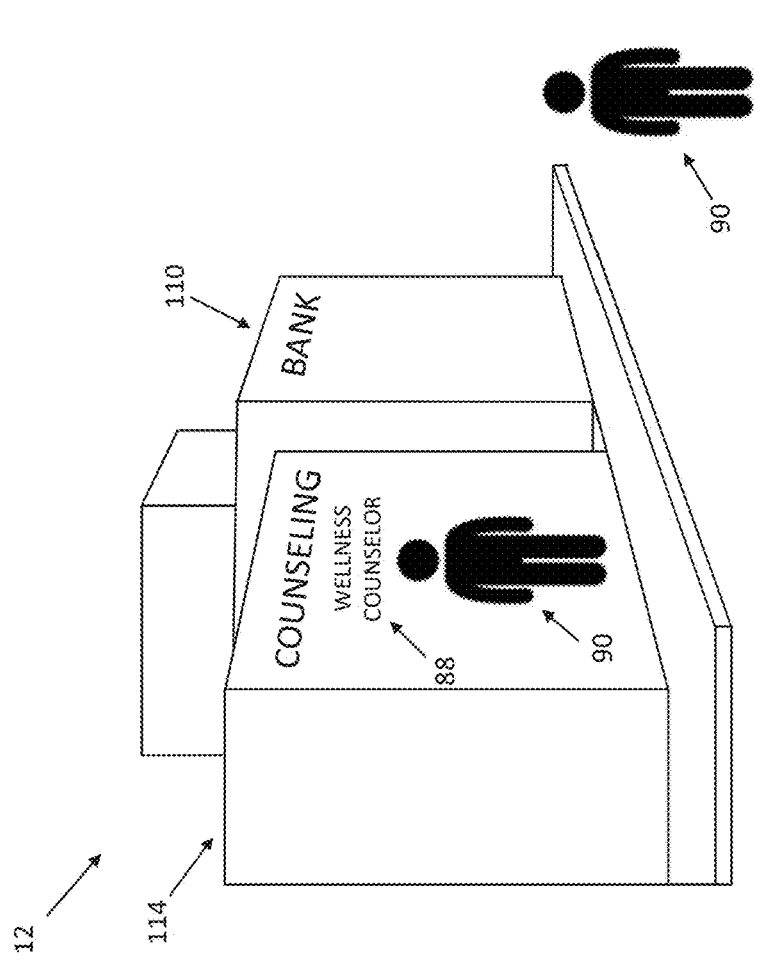
FIG. 29

SYSTEMS AND METHODS FOR PROMOTING GAMES AND INCENTIVIZATION IN METAVERSES

BACKGROUND

The present disclosure relates generally to systems and methods for promoting games and incentivization to metaverse users.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

People are interacting with metaverses much more often nowadays. As such, they are able to experience an ever-increasing number of virtual worlds. However, these metaverses tend to be relatively insular, only presenting information to metaverse users that is specifically relevant to the particular metaverse. In contrast, metaverse users may wish to have access to different types of information and functionalities when they are experiencing such metaverses. As such, there is a need to provide additional information and functionalities within metaverses, which is not necessarily related to the subject matter of the metaverses. For example, such additional information and functionalities may include varying types of game-based incentivization that might otherwise not be available to the metaverse users.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a method may include continuously monitoring, via a metaverse user affiliation system, data relating to activity of a metaverse user with respect to one or more metaverses. In addition, in certain embodiments, the method may include automatically generating, via the metaverse user affiliation system, game-related data to be presented to the metaverse user via the one or more metaverses based at least in part on the data relating to the activity of the metaverse user with respect to the one or more metaverses. In certain embodiments, the game-related data may relate to a virtual game being played by a plurality of metaverse users. In addition, in certain embodiments, the virtual game may relate to personal behavior of the plurality of metaverse users with respect to the one or more metaverses. In addition, in certain embodiments, the method may include transmitting, via the metaverse user affiliation system, the game-related data to one or more metaverse servers to enable presentation of the game-related data to the metaverse user via the one or more metaverses.

In certain embodiments, a metaverse user affiliation system includes one or more processors configured to execute instructions stored in memory. The instructions, when executed by the one or more processors, are configured to cause the metaverse user affiliation system to continuously monitor data relating to activity of a metaverse user with respect to one or more metaverses, to automatically generate game-related data to be presented to the metaverse user via the one or more metaverses based at least in part on the data relating to the activity of the metaverse user with respect to the one or more metaverses, and to transmit the game-related data to one or more metaverse servers to enable presentation of the game-related data to the metaverse user via the one or more metaverses. In certain embodiments, the game-related data may relate to a virtual game being played by a plurality of metaverse users. In addition, in certain embodiments, the virtual game may relate to personal behavior of the plurality of metaverse users with respect to the one or more metaverses.

In certain embodiments, a metaverse generation system includes a metaverse user affiliation system configured to continuously monitor data relating to activity of a metaverse user with respect to one or more metaverses. The metaverse user affiliation system is also configured to automatically generate game-related data to be presented to the metaverse user via the one or more metaverses based at least in part on the data relating to the activity of the metaverse user with respect to the one or more metaverses. In certain embodiments, the game-related data may relate to a virtual game being played by a plurality of metaverse users. In addition, in certain embodiments, the virtual game may relate to personal behavior of the plurality of metaverse users with respect to the one or more metaverses. The metaverse user affiliation system is further configured to transmit the game-related data to one or more metaverse servers to enable presentation of the game-related to the metaverse user via the one or more metaverses. The metaverse generation system also includes one or more metaverse servers configured to receive the game-related data. The one or more metaverse servers are also configured to present the game-related data to the metaverse user via the one or more metaverses.

BRIEF DESCRIPTION OF THE DRAWINGS

Various aspects of this disclosure may be better understood upon reading the following detailed description and upon reference to the drawings in which:

FIG. 29 illustrates a metaverse user being provided with virtual wellness education in a metaverse, in accordance with embodiments described herein;

DETAILED DESCRIPTION

Figure 1:
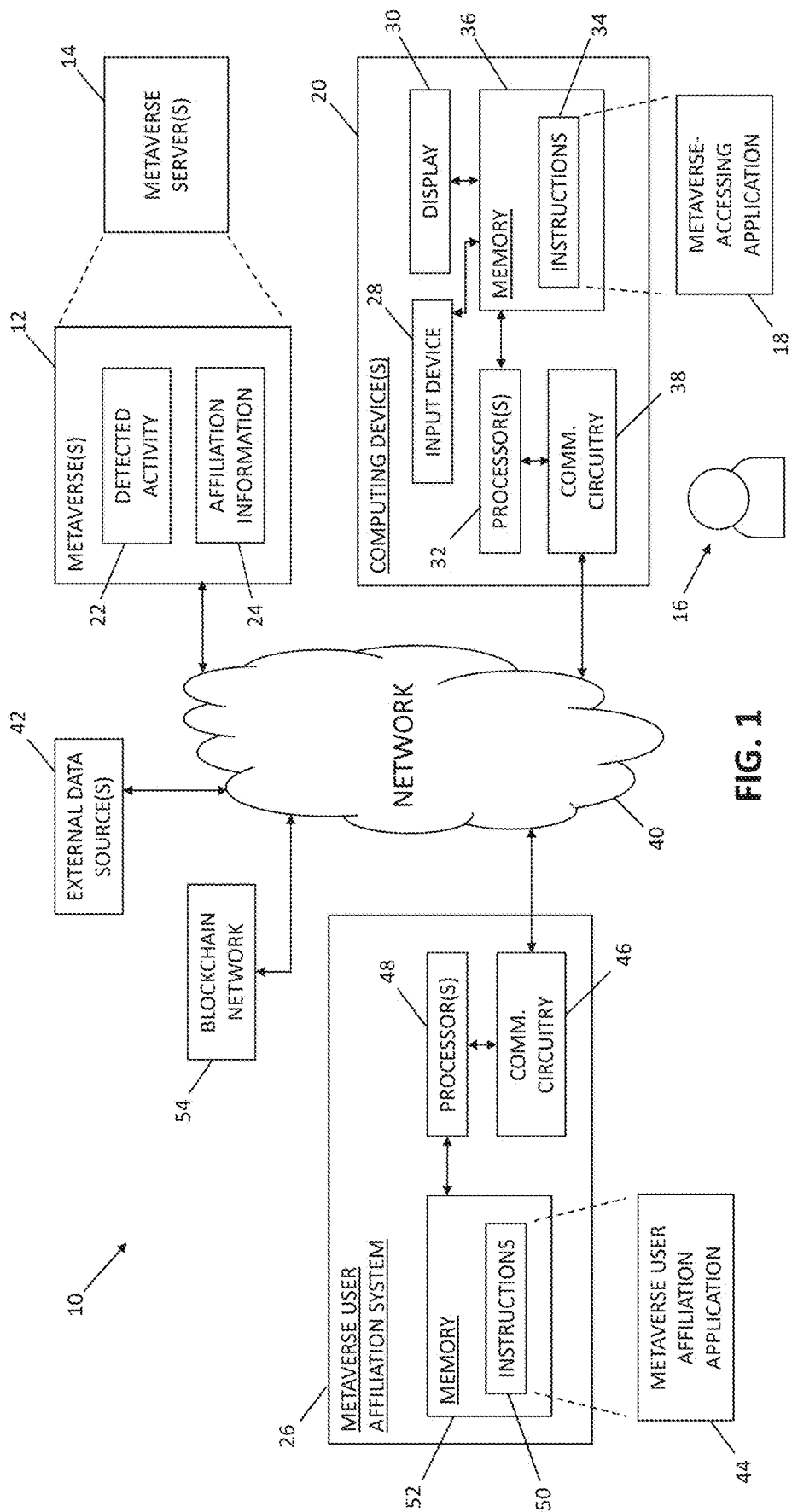
FIG. 1 is a schematic diagram of a metaverse generation system configured to enable interaction with metaverses, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, the term "application" refers to one or more computing modules, programs, processes, workloads, threads, and/or computing instructions executed by a computing system. Example embodiments of an application include software modules, software objects, software instances, and/or other types of executable code. As referred to herein, "user data" may include data associated with and/or identifying a user. In certain embodiments, user data may include data that relates to the actions performed by the user while utilizing a computing device, and/or with information associated with and/or identifying the user. For example, user data may include an indication of actions performed by the user (e.g., a website opened, cookies, an application accessed, a file downloaded, a link associated with a product that the user selected, a rating performed by the user such as an upvote or like, home or office temperature setting, preferred shows, light settings, activities, activity patterns, etc.), user identity data (e.g., IP address, email address, and the like), or demographic information of the user (e.g., age, race, location, and the like).

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy. but can be for a commercial, umbrella, and other insurance policies known by those skilled in the art.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions. In addition, as used herein, the term "autonomous" and "autonomously" refers to functions that are performed by computing devices or systems solely based on the functionality programmed into the computing devices or systems, for example, without requiring human intervention and/or input from external sources, such as external data sources. In addition, as used herein, the term "bot" refers to an autonomous program configured to autonomously run on a computer network to provide certain functionality and/or data for human users without the need for receiving active supervision from the human users. In other words, a bot may be capable of finding and/or learning certain functionality and/or data even when human users of the bot are not interacting with the bot and/or computer network on which the bot is running.

The present disclosure relates generally to systems and methods for presenting game-based incentivization in metaverses. Because of the relative anonymity of metaverses, certain opportunities are opened up for team challenges on previously sensitive topics such as financial information. For example, a game could be implemented to determine which team can make the most money in the stock market over a given time period, or which team can save the most money over a given time period. In certain situations, teams could be formed based on user affiliations, as described in greater detail herein. The challenges may be user-based, team-based, or combinations thereof, where the specific user and/or teams are ranked relative to each other to incentivize users to perform tasks that are beneficial not only for themselves, but also for an organization with which the users are associated. Before the existence of metaverses, it was relatively difficult to have teams and games based on relatively sensitive information, such as financial information, because of the concerns about privacy and data theft. In certain situations, users may be incentivized through virtual rewards and badges. In general, the systems and methods described herein incentivize users to spend time in metaverses and stay there once they are in there.

In certain situations, scavenger hunts may also be implemented to incentivize users to perform tasks that are beneficial not only for themselves, but also for an organization with which the users are associated. On non-limiting example could be to ask members to go to a certain number of locations in a metaverse and, perhaps, interact with the locations so that the members learn about services provided at the locations in the metaverses and/or actually interact with the services provided at the locations in the metaverses. After visiting and/or interacting with the services provided at the locations in the metaverses, the members may be asked questions and receive points or even receive discounts for certain services based on their answers.

In certain situations, discounts could be provided for a metaverse equivalent of "defensive driving" or wellness courses (e.g., virtual courses that simulate driving and either have artificial intelligence instructors or real-world instructors that are presented as avatars, and so forth). In addition, in certain situations, instructors may actually be family members (e.g., parents) that instruct other family members (e.g., children) in a relatively anonymous manner. In addition, in certain situations, incentives may be provided that transfer back into the real word. For example, in-game currencies may be converted to real-world rewards. In addition, in certain situations, members may earn loyalty points by interacting with services provided in metaverses.

In addition, in certain embodiments, the games that are established for metaverse users may relate to actively interacting with (or personally deploying) artificial intelligence (AI) avatars in metaverses, receiving virtual education of various types in metaverses, actively interacting with insurance-related information in metaverses, or some combination thereof. Each of the various types of information presented to the metaverse users may be interacted with by the metaverse users in a gamified manner such that the metaverse users are incentivized to not only increase interaction with the metaverses, but to enforce positive habits in the metaverse users, such as improved education relating to personal finance, insurance, daily budgeting, improved health, and so forth.

As such, the present disclosure also relates generally to systems and methods for actively interacting with (or personally deploying) AI avatars in metaverses. For example, in certain embodiments, an AI avatar may be a bot that is verified by a user associated with the bot. In certain embodiments, an AI avatar may be a conversational AI that is either programmed by an associated user or that self-learns (e.g., using artificial neural networks and other problem-solving techniques) by autonomously interacting with one or more metaverses even when the associated user is not interacting with the one or more metaverses. As but one non-limiting example, in certain embodiments, an AI avatar may be monetized such that the AI avatar may simulate the associated user in one or more metaverses when the associated user is not currently interacting with the one or more metaverses (e.g., when the associated user is asleep or simply logged off of the one or more metaverses). For example, if an associated user has a new product or service that they are trying to sell via a metaverse, the associated user could have an AI avatar that is programmed to autonomously present information relating to the product or service to other users of the metaverse when the associated user is not logged into the particular metaverse. In certain embodiments, the systems and methods described herein may be capable of verifying that a particular AI avatar is, indeed, associated with a particular metaverse user. Furthermore, in certain embodiments, the systems and methods described herein may be configured to provide visual information via a metaverse whether a particular AI avatar being presented via the metaverse is representative of an actual user of the metaverse or, rather, is representative of an AI bot associated an actual user.

The AI avatars described herein may be configured to perform various functions for associated users. For example, in certain embodiments, the AI avatars may be configured by their associated users to be deployed within various metaverses to find answers to questions for the associated users to, for example, not require the associated users to be on hold, waiting for the answers to the questions. In addition, in certain embodiments, the AI avatars may be configured by their associated users to be deployed within various metaverses to make arrangement for specific services to be provided to the associated users. As but one non-limiting example, in certain embodiments, an AI avatar may be used by an associated user to schedule servicing of an automobile at a repair shop. In certain embodiments, the AI avatar may go to a virtual repair shop in a metaverse and check on the status of the automobile servicing while the associated user is asleep or otherwise logged off of the metaverse. In addition, in certain embodiments, the AI avatars may be configured by their associated users to be deployed within various metaverses to autonomously provide services for an associated user to other metaverse users. As but one non-limiting example in certain embodiments, an AI avatar may be used to provide personal financial management services to other metaverse users.

In addition, in certain embodiments, AI avatars may be configured to provide other metaverse users with information relating to when the best times and places to meet the metaverse users associated with the AI avatars (e.g., to provide services to, or receive services from, the associated users), for example, while the associated metaverse users are asleep or otherwise logged off certain metaverses. For example, in certain embodiments, an AI avatar may be configured to let other metaverse users know that an associated metaverse user is usually available between the hours of 1-2 PM EST in a particular virtual area of a particular metaverse and/or that the associated metaverse user may be contacted (e.g., via a phone call, a text message, an email message, and so forth) in the real world between the hours of 1-2 PM EST using specific contact means (e.g., a phone number, an email address, a social media account, and so forth). As such, the AI avatars described herein may function as virtual assistants that take actions (e.g., sending and receiving requests for information, searching for and consolidating information, and so forth) for associated users in an autonomous manner, not requiring any active feedback from the associated users while performing the actions.

The use of anonymity in metaverses may be advantageous, for example in order to encourage metaverse users to provide information to questions that they might otherwise not feel comfortable answering. As such, this anonymity may be leveraged to provide virtual information to metaverse users that would not otherwise be possible, for example, in a real world setting. For example, people may be reluctant to talk about finance and how to get out of debt in an in-person or even virtual setting. With the anonymity of metaverses, where people are represented by an avatar, metaverse users may feel more comfortable. This could extend to a spectrum of different topics, including finance research, meetings about finance with advisors, what to consider if you're thinking about leaving the military including how to re-acclimate post-service (e.g., including checklists on mental health, physical health, and so forth), what to consider if you're about to be deployed, what to consider if you're thinking of retiring, and so forth.

As described above, the present disclosure also relates generally to systems and methods for providing virtual education in metaverses. For example, in certain embodiments, metaverse users may be virtually educated regarding financial literacy relating to the real-time simulation of how interest compounds over certain time periods, such as over 5 years, over 10 years, over 30 years, and so forth. In addition, in certain embodiments, when a metaverse user is next to a particular metaverse location, the metaverse user may be presented with how much daily spending at the metaverse location (or its analogous real-world location(s)) could grow over time with interest. For example, if a metaverse user gets close to a virtual coffee shop, the metaverse user may be presented with their average daily (or monthly, annual, and so forth) coffee spending, and shown how much their average daily (or monthly, annual, and so forth) coffee spending could grow over time with interest. As another example, a metaverse user could be virtually educated regarding the effect of the number of times a debit card has been has on credit score (e.g., credit management and/or debt management). In certain embodiments, three-dimensional (3D) videos may pop up to illustrate the consequences of certain actions (e.g., this will be the impact on your life if you stick with your current actions).

In certain embodiments, real human-to-human advice may be provided by a financial advisor avatar (e.g., that is controlled by a real-world user) to an avatar of a particular metaverse user to, for example, provide advice on investments and/or to illustrated potential financial outcomes that are personalized for the particular metaverse user. For example, the particular metaverse user may be presented with information relating to how much a financial account of theirs could grow if the metaverse user invested an additional $100 per month, based on actual numbers.

In certain embodiments, providing such information to metaverse users may become somewhat overwhelming (e.g., when the metaverse users are children). As such, in certain embodiments, the amount and/or frequency of such visual education may be limited, for example, based on settings that are selected by the respective metaverse users and/or guardians of the respective metaverse users.

In certain embodiments, polls may be used to receive real-time feedback on certain topics that are of particular interest to merchants or other entities in the metaverses, for example, potential products and/or services that might become available from the merchants or other entities, satisfaction with current products and/or services available from the merchants or other entities, satisfaction with storefront(s) associated with the merchants or other entities, and so forth. In certain embodiments, metaverse users may also be incentivized to participate in such polls, for example, by providing an extra percentage cash back on purchases of goods and/or services provided by the merchants or other entities.

In certain embodiments, the educational programs that are provided to a metaverse user may be tailored (e.g., customized) based on personal attributes of the metaverse user and/or affiliations of the metaverse user, as described in greater detail herein. For example, if a metaverse user likes video games, then video game language may be used to explain certain topics, or if a metaverse user likes sports, then sports language may be used to explain certain topics.

Many different types of educational programs may be implemented in metaverses in addition to the financial education described above. As but one non-limiting example, in certain embodiments, wellness education may be provided to metaverse users. For example, certain education programs may be focused on veterans, who may be more open on certain topics in a metaverse because of the anonymity it offers. Based on responses of a metaverse user to certain wellness education questions, mental health assistance (e.g., from a partner such as Wounded Warriors) could be provided in the virtual environment of a metaverse (e.g., to, hopefully, allow the metaverse user to be more open and receptive to help). In addition, in certain embodiments, certain virtual areas (e.g., virtual Zen gardens, virtual fish tanks, and so forth, for stress relief) within a metaverse may be presented to metaverse users when it is determined that the virtual areas may be beneficial to the metaverse users based on a determination of a wellness status of the metaverse users. In addition, in certain embodiments, virtual charitable contribution spots may be established in metaverses to enable other metaverse users to donate virtual currencies to certain organizations that are associated with improving particular types of wellness in metaverse users.

Another example of wellness education could be to provide reminders and warnings to metaverse users when it is determined that the metaverse users have spent too much time in one or more metaverses to make sure that the metaverse users stay relatively healthy. For example, a metaverse user may be prompted to take a break (e.g., to log off of a metaverse) and/or to spend time exercising after spending more than a certain number of hours of a certain time period. In addition, in certain embodiments, data from health tracking applications may also be used to determine whether a particular metaverse user is getting enough exercise, and so forth, and could be used to incentivize the particular metaverse user to exercise more often. In addition, in certain embodiments, if it is determined that certain metaverse users are not getting a lot of exercise, the metaverse users may be prompted to interact with real world corollaries of certain metaverse entities. Conversely, in certain embodiments, if it is determined that certain metaverse users are getting plenty of exercise, they may be provided with insurance policy discounts, which would further incentivize them to keep exercising regularly to stay in shape. In certain embodiments, metaverse users may be provided with visual indications of the effects of good/bad exercise habits.

In addition, in certain embodiments, insurance education may be provided to metaverse users. For example, certain education programs may be directed toward educating metaverse users on best practices relating to insurance, including specific benefits of insurance and certain precautions to take. In certain embodiments, the insurance education may be interactive, for example, where metaverse users interact with educational videos. In such a scenario, metaverse users may ask questions and have them answered by other metaverse users without having to leave their home or wait on hold on the phone.

In addition, in certain embodiments, metaverse users may be educated relating to an insurance claim process. For example, in certain embodiments, a virtual representation of a metaverse user's real world house may be displayed in a metaverse, and the metaverse user may be guided regarding the best way to protect certain items and belongings in the metaverse. In addition, in certain embodiments, a metaverse user may be educated on the best ways to insure digital objects, such as non-fungible tokens (NFTs) in metaverses.

In addition, in certain embodiments, employment opportunities may be presented to metaverse users as a specific type of virtual education (i.e., education of a job market). In certain embodiments, target demographics for users in a metaverse may be used to determine which employment opportunities to present to which metaverse users. In addition, certain initiatives may be implemented to aid certain demographics (e.g., veterans and other members of the military community) in finding employment opportunities. In certain embodiments, if a metaverse user is interested in a particular employment opportunity, a virtual interview could be initiated within the metaverse.

In addition, in certain embodiments, the virtual education described herein may be supplemented with improvements in accessibility for certain metaverse users. For example, in certain embodiments, for visually-challenged metaverse users, improvements in the quality of voice-overs and/or closed captioning may be implemented. In addition, in certain embodiments, eye movements in the real world of metaverse users may be used to cause virtual movements of their associated avatars in metaverses. In addition, in certain embodiments, voice recognition may be used to generate subtitles to be presented in one or more metaverses.

As described above, the present disclosure also relates generally to systems and methods for presenting insurance-related information to metaverse users. In particular, the embodiments described herein make it very easy for someone to find out how much insurance would be for someone shopping for certain (e.g., relatively expensive) personal property items, such as vehicles, in the virtual world. For example, a monthly insurance payment amount may be overlaid, along with a monthly payment price, of a vehicle when a metaverse user is viewing the vehicle in a metaverse. In certain embodiments, the overlaid insurance and payment amounts may be automatically calculated based on financial history data and/or insurance history data for the particular metaverse user. In addition, in certain embodiments, the overlaid insurance and payment amounts may be automatically calculated based on data received from an original equipment manufacturer (OEM) that produces the vehicle or from another company that is selling the vehicle. In addition, in certain embodiments, real-time feedback regarding the condition and/or insurability of the vehicle may also be provided. For example, in certain embodiments, information from a vehicle history report may be presented for the vehicle. In certain embodiments, for new vehicles, not only insurance rates, but also the cost to maintain the vehicle may be presented to a metaverse user as well. For example, a message that a particular vehicle may cost approximately $400 per year to maintain, as opposed to a more expensive vehicle options that costs approximately $2,000 per year to maintain, may be presented. In addition, in certain embodiments, estimated average annual gas costs may be presented based, for example, on the state in which a metaverse user lives, past history of gas usage by the metaverse user, and tracking of common destinations for the metaverse user.

In addition, in certain embodiments, a metaverse may be used to present information regarding other types of insurance products, such as motorcycle insurance, pet insurance, or insurance on any type of personal property. Furthermore, in certain embodiments, information relating to how insurance rates may change by bundling various different types of insurance may be presented. In addition, in certain embodiments, a metaverse may be used to present/share information to a metaverse user when they have certain insurance claims. For example, virtual information relating to a particular claim may be presented to the metaverse user in a way that was not possible before. As such, a metaverse may facilitate the interaction of information to process insurance claims in a timelier manner (e.g., digital claim filing, utilizing conversational artificial intelligence, and so forth). In addition, in certain embodiments, claims adjusters may be contacted in the metaverse, further facilitating the processing of insurance claims.

The present disclosure also relates generally to systems and methods for managing user affiliations in metaverses. In particular, in certain embodiments, a metaverse user affiliation system may be used to identify and promote affiliations between various users interacting with certain metaverses. For example, in certain embodiments, badges or other visual indications that may be displayed as being associated with an avatar of a user may be used to identify users within a metaverse who share a common interest or have a common background. For example, in certain embodiments, a particular badge may be associated with users that served in particular branches of military so that the users that are affiliated with this branch of the military may be able to easily identify other users within a metaverse so that they may more readily find and interact with each other. In certain embodiments, such badges or other visual indicators may only be visible in certain circumstances, for example, only to other users who share that particular affiliation. In addition, different various layers of privacy may be implemented. For example, some users (e.g., users that are associated with an organization that maintains or is otherwise directly associated with a particular metaverse, such as employees of an organization that hosts the particular metaverse) may be allowed to see certain information about users (e.g., years of service in the military, common geographical location(s), and so forth), whereas other users may not be able to see that same level of information.

Potential affiliations could include characteristics like whether the user is (or formerly was) a member of a particular branch of the military, whether the user is currently on active duty, whether the user works for a particular company, years of service of the user with the particular branch of the military and/or the particular company, year ranges that the user served with the particular branch of the military and/or the particular company, whether the user is a member of a particular religious organization, one or more educational institutions (e.g., high schools, universities, medical schools, law schools, vocational schools, and so forth) that the user attended, year ranges that the user attended the one or more educational institutions, whether the user graduated from the one or more educational institutions, net worth of the user, insurance information (e.g., insurance companies used, insurance policies with the insurance companies, and so forth) for the user, one or more hobbies of the user, the age of the user, the gender of the user, the race of the user, the marital status of the user, geographical information for the user (e.g., country, state, city, and so forth), one or more physical disabilities of the user, and so forth. It will be appreciated that some of these characteristics may be of the type that users may not offer to the general public, but which could be very important to a particular user such that they would like to know when other users with similar affiliations are in there vicinity within particular metaverses such that they may interact with the other users. In addition, the particular user may be interested in learning what other types of services, experiences, and so forth, other users with similar affiliations have spent a lot of time interacting with in certain metaverses. As such, the embodiments described herein may enable the sharing of information between users with similar affiliations that might otherwise be impossible (or, at least very difficult, in a context other than a metaverse).

To that end, in certain embodiments, users may manually tag certain affiliations as having different privacy levels, for example, public affiliations (e.g., where all other metaverse users can see the affiliations for a particular user), private affiliations (e.g., where no other metaverse users can see the affiliations for a particular user), similar affiliations (e.g., where other metaverse users that share the affiliations can see the affiliations for a particular user), and other privacy levels. Furthermore, in certain embodiments, information relating to detected metaverse activity of other users having similar affiliations may be freely viewable (albeit, anonymously) even if the particular users associated with the detected metaverse activity do not wish for their particular identities to be known. As such, the embodiments described herein enable a greater amount of affiliation-related information to be distributed even if the users sharing the affiliations do not know each other's particular identities. Indeed, in certain embodiments, the detected metaverse activity may be somewhat general in nature, such as detection that users that used to be with a particular branch in the military tend to spend an inordinate amount of time in a particular area of a metaverse. Such information may be beneficial to a user sharing that affiliation, despite the fact that they are presented with this information without knowing any users for which the metaverse activity was collected.

In addition, in certain embodiments, alerts may be provided to users when there are other users who share affiliations are in relative proximity within a particular metaverse. For example, if a particular user is a former Marine and there is another user that is also a former Marine within 5 feet, an alert may be provided. It will be appreciated that every user may have many different characteristics that define them. As such, getting these different badges or other visual indications to show up as part of their avatars may take up a lot of space. As such, in certain embodiments, to minimize the display of such badges and other visual indications, only relevant badges or other visual indications may be visible to other users, for example, those that are indicative of shared affiliations between the users. In addition, in certain embodiments, certain affiliation information may be blurred out under certain circumstances.

In addition, in certain embodiments, an authentication component could be utilized to ensure that all affiliations noted by users are correct. For example, if a particular user says they are a former Marine, the system may authenticate that the user is, indeed, a former Marine. Furthermore, in certain embodiments, the system may analyze detected metaverse activity for users having similar affiliations to determine whether these affiliated users are visiting similar areas of metaverses, interacting with similar services provided within the metaverses, and so forth.

In addition, in certain embodiments, the system may use proximity of users in a metaverse to represent an affiliation. For example, example, users associated with a particular organization may primarily be found in particular areas of a metaverse such that other users may see these affiliated users as the particular organization. Indeed, in certain embodiments, the affiliated users associated with the particular organization may be visualized as being located within different buildings within the metaverse (e.g., as separate but related entities) that, for example, relate to different services provided by the organization. In addition, in certain embodiments, external partners associated with the particular organization may also be represented in the metaverse.

In addition, in certain embodiments, a virtual complex may be represented in a metaverse to show different subdivisions within the particular organization to which certain users are affiliated. For example, in certain embodiments, a virtual bank may be represented as a banking subdivision of the particular organization, a virtual insurance office may be represented as an insurance subdivision of the particular organization, or a virtual counseling office may be represented as a counseling subdivision of the particular organization, and so forth, as separate virtual buildings associated with the particular organization and represented in the metaverse. Furthermore, in certain embodiments, external partners associated with the particular organization may also have virtual buildings represented in close proximity to the virtual complex of the particular organization. In addition, in certain embodiments, fast travel points may be represented virtually with the metaverse to enable users to fast travel to certain locations associated with the particular organization (e.g., through virtual portals).

In addition, in certain embodiments, different levels of hierarchy of the particular organization may be virtually represented in the metaverse (e.g., which divisions certain users are affiliated with, where in the real world geographically the users are actually located, and so forth). In addition, in certain embodiments, the virtual world (e.g., the virtual complex associated with the particular organization) may be changed based on the context of an interest of the user interacting with the particular organization. For example, the virtual world could be modified such that only subdivisions of interest to the user are virtually represented in the virtual world.

In addition, in certain embodiments, an incentivization component may be utilized wherein users could be paid money (or otherwise rewarded, for example, by acquiring points) to wear virtual apparel in the metaverse as advertising. In other embodiments, only users that have performed certain tasks (e.g., taking training classes) may be rewarded with certain virtual apparel. Furthermore, in certain embodiments, certain virtual apparel or virtual badges may be awarded to certain users based on long time service (e.g., receiving a virtual 50-year sticker for 50 years of service with the particular organization). In addition, in certain embodiments, users may be rewarded with real-world rewards based on points rewarded in the metaverse.

FIG. 1 is a schematic diagram of a metaverse generation system 10 configured to enable interaction with various metaverses 12 that are maintained by various metaverse-providing entities, for example, via metaverse servers 14 that enable users 16 to interact with the metaverses 12 via metaverse-accessing applications 18 executable via computing devices 20 used by the users 16. In certain embodiments, the computing devices 20 may include any computing devices 20 configured to execute the metaverse-accessing applications 18 including, but not limited to, smart phones, computing tablets, personal computers (PCs), laptop computers, wearable computing devices, and so forth. In certain embodiments, each computing device 20 may be registered with the metaverses 12 by, for example, registering the computing device 20 (e.g., using a universally unique identifier (UUID), media access control (MAC) address, and so forth) with a user account (e.g., using a unique user identification number) associated with a particular user 16. Therefore, interaction with the metaverse-accessing application 18 by a particular user 16 via a particular computing device 20 may be automatically associated with that user 16.

For example, as described in greater detail herein, certain detected activity 22 of a particular user 16 within one or more metaverses 12 may be continuously monitored for the purpose of determining affiliations with other users 16 that also interact with the one or more metaverses 12 such that affiliation information 24 may be provided to the particular user 16 while they are interacting with the one or more metaverses 12. In certain embodiments, the detected activity 22 may include the users 16 themselves manually entering data relating to characteristics of the users (e.g., by using one or more computing devices 20) or may include activity of the users 16 within one or more metaverses 12, which may be automatically tracked and transmitted to a metaverse user affiliation system 26, which may in turn determine affiliations between users 16, and provide the users 16 with affiliation information 24 relating to these determined affiliations, as described in greater detail herein.

The detected activity 22 of a particular user 16 with respect to particular metaverses 12 (e.g., which may be monitored by a metaverse-accessing application 18 being used by the particular user 16, by a metaverse 12 being accessed using the metaverse-accessing application 18 being used by the particular user 16, by a metaverse server 14 hosting the metaverse 12 being accessed using the metaverse-accessing application 18 being used by the particular user 16, or some combination thereof) may be transmitted to the metaverse user affiliation system 26, which uses the detected activity 22 to automatically present affiliation information 24 relating to certain user affiliations between the particular user 16 and other users 16 of the particular metaverses 12, as described in greater detail herein. For example, as will be appreciated, the metaverse-accessing application 18 being executed on a computing device 20 associated with the user 16 may be accessed by the user 16 to access a particular metaverse 12. In addition, the user 16 may initiate certain activity 22 with respect to the particular metaverse 12, as described in greater detail herein, via interaction with the metaverse-accessing application 18 using the computing device 20. For example, manipulation of one or more input devices 28 (e.g., keyboards, mice, buttons, touch screens, and so forth) of the computing devices 20 may enable the users 16 to interact with the metaverse-accessing application 18, which may be displayed on one or more displays 30 (e.g., light emitting diode (LED) displays, organic LED (OLED) displays, and so forth) of the computing devices 20. In certain embodiments, the users 16 may login to particular computing devices 20 such that user identifiers (e.g., user identification numbers) may be tracked to associate detected activity 22 with the particular user 16.

As illustrated in FIG. 1, in certain embodiments, the computing devices 20 may also include processing circuitry such as one or more processors 32 configured to execute instructions 34 stored in memory media 36 of the respective computing device 20, wherein the instructions 34, when executed by the one or more processors 32, enable the respective computing device 20 to track activity 22 (e.g., interaction with the metaverse-accessing application 18, as well as other web pages, applications, and so forth) of a user 16 using the respective computing device 20, as described in greater detail herein.

In certain embodiments, the one or more processors 32 of the computing devices 20 may be any suitable type of computer processors or microprocessors capable of executing computer-executable code. In certain embodiments, the memory media 36 of the computing devices 20 may be any suitable articles of manufacture that can serve as media to store processor-executable code, data, or the like. These articles of manufacture may represent computer-readable media (e.g., any suitable form of memory or storage) that may store processor-executable code (e.g., the instructions 34) executed by the one or more processors 32 to perform the presently disclosed techniques. In certain embodiments, the memory media 36 of the computing devices 20 may represent tangible, non-transitory computer-readable media (e.g., any suitable form of memory or storage) that may store the processor-executable code used by the one or more processors 32 to perform various techniques described herein. It should be noted that non-transitory merely indicates that the media is tangible and not a signal. It should be noted that the components described above with regard to the computing devices 20 are exemplary components, and the computing devices 20 may include additional or fewer components in certain embodiments.

In addition, in certain embodiments, the computing devices 20 may also include communication circuitry 38 configured to facilitate communication between the respective computing device 20 and the metaverse user affiliation system 26 (as well as with the metaverse server(s) 14) to facilitate interaction of the respective computing device 20 with the metaverses 12 described herein. For example, in certain embodiments, the computing devices 20 may transmit data relating to detected activity 22 with respect to metaverses 12 to the metaverse server(s) 14 and/or the metaverse user affiliation system 26 to facilitate interaction of users 16 associated with the computing devices 20 with the metaverses 12, as described in greater detail herein. In certain embodiments, the communication circuitry 38 may facilitate communications using Wi-Fi, near field communication, Bluetooth, Zigbee, radio frequency identification (RFID) tags and/or readers, an embedded wireless module, and/or another suitable wired or wireless communication network 40.

In addition, in certain embodiments, as described in greater detail herein, external data sources 42 may be used to collect data relating to users 16 that may be used by the metaverse server(s) 14 and/or the metaverse user affiliation system 26 to determine what affiliation information 24 to present to the users 16 via the metaverses 12, as described in greater detail herein. In certain embodiments, the external data sources 42 may include, but are not limited to, merchants, financial institutions, rideshare apps, rental car companies, travel agencies, airlines, hospitality organizations, and so forth, which may be interacted with by the users 16, for example, either via applications (e.g., the metaverse-accessing application 18 or other applications) being executed on computing devices 20 associated with the user 16 or in person. As will be appreciated, commercial activity 22 with these external data sources 42 may also be communicated to the metaverse server(s) 14 and/or the metaverse user affiliation system 26 via the communication network 40.

In response to receiving data relating to detected activity 22 of a user 16 from one or more computing devices 20, metaverse servers 14, and/or external data sources 42. the metaverse user affiliation system 26 may utilize a metaverse user affiliation application 44 to analyze the data relating to the detected activity 22 to automatically present affiliation information 24 relating to certain user affiliations between the user 16 and other users 16 of the particular metaverses 12, as described in greater detail herein. In addition, in certain embodiments, the metaverse user affiliation system 26 may be configured to facilitate the presentation of game-based incentivization that, in certain embodiments, may be at least partially based on the detected activity 22.

In certain embodiments, the metaverse user affiliation system 26 may include communication circuitry 46 configured to facilitate communication between the metaverse user affiliation system 26 and the computing devices 20, the metaverse servers 14, and/or the external data sources 42, as described in greater detail herein. For example, as described in greater detail herein, in certain embodiments, the metaverse user affiliation system 26 may receive data relating to activity 22 of users 16 from one or more computing devices 20, one or more metaverse servers 14, and/or one or more external data sources 42 via the communication network 40, and may automatically present affiliation information 24 relating to certain user affiliations between particular users 16 of the particular metaverses 12, as described in greater detail herein. In particular, the metaverse user affiliation system 26 may transmit the affiliation information 24 to the metaverse servers 14 to enable the metaverse servers 14 to present the affiliation information 24 via the metaverses 12 maintained by the metaverse servers 14. Furthermore, in certain embodiments, the specific data relating to the activity 22 of the users 16 that is received by the metaverse user affiliation system 26 and/or the specific data relating to the affiliation information 24 that is transmitted by the metaverse user affiliation system 26 may be converted by the metaverse user affiliation system 26 into certain data types and data protocols that facilitate both efficient storing of the data, as well as streamlined data processing (e.g., by converting certain otherwise incompatible data types so that they can be more easily processed and analyzed, for example, by the metaverse servers 14 described herein). In certain embodiments, the communication circuitry 46 may facilitate communications using Wi-Fi, near field communication, Bluetooth, Zigbee, radio frequency identification (RFID) tags and/or readers, an embedded wireless module, and/or another suitable wired or wireless communication network 40.

As illustrated in FIG. 1, in certain embodiments, the metaverse user affiliation system 26 may include other processing circuitry such as one or more processors 48 configured to execute instructions 50 stored in memory media 52 of the metaverse user affiliation system 26, wherein the instructions 50, when executed by the one or more processors 48, enable the metaverse user affiliation system 26 to perform the functions described in greater detail herein. In certain embodiments, the one or more processors 48 of the metaverse user affiliation system 26 may be any suitable type of computer processors or microprocessors capable of executing computer-executable code. In certain embodiments, the memory media 52 of the metaverse user affiliation system 26 may be any suitable articles of manufacture that can serve as media to store processor-executable code, data, or the like. These articles of manufacture may represent computer-readable media (e.g., any suitable form of memory or storage) that may store processor-executable code (e.g., the instructions 50) executed by the one or more processors 48 to perform the presently disclosed techniques.

In certain embodiments, the memory media 52 of the metaverse user affiliation system 26 may also be used to store data relating to detected activity 22 of users 16, as described in greater detail herein. In certain embodiments, the memory media 52 of the metaverse user affiliation system 26 may represent tangible, non-transitory computer-readable media (e.g., any suitable form of memory or storage) that may store the processor-executable code used by the one or more processors 48 to perform various techniques described herein. It should be noted that non-transitory merely indicates that the media is tangible and not a signal. It should be noted that the components described above with regard to the metaverse user affiliation system 26 are exemplary components, and the metaverse user affiliation system 26 may include additional or fewer components in certain embodiments.

In addition, in certain embodiments, the metaverse user affiliation system 26 may function as an execution layer (e.g., as plug-in software) that any and all software applications interacting with the metaverses 12 may utilize to enable the metaverse user affiliation system 26 to capture metaverse activity 22 and determine affiliation information 24 to transmit back to the metaverses 12, as described in greater detail herein. Indeed, in certain embodiments, the metaverse user affiliation system 26 may be deployed as a cloud-based metaverse user affiliation network to facilitate decentralized management of the metaverse user affiliations described herein.

As such, a metaverse-accessing application 18 being executed on a computing device 20 associated with a particular user 16, various metaverse servers 14, and/or external data sources 42 may monitor activity 22 of the particular user 16, and the data relating to this monitored activity 22 may be used by the metaverse user affiliation system 26 to automatically present affiliation information 24 relating to certain user affiliations between the particular user 16 and other users 16 of the particular metaverses 12, as well as presenting game-based incentivization to the particular user 16, as described in greater detail herein. For example, in certain embodiments, the data relating to the monitored activity 22 of the user 16 may include interactions that the user 16 has performed in a particular metaverse 12 with which the user 16 is currently interacting via the metaverse-accessing application 18. In addition, in certain embodiments, the data relating to the monitored activity 22 of the user 16 may include external data from the external data sources 42 relating to prior activity 22 of the user 16, which may be relevant to the generation and presentation of specific affiliations for the particular user within the particular metaverse 12, as well as being relevant to the deployment of AI avatars associated with the particular user 16 within the particular metaverse 12, in certain embodiments.

It will be appreciated that the metaverse data transmitted by the metaverse user affiliation system 26 to metaverse servers 14 to enable the metaverse servers 14 to present the metaverse data in the metaverses 12 maintained by the metaverse servers 14 may include specific virtual objects to be presented, specific locations within the metaverses 12 at which the virtual objects should be presented, specific time periods (e.g., special events) during which the virtual objects should be presented, specific data to be presented in connection with the virtual objects, specific interactions that should be enabled relative to the virtual objects, and so forth. In addition, the metaverse data that is transmitted to metaverse servers 14 by the metaverse user affiliation system 26 may be determined in accordance to rules set by the metaverse servers 14. For example, certain metaverses 12 may be allowed by the metaverse servers 14 to locate virtual objects only in certain virtual areas within the metaverses 12 maintained by the metaverse servers 14. As such, the metaverse data transmitted by the metaverse user affiliation system 26 must comply with these restrictions.

Figure 2:
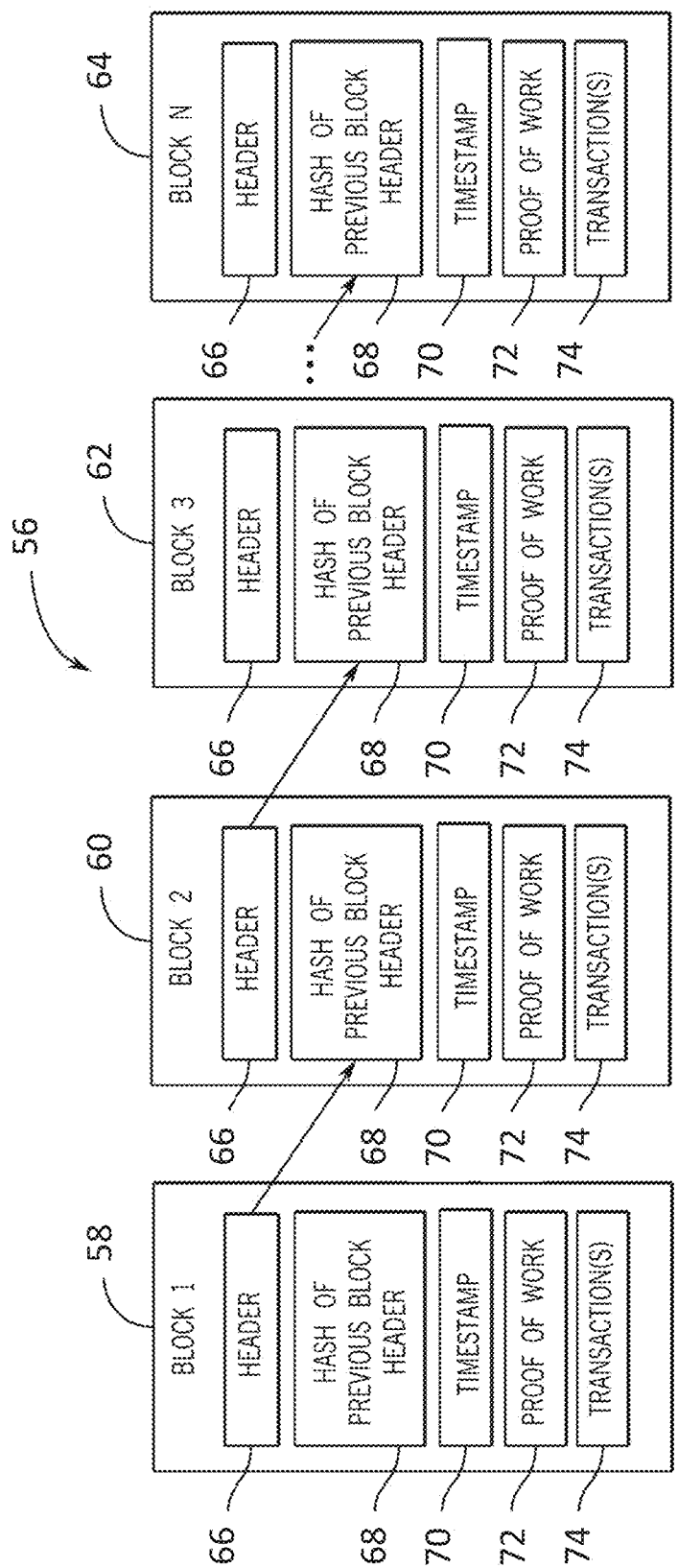
FIG. 2 illustrates a block diagram of a blockchain of a blockchain network of FIG. 1, in accordance with embodiments described herein.

As described in greater detail herein, any and all of the data received, generated, and/or transmitted by the metaverse user affiliation system 26 described herein may be stored by the metaverse user affiliation system 26 in a distributed ledger (e.g., a blockchain network) 54. FIG. 2 illustrates a block diagram of a blockchain 56 of the blockchain network 54 of FIG. 1. In the illustrated embodiment, the blockchain 56 is illustrated as having multiple blocks 58, 60, 62, and 64. The block 58 (first block in the blockchain 56) may have been created and allocated as a special starting block. The block 58 may include a unique header 66 uniquely identifying the block 58 from other blocks in the blockchain 56. Because the block 58 is the first block in the blockchain 56, a hash of a previous block header 66 may be set to zero. A timestamp 70 may include the date of creation for the block 58, and a proof of work section 72 may include certain "work" that proves that a "miner" has performed work suitable for the creation of the block 58 and/or to verify transactions in the blockchain 56. The work section 72 may vary based on a protocol used to create the blockchain 56. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 56, and so on, down the tree. In other words, there is no way to create a fake value that would hash to an expected Merkle tree value (e.g., value stored in work section 72 of the block 58), thus creating a single value that proves the integrity of all of the transactions under it. Transactions, such as transactions relating to interaction with the metaverses 12 described herein, may be stored in a transactions section 74. Data related to the particular transaction may also be stored in section 74 (or in another section).

When a new block is created, the block will receive a new header 66 uniquely identifying the new block. As described in greater detail herein, a peer-to-peer network may include multiple "miners" that add blocks to the blockchain 56 based on the blockchain protocol. In general, multiple miners validate transactions 74 that are to be added to a block, and compete (e.g., perform computing work, as introduced above) to have their respective block added to the blockchain 56. Validation of transactions includes verifying digital signatures associated with respective transactions 74. For a block to be added to the blockchain 56, a miner must demonstrate a proof of work before their proposed block of transactions is accepted by the peer-to-peer network, and before the block is added to the blockchain 56. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 68) in the blockchain 56, details of the transaction(s) 74 that are to be included in the to-be-created block, and a "nonce" value (e.g., a random number used only once).

Multiple nodes may compete to hash a set of transactions, and to provide the next block that is to be added to the blockchain 56. In certain embodiments, the blockchain protocol may provide a threshold hash to qualify a block to be added to the blockchain 56. For example, the threshold hash may include a predefined number of zeros (Os) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 56. Each miner provides the reference to the previous (most recent) block in the blockchain 56, details of the transaction(s) 74 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 56. Consequently, the respective miner's block is broadcast across the peer-to-peer network. At this point, all other miners cease work (because one miner was already successful), and all copies of the blockchain 56 are updated across the peer-to-peer network to append the block to the blockchain 56. Each miner may produce hundreds of thousands (or more) of hash values, before any one miner provides a qualifying hash value (e.g., at least the first four characters of the hash value are each zero).

It is to be noted that any computing device 20 may be miners. Accordingly, for example, as new data is created, new blocks may be added to the blockchain 56, including blocks 58, 60, 62, and 64. Indeed, the blockchain 56 may continue to grow, storing new data as it becomes available. Because of the distributed nature of the peer-to-peer network created via the blockchain network 54, each node may include copies of the blockchain 56 and share copies of the blockchain 56 as new peers enter the peer-to-peer network. Each copy of the blockchain 56 may include verified information for all or substantially all of the data tracked by the blockchain network 54. The information is secure, immutable, and more efficiently tracked as new added gets added via the blockchain network 54.

Figure 3:
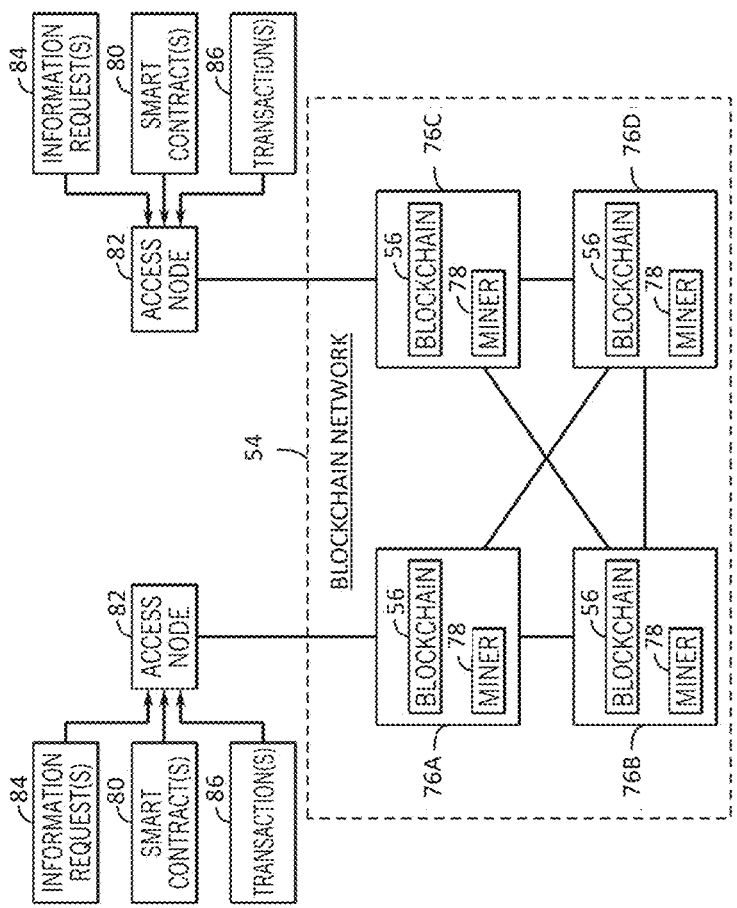
FIG. 3 illustrates a block diagram of a portion of the metaverse generation system of FIG. 1, which may be used to manage data relating to user affiliations within metaverses using a distributed ledger (e.g., blockchain network), in accordance with embodiments described herein.

FIG. 3 illustrates a portion of the metaverse generation system 10 of FIG. 1, which may be used to manage data relating to metaverses 12 using a distributed ledger (e.g., blockchain network) 54, in accordance with embodiments described herein. As described herein, the blockchain network 54 may be formed by several blockchain nodes, such as blockchain nodes 76A, 76B, 76C, and 76D, which may be implemented by a dedicated server or computer device, or may be implemented as a virtual machine in a shared computer system. Each blockchain node 76A-D may have in its memory a replicate of the blockchain 56. Each blockchain node 76A-D may also have a miner 78, an application that may verify the integrity of the blockchain 56, and may also perform operations and/or transactions using smart contracts 80 associated with the blockchain 56. As described herein, the blockchain 56 is a replicated data structure that may have its consistency and integrity preserved by a consensus mechanism performed by the miners 78.

Users may interact with the blockchain network 54 via an access node 82. For example, users may request, through the access node 82, the recordation and/or processing of data (e.g., using a smart contract 80), such as an information request 84 (e.g., a request for the state of a smart contract 80), or a transaction request 86 (e.g., a request for a change in a state of the smart contract 80) to the blockchain 56. The smart contracts 80, information requests 84, and/or transaction requests 86 allow users to record certain data relating to interaction with the metaverses 12 described herein. Each access node 82 may be implemented by a computer terminal coupled to the blockchain network 54.

A miner 78 from any of the blockchain nodes 76A, 76B, 76C, and 76D may create an update to the blockchain 56. In certain embodiments, the smart contract(s) 80 may be a data structure that may include states (e.g., internal states) and transaction instructions relating to the data stored in the blockchain 56. The transactions, or functions, may include instructions that modify the states of the smart contracts 80 and/or interact with other smart contracts 80 by performing further transactions. Examples of smart contracts 80 described herein include smart contracts 80 related to storing data relating to interaction with the metaverses 12 described herein. Following insertion of a smart contract 80, the blockchain node 76 may propagate its update of the blockchain 56, and the other blockchain nodes 76 may accept the update using a consensus mechanism (e.g., proof of work, proof of stake, and so forth). For example, if blockchain node 76A generated a blockchain segment that incorporates some smart contract 80 to the blockchain 56, blockchain node 76A may propagate the updated blockchain 56 to blockchain nodes 76B, 76C, and 76D, which may validate and accept the updated blockchain 56.

Similarly, a transaction request 86 may be received by any miner 78 of the blockchain nodes 76A, 76B, 76C, and 76D via an access node 82. The transaction request 86 may perform operations that cause a change in the state of a smart contract 80 recorded in the blockchain 56. After performing the desired operations, and changing the state of the smart contract 80, in accordance with the transaction request 86, the miner 78 may update the blockchain 56 to record the updated state of the smart contract 80. The updated state of the smart contract 80 may be propagated to the blockchain nodes 76A-D, verified, and persisted using consensus mechanisms. An information request 84, similar to a transaction request 86, may be received by a miner 78, and may perform operations associated with a smart contract 80. However, in contrast with the transaction request 86, the information request 84 does not lead to changes in the state of the smart contract 80 and, thus, updates to the blockchain 56 that result from a successful information request 84 are not performed.

In certain embodiments, performance of the operations by the miners 78 of the blockchain nodes 76 may be incentivized and/or regulated by exchange of tokens (e.g., currencies) of the blockchain 56. For example, in public blockchains, updates to the blockchain 56 by a blockchain node 76A-D may be rewarded with a blockchain token. Moreover, performance of a transaction request 86 or an information request 84 may be rewarded with a blockchain token. For example, in certain embodiments, in the Ethereum public blockchain, updates to the blockchain from recordation of smart contracts 80 and information requests 84 may be rewarded with Ether tokens, and performance of transaction requests 86 and information requests 84 may be incentivized by offers of Ethers in the form of a secondary token called "gas". In certain private blockchain embodiments, tokens may be used to implement prioritization mechanisms for the operations and/or to prevent large or faulty operations from blocking the blockchain 56 with arbitrarily long operation times.

Figure 4:
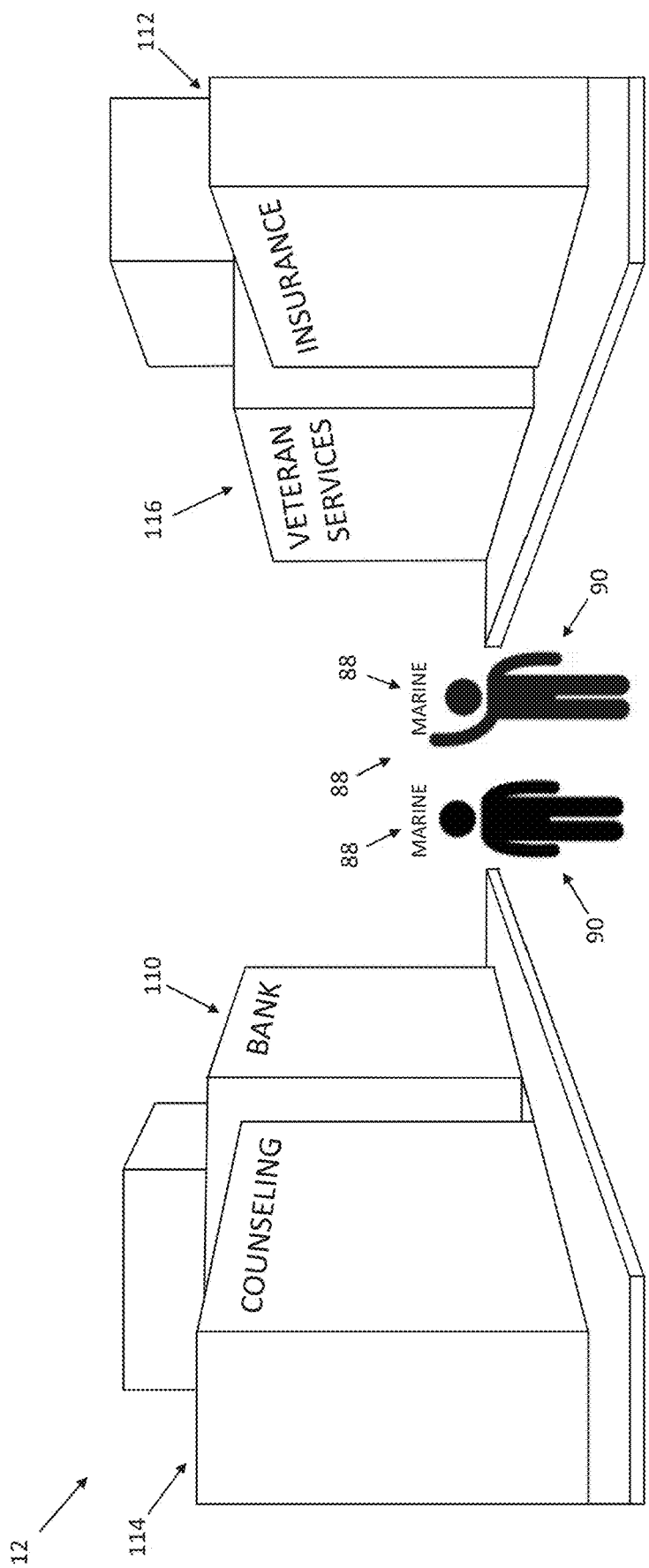
FIG. 4 illustrates metaverse users having badges that denote shared affiliations, in accordance with embodiments described herein.

As described above, the embodiments described herein enable management of user affiliations in metaverses 12. In particular, in certain embodiments, a metaverse user affiliation system 26 may be used to identify affiliations between various users 16 interacting with certain metaverses 12, and may promote such identified affiliations in a variety of different ways, as described in greater detail herein. For example, as illustrated in FIG. 4, in certain embodiments, badges 88 (or other visual indications) that may be displayed as being associated with an avatar 90 of a user 16 may be used to identify users 16 within a metaverse 12 who share a common interest or have a common background. For example, in certain embodiments, a particular badge 88 may be associated with users 16 that served in particular branches of military so that the users 16 that are affiliated with this branch of the military may be able to easily identify other users 16 within a metaverse 12 so that they may more readily find and interact with each other. In certain embodiments, such badges 88 (or other visual indicators) may only be visible in certain circumstances, for example, only to other users 16 who share that particular affiliation. In addition, different various layers of privacy may be implemented by the metaverse user affiliation system 26. For example, some users 16 (e.g., users 16 that are associated with an organization that maintains or is otherwise directly associated with a particular metaverse 12, such as employees of an organization that hosts the particular metaverse 12) may be allowed to see certain information about users 16 (e.g., years of service in the military, common geographical location(s), and so forth), whereas other users 16 may not be able to see that same level of information. In addition, in certain embodiments, the metaverse user affiliation system 26 may also be configured to facilitate users 16 being presented with game-based incentivization, as described in greater detail herein.

Potential affiliations could include characteristics like whether the user 16 served in the military, whether the user 16 is (or formerly was) a member of a particular branch of the military, whether the user 16 is currently on active duty with the particular branch of the military, whether the user 16 works for a particular company, years of service of the user 16 with the particular branch of the military and/or the particular company, year ranges that the user 16 served with the particular branch of the military and/or the particular company, whether the user 16 is a member of a particular religious organization, one or more educational institutions (e.g., high schools, universities, medical schools, law schools, vocational schools, and so forth) that the user 16 attended, year ranges that the user 16 attended the one or more educational institutions, whether the user 16 graduated from the one or more educational institutions, net worth of the user 16, insurance information (e.g., insurance companies used, insurance policies with the insurance companies, and so forth) for the user 16, one or more hobbies of the user 16, the age of the user 16, the gender of the user 16, the race of the user 16, the marital status of the user 16, geographical information for the user 16 (e.g., country, state, city, and so forth), one or more physical disabilities of the user 16, or any other characteristics that may either be manually entered by the user 16 them self (e.g., by using one or more computing devices 20) or that may be automatically detected via interaction of the user 16 with one or more metaverses 12 using one or more metaverse-accessing applications 18 running on one or more computing devices 20 (with the metaverse-accessing applications 18, the metaverses 12, the metaverse servers 14, the metaverse user affiliation system 26, or some combination thereof, automatically detecting the activity 22 of the user 16).

In certain embodiments, the characteristics of the users 16 may function as the affiliations themselves. However, in other embodiments, the characteristics of the users 16 may merely be used by the metaverse user affiliation system 26 to determine the affiliations. For example, in certain embodiments, an affiliation determined by the metaverse user affiliation system 26 may be all users 16 over the age of 65 that served in the military. As such, in certain embodiments, different combinations of characteristics of the users 16 may be used by the metaverse user affiliation system 26 to determine different affiliations for the users 16.

It will be appreciated that some of the characteristics (e.g., that may be used to determine their affiliations) tracked by the metaverse user affiliation system 26 may be of the type that users 16 may not offer to the general public, but which could be very important to a particular user 16 such that they would like to know when other users 16 with similar affiliations are in there vicinity within particular metaverses 12 such that they may interact with the other users 16. In addition, the particular user 16 may be interested in learning what other types of services, experiences, and so forth, other users 16 with similar affiliations have spent a lot of time interacting with in certain metaverses 12. As such, the embodiments described herein may enable the sharing of information between users 16 with similar affiliations that might otherwise be impossible (or, at least very difficult, in a context other than a metaverse 12).

Figure 5:
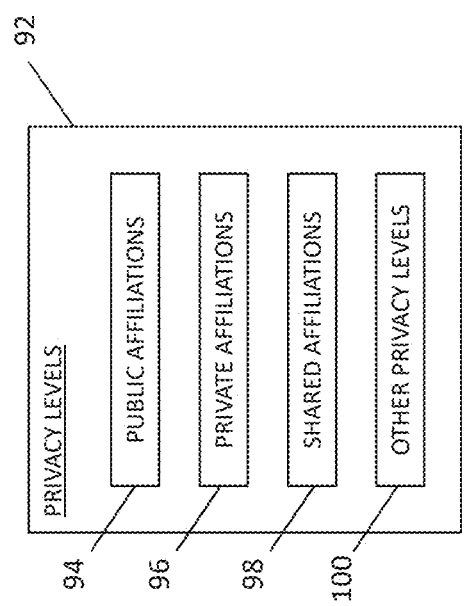
FIG. 5 illustrates various privacy levels for user affiliations, in accordance with embodiments described herein.

To that end, as illustrated in FIG. 5, in certain embodiments, users 16 may manually tag certain affiliations as having different privacy levels 92, for example, public affiliation privacy levels 94 (e.g., where all other metaverse users 16 can see the affiliations for a particular user 16), private affiliation privacy levels 96 (e.g., where no other metaverse users 16 can see the affiliations for a particular user 16), shared affiliation privacy levels 98 (e.g., where other metaverse users 16 that share the affiliations can see the affiliations for a particular user 16), and other privacy levels 100. It will be appreciated that the particular privacy levels 92 set for particular affiliations may be manually selected by the users 16 to which the affiliation data relates, such that the users 16 may protect any affiliation information they do not wish to share. Indeed, in certain embodiments, each of the affiliations for a particular user 16 may be set to a private affiliation privacy level 96 by default.

Figure 6:
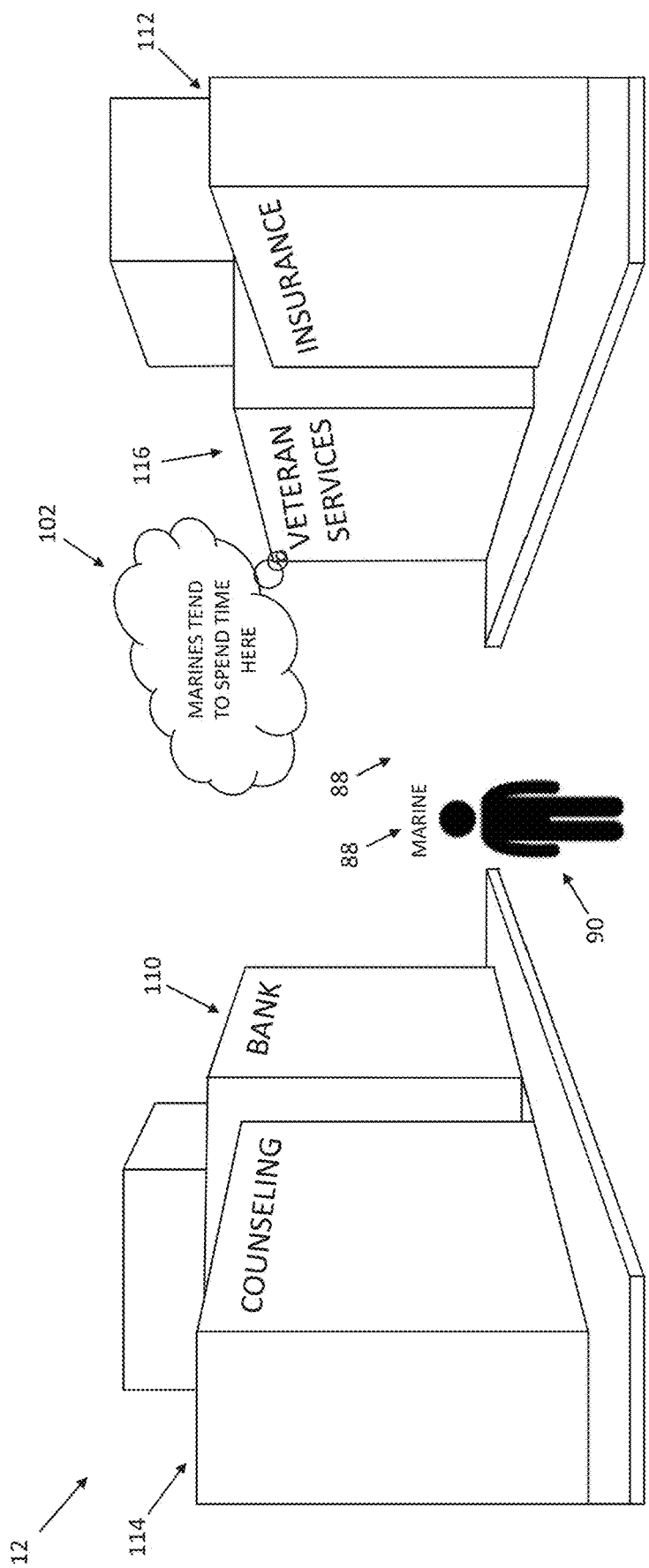
FIG. 6 illustrates a virtual message being presented to a metaverse user based on a user affiliation of the metaverse user, in accordance with embodiments described herein.

Furthermore, in certain embodiments, information relating to detected metaverse activity 22 of other users 16 having similar affiliations may be freely viewable (albeit, anonymously) even if the particular users 16 associated with the detected metaverse activity 22 do not wish for their particular identities to be known. As such, the embodiments described herein enable a greater amount of affiliation-related information 24 to be distributed even if the users 16 sharing the affiliations do not know each other's particular identities. Indeed, in certain embodiments, the detected metaverse activity 22 may be somewhat general in nature, such as detection that users 16 that used to be with a particular branch in the military tend to spend an inordinate amount of time (e.g., a percentage of time greater than a predetermined threshold percentage of time, such as greater than 5% of their time) in a particular area of a metaverse 12, as illustrated by the virtual message 102 in FIG. 6. Such information may be beneficial to a user 16 sharing that affiliation, despite the fact that they are presented with this information without knowing any particular users 16 for which the metaverse activity 22 was collected.

Figure 7:
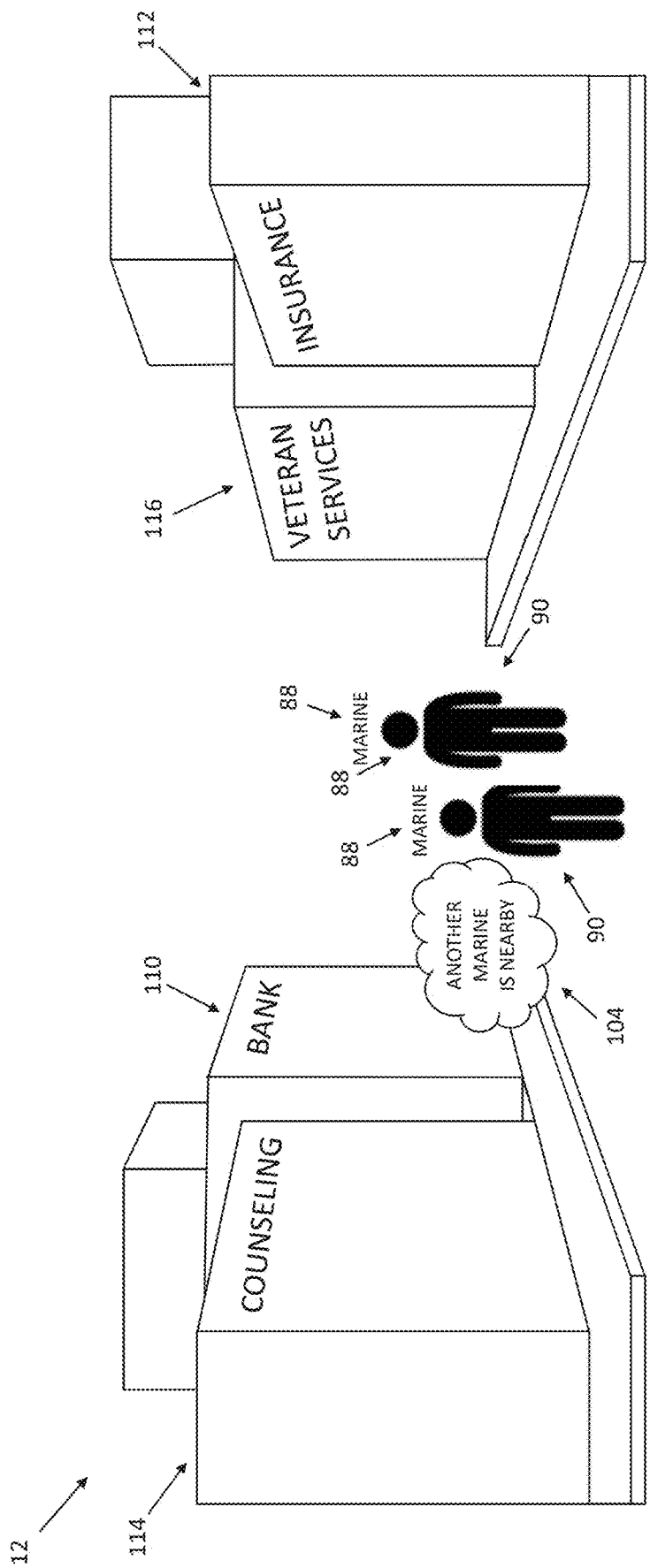
FIG. 7 illustrates a virtual alert being presented to a metaverse user when another metaverse user sharing a user affiliation is nearby in the metaverse, in accordance with embodiments described herein.

In addition, as illustrated in FIG. 7, in certain embodiments, virtual alerts 104 may be provided to users 16 when there are other users 16 who share affiliations are in relative proximity (e.g., within a predetermined virtual range) within a particular metaverse 12 (e.g., within a predetermined virtual range relative to the virtual world of the particular metaverse 12). For example, if a particular user 16 is a former Marine and there is another user 16 that is also a former Marine within 5 virtual feet, an alert 104 may be provided. It will be appreciated that every user 16 may have many different characteristics (e.g., that may be used to determine their affiliations) that define them. As such, getting these different badges 88 (or other visual indications) to show up as part of their avatars 90 may take up a lot of space. As such, in certain embodiments, to minimize the display of such badges 88 (and other visual indications), only relevant badges (or other visual indications) may be visible to other users 16, for example, those that are indicative of shared affiliations between the users 16. In addition, in certain embodiments, certain affiliation information 24 may be blurred out under certain circumstances (e.g., when a viewing user 16 does not have access to see the particular affiliation information 24, but does have access to see that such affiliation information 24 exists).

In addition, in certain embodiments, an authentication component could be utilized by the metaverse user affiliation system 26 to ensure that all affiliations manually entered by users 16 are correct. For example, if a particular user 16 manually enters that they are a former Marine, the metaverse user affiliation system 26 may authenticate (e.g., via an external data source 42) that the user 16 is, indeed, a former Marine. Furthermore, in certain embodiments, the metaverse user affiliation system 26 may analyze detected metaverse activity 22 for users 16 having similar affiliations to determine whether these affiliated users 16 are visiting similar areas of metaverses 12, interacting with similar services provided within the metaverses 12, and so forth, so that the metaverse user affiliation system 26 may share this affiliation information 24 with other users 16 sharing those affiliations.

Figure 8:
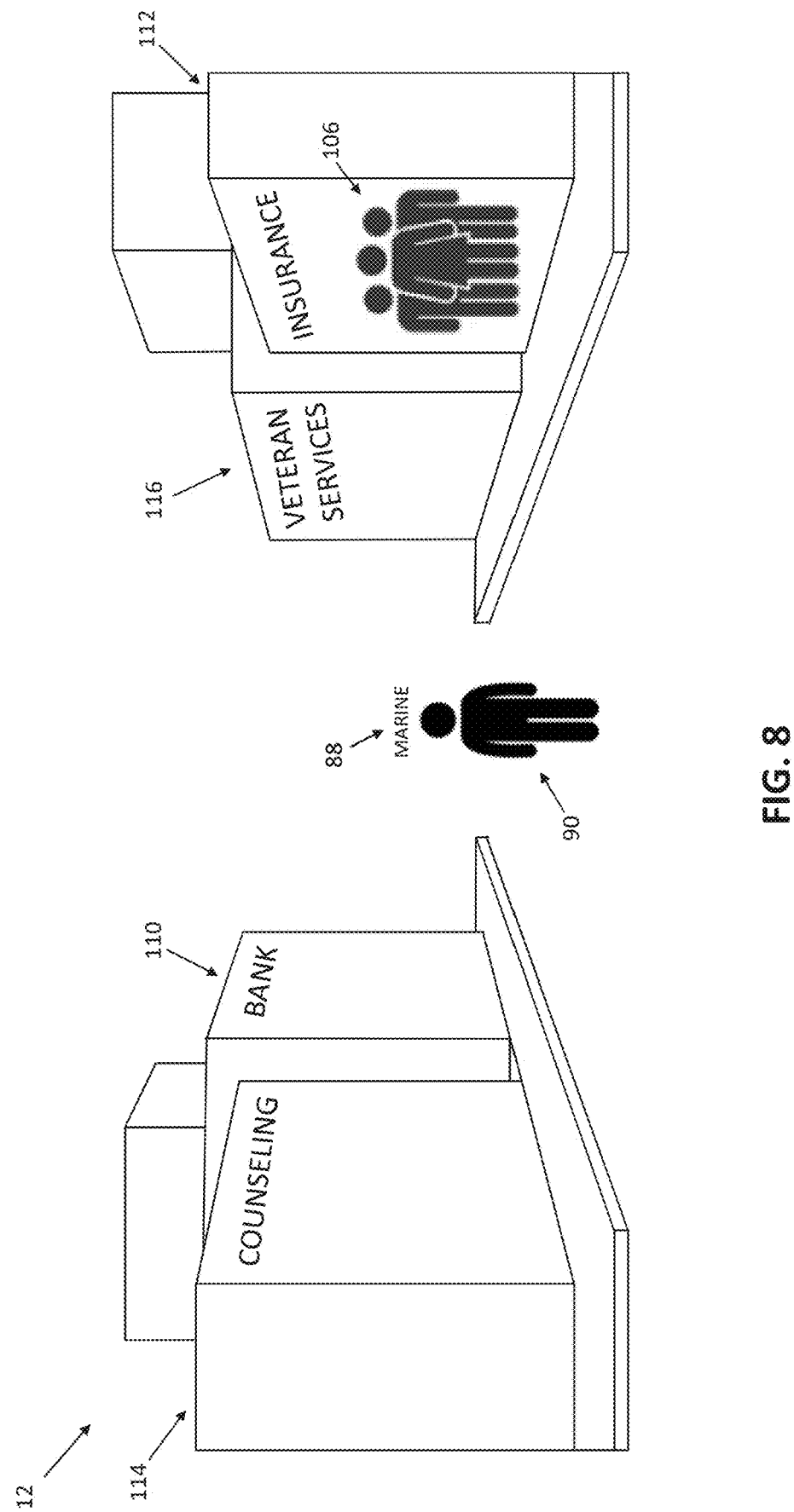
FIG. 8 illustrates a group of metaverse users that are associated with a particular organization, in accordance with embodiments described herein.

In addition, in certain embodiments, the metaverse user affiliation system 26 may use proximity of users 16 in a metaverse 12 to represent an affiliation. For example, example, as illustrated in FIG. 8, users 16 associated with a particular organization may primarily be found in particular areas of a metaverse 12 such that other users 16 may see these affiliated users 16 as a group 106 of users 16 that are associated with the particular organization (e.g., an insurance company in the illustrated embodiment). Indeed, in certain embodiments, the affiliated users 16 associated with the particular organization may be visualized as being located within different buildings within the metaverse 12 (e.g., as separate but related entities) that, for example, relate to different services provided by the organization that may be of interest to a particular user 16 (e.g., based on affiliations of the user 16). In addition, in certain embodiments, external partners associated with the particular organization may also be represented in the metaverse 12.

Figure 9:
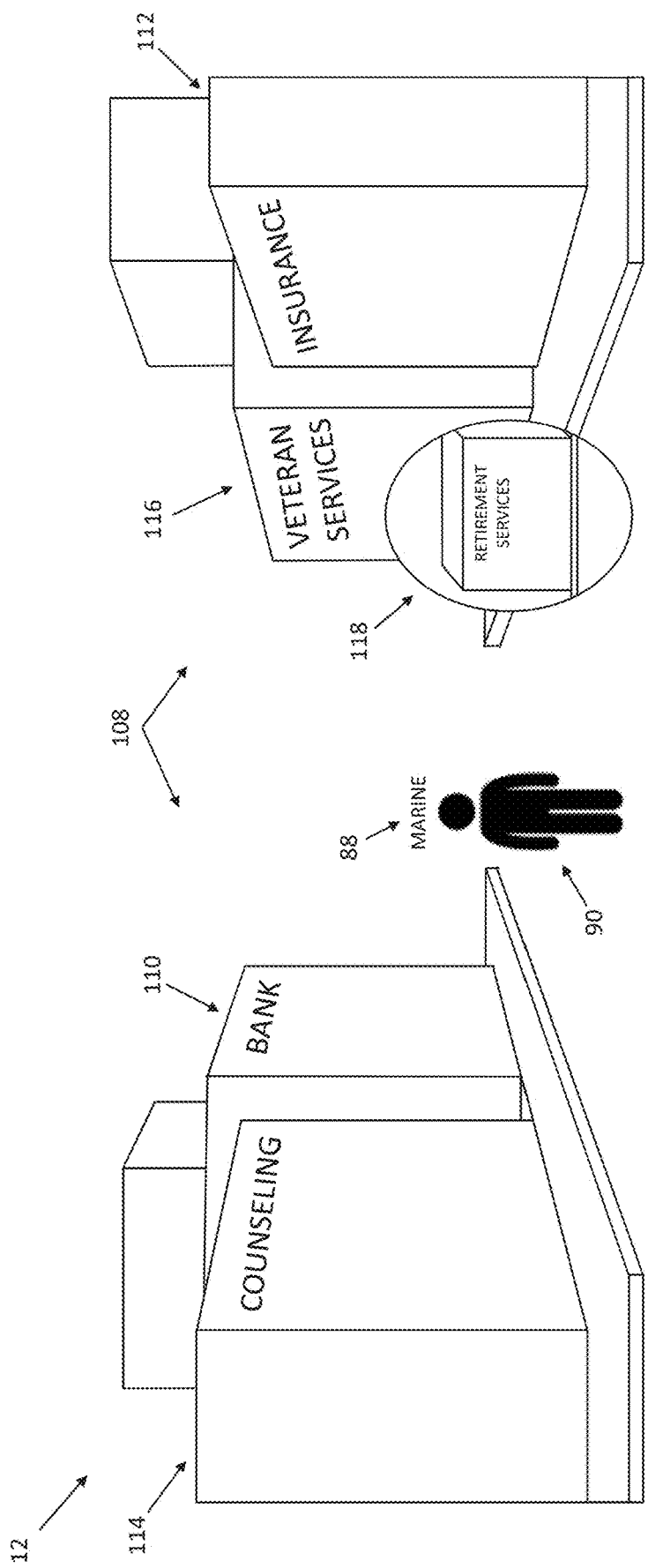
FIG. 9 illustrates a virtual complex of virtual buildings associated with a particular organization, in accordance with embodiments described herein.

In addition, in certain embodiments, a virtual complex 108 may be represented in a metaverse 12 to show different subdivisions within the particular organization to which certain users 16 are affiliated. For example, as illustrated in FIG. 9, in certain embodiments, a virtual bank 110 may be represented as a banking subdivision of the particular organization, a virtual insurance office 112 may be represented as an insurance subdivision of the particular organization, or a virtual counseling office 114 may be represented as a counseling subdivision of the particular organization, and so forth, as separate virtual buildings associated with the particular organization and represented in the metaverse 12. Furthermore, in certain embodiments, external partners (e.g., a veterans services entity in the illustrated embodiment) associated with the particular organization may also have virtual buildings represented in close proximity to (or, part of) the virtual complex 108 of the particular organization. In addition, in certain embodiments, fast travel points may be represented virtually with the metaverse 12 to enable users 16 to fast travel to certain locations associated with the particular organization (e.g., through virtual portals 118).

Figure 10:
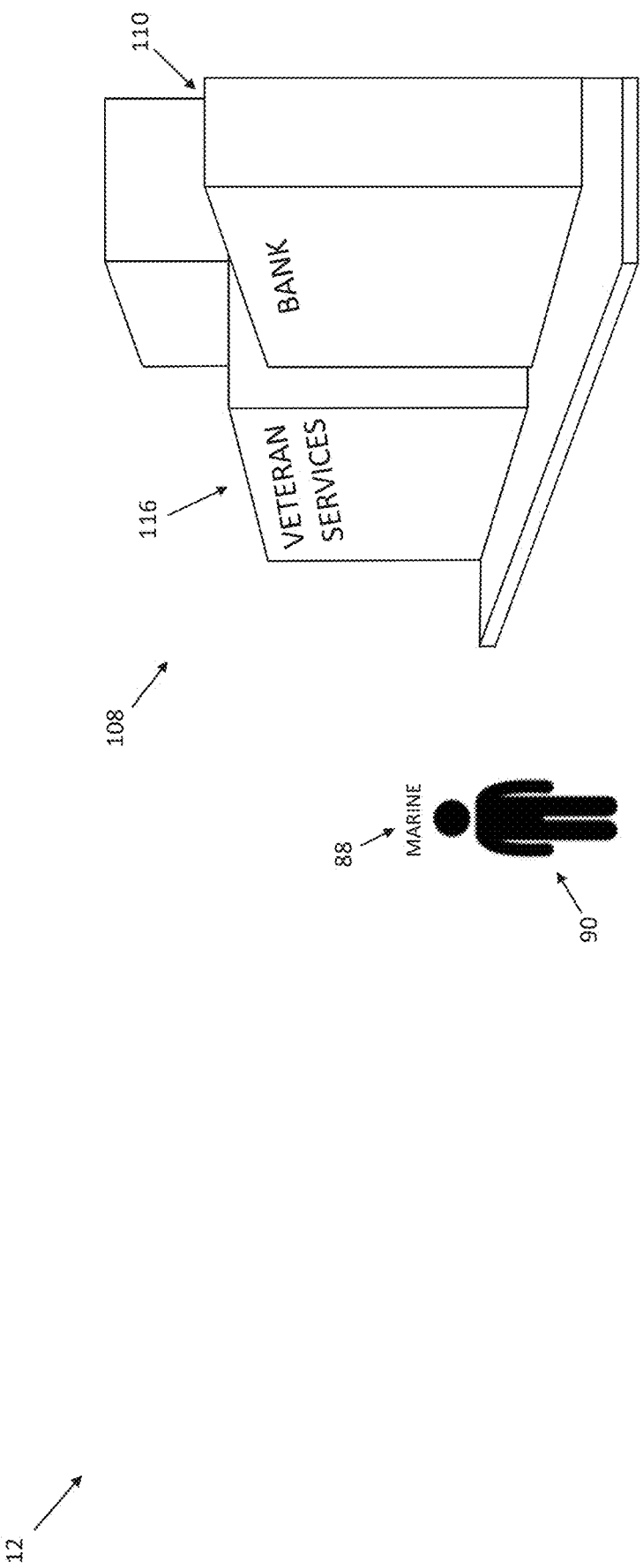
FIG. 10 illustrates a virtual complex of virtual buildings associated with a particular organization that has been modified based on interest of a metaverse user, in accordance with embodiments described herein.

In addition, in certain embodiments, different levels of hierarchy of the particular organization may be virtually represented in the metaverse 12 (e.g., which divisions certain users 16 are affiliated with, where in the real world geographically the users 16 are actually located, and so forth). In addition, in certain embodiments, the virtual world (e.g., the virtual complex 108 associated with the particular organization) may be changed based on the context of an interest of the user 16 interacting with the particular organization. For example, as illustrated in FIG. 10, the virtual complex 108 illustrated in FIG. 9 could be modified such that only subdivisions of interest to the particular user 16 (e.g., based either on their affiliations or preferences of the user 16 that are manually entered using a computing device 20) are virtually represented in the virtual world (e.g., in the illustrated embodiment, the virtual insurance office 112 and the virtual counseling office 114 have been removed, and the virtual bank 110 has been relocated to simplify the virtual complex 108).

Figure 11:
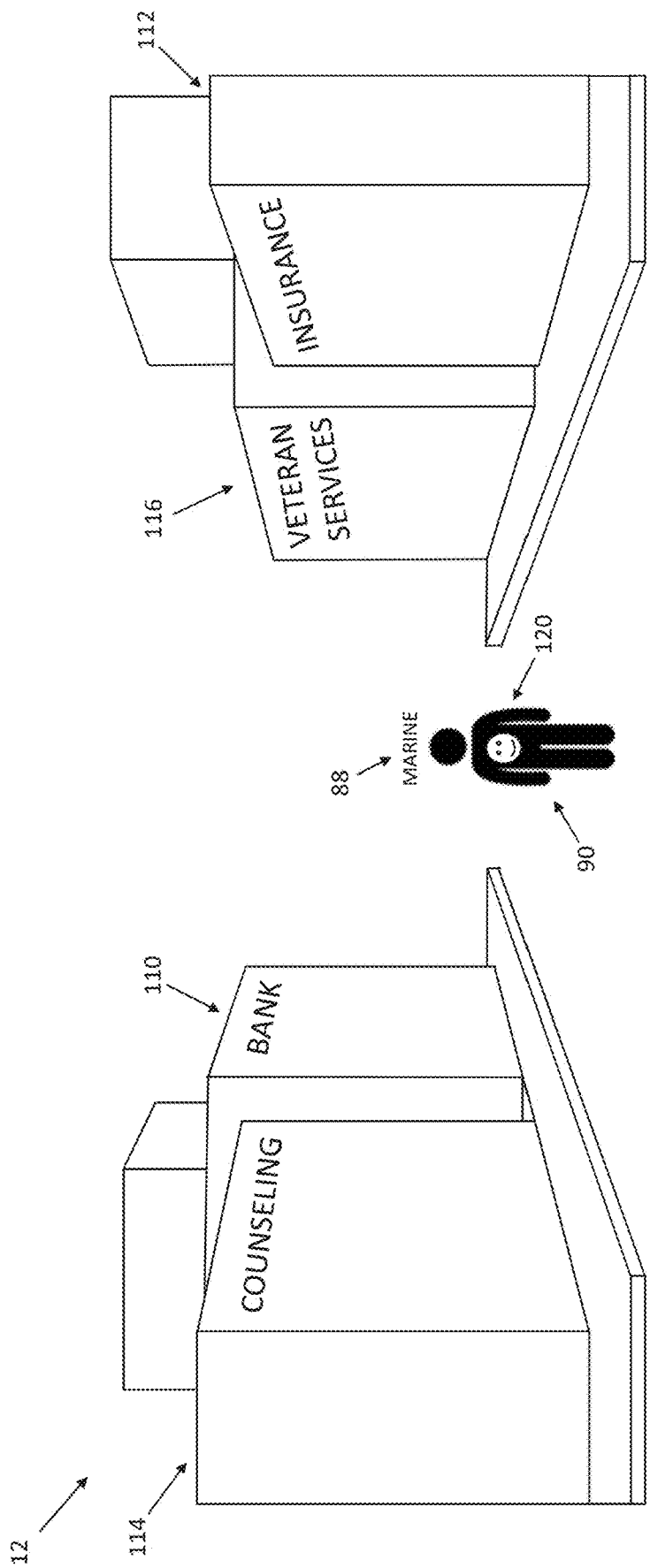
FIG. 11 illustrates a metaverse user wearing virtual apparel as advertising, in accordance with embodiments described herein.

In addition, in certain embodiments, an incentivization component may be utilized by the metaverse user affiliation system 26 wherein users 16 could be paid money (or otherwise rewarded, for example, by acquiring points) to wear virtual apparel 120 in the metaverse 12 as advertising, as illustrated in FIG. 11. In other embodiments, only users 16 that have performed certain tasks (e.g., taking training classes) may be rewarded with certain virtual apparel 120. Furthermore, in certain embodiments, certain virtual apparel or virtual badges may be awarded to certain users 16 based on long time service (e.g., receiving a virtual 50-year sticker for 50 years of service with the particular organization). In addition, in certain embodiments, users 16 may be rewarded with real-world rewards based on points rewarded in the metaverse 12.

Figure 12:
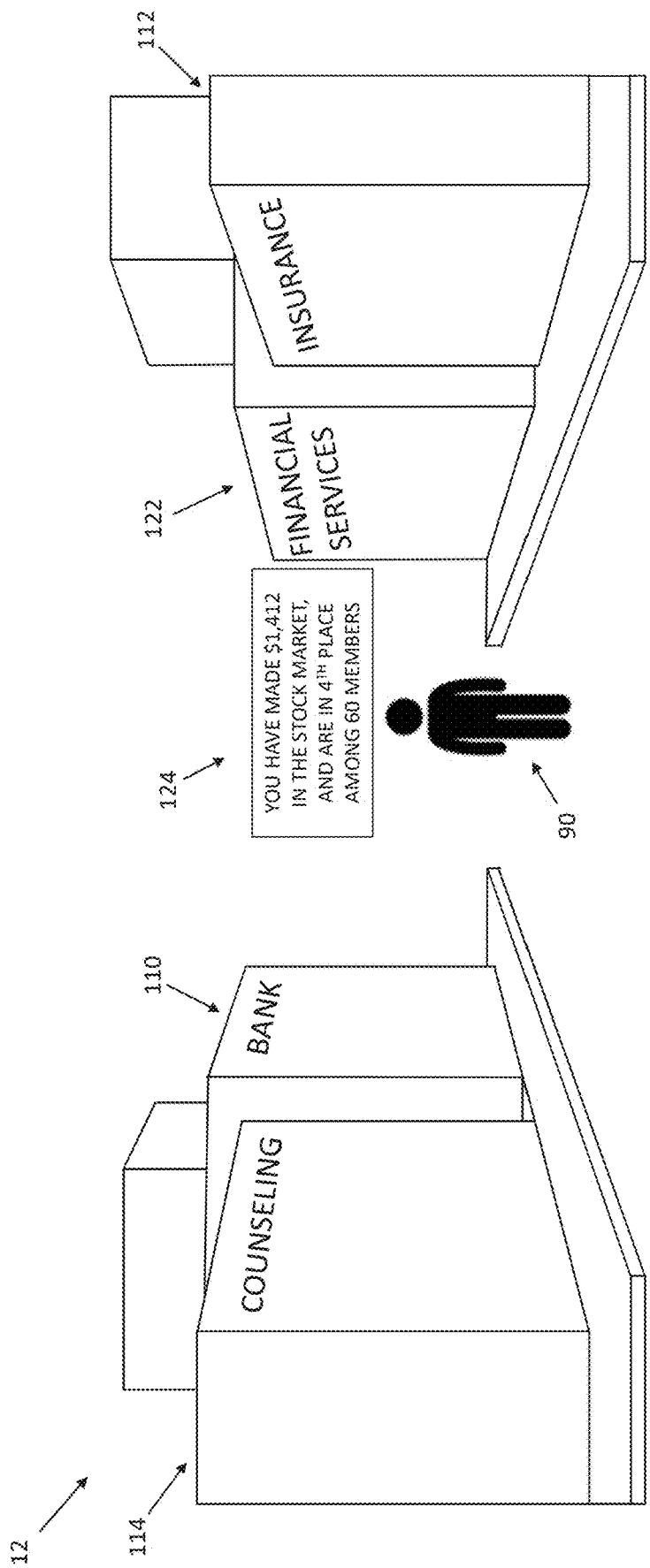
FIG. 12 illustrates a metaverse user taking part in a metaverse game relating to stock market earnings where a ranking for the individual metaverse user in the metaverse game, in accordance with embodiments described herein.
Figure 13:
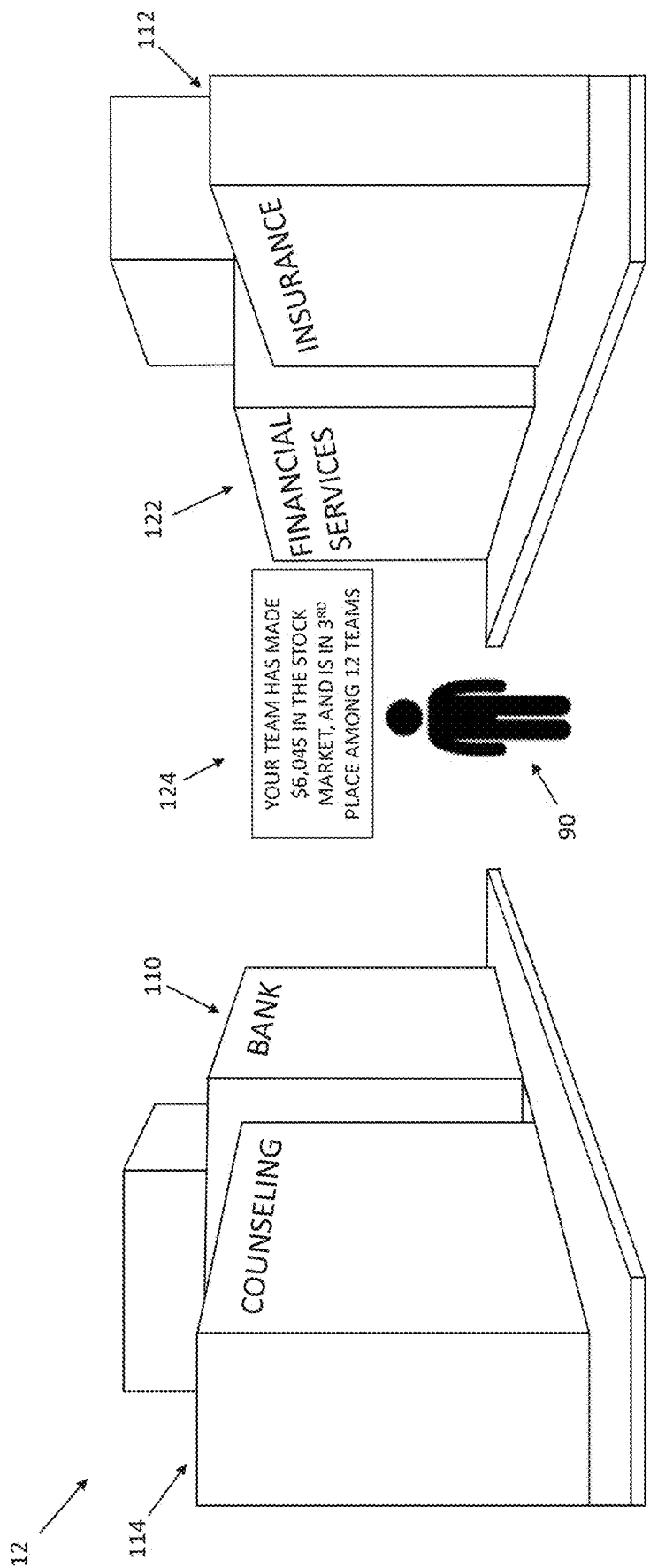
FIG. 13 illustrates a metaverse user taking part in a metaverse game relating to stock market earnings where a ranking for a team of the metaverse user in the metaverse game, in accordance with embodiments described herein.

In certain embodiments, incentivization may be extended to games that are implemented in the metaverse 12 where an intended result of the games is to incentivize users 16 to perform tasks that are beneficial not only for themselves, but also for an organization with which the users 16 are associated. Because of the relative anonymity of metaverses, certain opportunities are opened up for team challenges on previously sensitive topics such as financial information. As illustrated in FIG. 12, a game may be implemented whereby users 16 are ranked based on the amount of money that the users 16 have made in the stock market for a given period of time. For example, when the users 16 approach a virtual financial assistance office 122 in a metaverse 12, the users 16 may be presented with a summary 124 of their individual ranking in the game and, in certain embodiments, the amount of money that they have made in the stock market during the game. In certain embodiments, the users 16 may determine whether their game information may be displayed to other users 16. As illustrated in FIG. 13, instead of displaying rankings for the individual users 16, the rankings for teams with which the users 16 are associated may be displayed. In certain embodiments, the teams may be established based on user affiliations, as described in greater detail herein. In such an embodiment, the rankings for teams may be based on total performance (e.g., total amount of money earned in the stock market for the users 16 of the team) or average performance (e.g., average amount of money earned in the stock market for the users 16 of the team). Indeed, the games (e.g., challenges) may be user-based, team-based, or a combination thereof.

Figure 14:
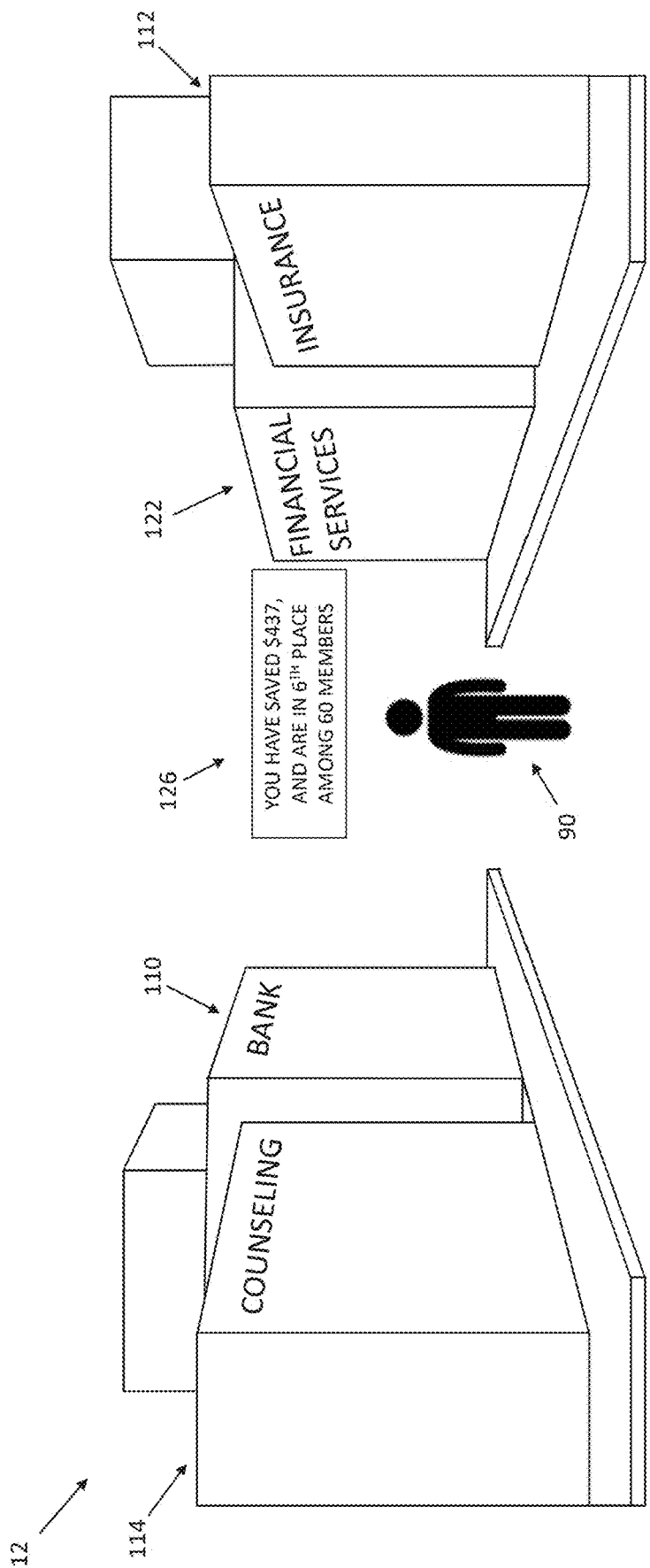
FIG. 14 illustrates a metaverse user taking part in a metaverse game relating to personal savings where a ranking for the individual metaverse user in the metaverse game, in accordance with embodiments described herein.
Figure 15:
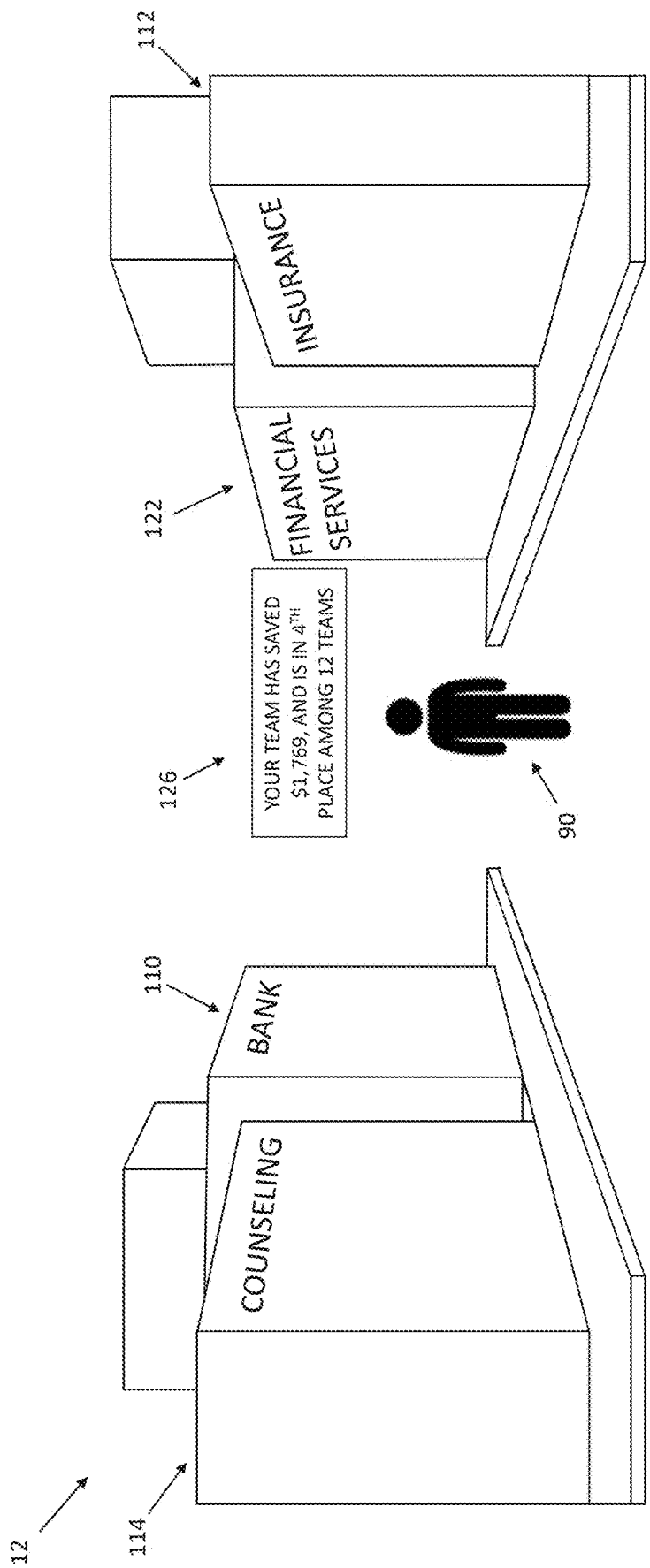
FIG. 15 illustrates a metaverse user taking part in a metaverse game relating to personal savings where a ranking for a team of the metaverse user in the metaverse game, in accordance with embodiments described herein.

FIG. 14 illustrates another game that may be implemented whereby users 16 are ranked based on the amount of money that the users 16 have saved during a given period of time. For example, when the users 16 approach a virtual bank 110 in a metaverse 12, the users 16 may be presented with a summary 124 of their individual ranking in the game and, in certain embodiments, the amount of money that they have saved during the game. In certain embodiments, the users 16 may determine whether their game information may be displayed to other users 16. As illustrated in FIG. 15, instead of displaying rankings for the individual users 16, a summary 126 of the rankings for teams with which the users 16 are associated may be displayed. In certain embodiments, the teams may be established based on user affiliations, as described in greater detail herein. In such an embodiment, the rankings for teams may be based on total performance (e.g., total amount of money saved by the users 16 of the team) or average performance (e.g., average amount of money saved by the users 16 of the team). Indeed, the games (e.g., challenges) may be user-based, team-based, or a combination thereof.

Figure 16:
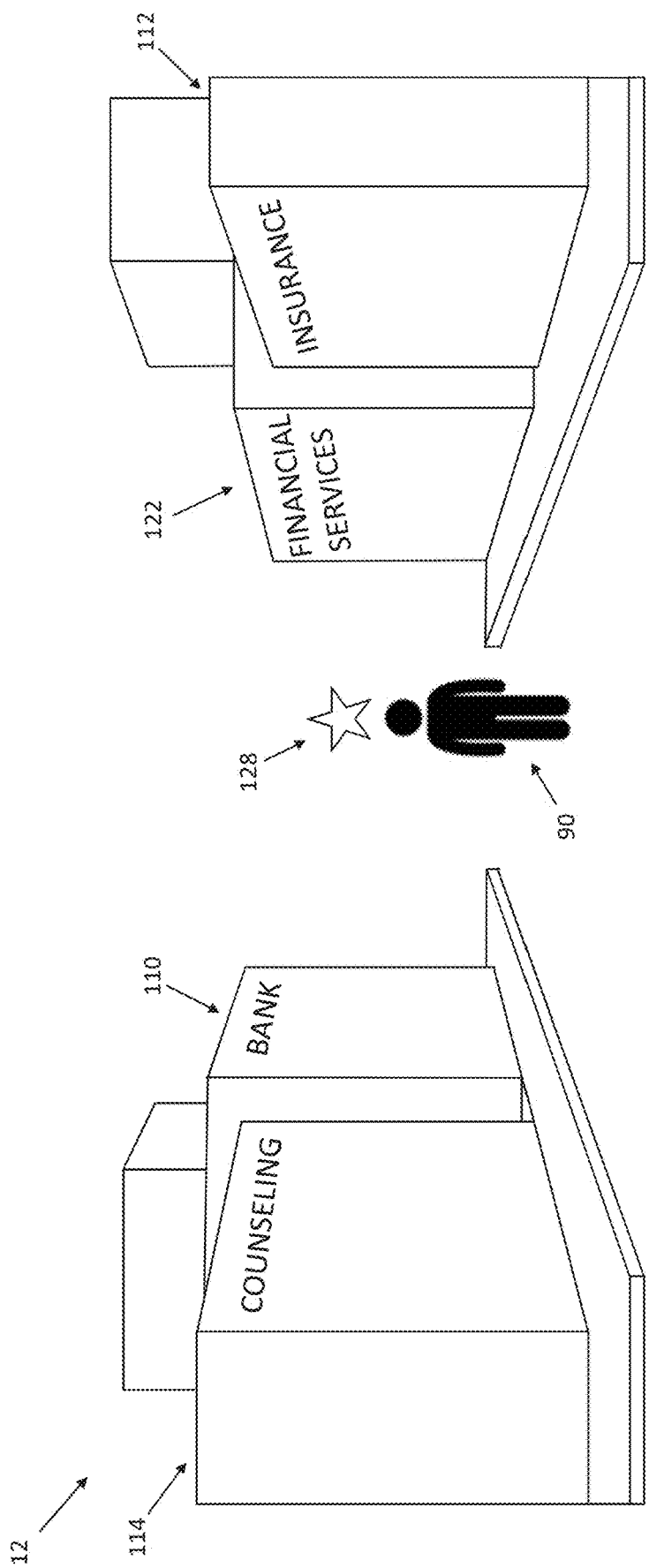
FIG. 16 illustrates a metaverse user being awarded a reward/badge for performance in a metaverse game, in accordance with embodiments described herein.

As illustrated in FIG. 16, in certain embodiments, users 16 may be incentivized through virtual rewards and badges 128 based on their individual performance in a metaverse game and/or their team performance in the metaverse game. In general, the systems and methods described herein incentivize users to spend time in metaverses 12 and stay there once they are in there. In certain situations, scavenger hunts may also be implemented to incentivize users 16 to perform tasks that are beneficial not only for themselves, but also for an organization with which the users 16 are associated. One non-limiting example could be to ask members to go to a certain number of locations in a metaverse 12 (discussed in greater detail herein) and, perhaps, interact with the locations so that the members learn about services provided at the locations in the metaverses 12 and/or actually interact with the services provided at the locations in the metaverses 12. In certain embodiments, after visiting and/or interacting with the services provided at the locations in the metaverses 12, the members may be asked questions and receive points or even receive discounts for certain services based on their answers.

In addition, in certain embodiments, discounts may be provided to metaverse users 16 for a metaverse equivalent of "defensive driving" or wellness courses (e.g., virtual courses that simulate driving and either have artificial intelligence instructors or real-world instructors that are presented as avatars, and so forth). In addition, in certain embodiments, instructors may actually be family members (e.g., parents) that instruct other family members (e.g., children) in a relatively anonymous manner. In addition, in certain embodiments, incentives may be provided that transfer back into the real word. For example, in-game currencies may be converted to real-world rewards. In addition, in certain embodiments, members may earn loyalty points by interacting with services provided in metaverses.

As described in greater detail herein, AI avatars 130 associated with users 16 may be configured and deployed by the users 16 within certain metaverses 12 to perform various functions for the users 16 associated with the AI avatars 130. In certain embodiments, an AI avatar 130 may be a bot that is verified by a user 16 associated with the AI avatar 130. In certain embodiments, the AI avatar 130 may be a conversational AI that is either programmed by an associated user 16 or that self-learns (e.g., using artificial neural networks and other problem-solving techniques) by autonomously interacting with one or more metaverses 12 even when the associated user 16 is not interacting with the one or more metaverses 12.

In certain embodiments, certain interactions with AI avatars 130 in metaverses 12 may be used as a metric for performance of metaverse users 16 in metaverse games that are implemented in the metaverses 12. Such interactions may include, but are not limited to, deploying their own AI avatars 130 in the metaverses 12, interacting with AI avatars 130 deployed by other metaverse users 16, and so forth. As such, each of the examples illustrated in FIGS. 17-23 and described in the associated paragraphs may serve as game-related interactions in metaverse games, as described in greater detail herein.

Figure 17:
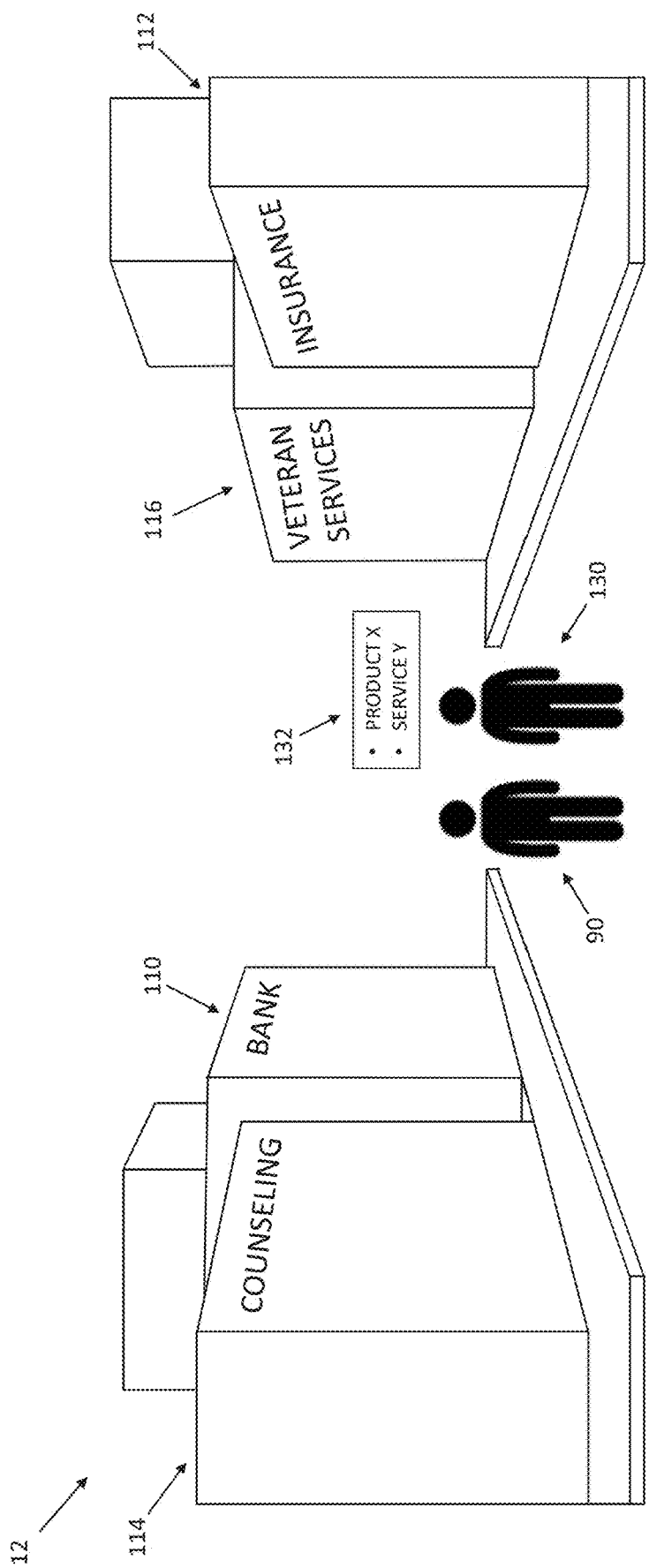
FIG. 17 illustrates an example artificial intelligence (AI) avatar that has been deployed in a metaverse by an associated user such that the AI avatar may be monetized by simulating the associated user in the metaverse when the associated user is not currently interacting with the metaverse, in accordance with embodiments described herein.
Figure 18:
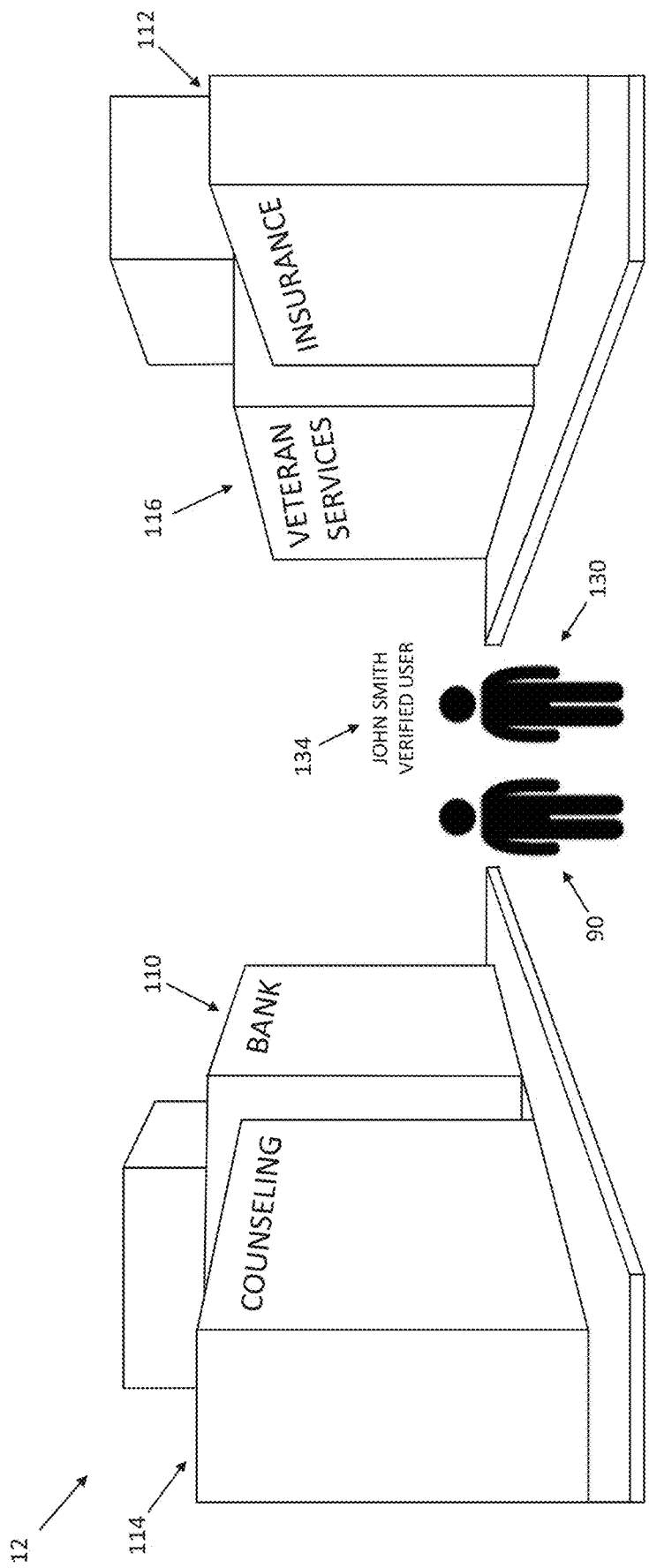
FIG. 18 illustrates visual information being presented in a metaverse that a particular AI avatar is representative of an actual user of the metaverse, in accordance with embodiments described herein.
Figure 19:
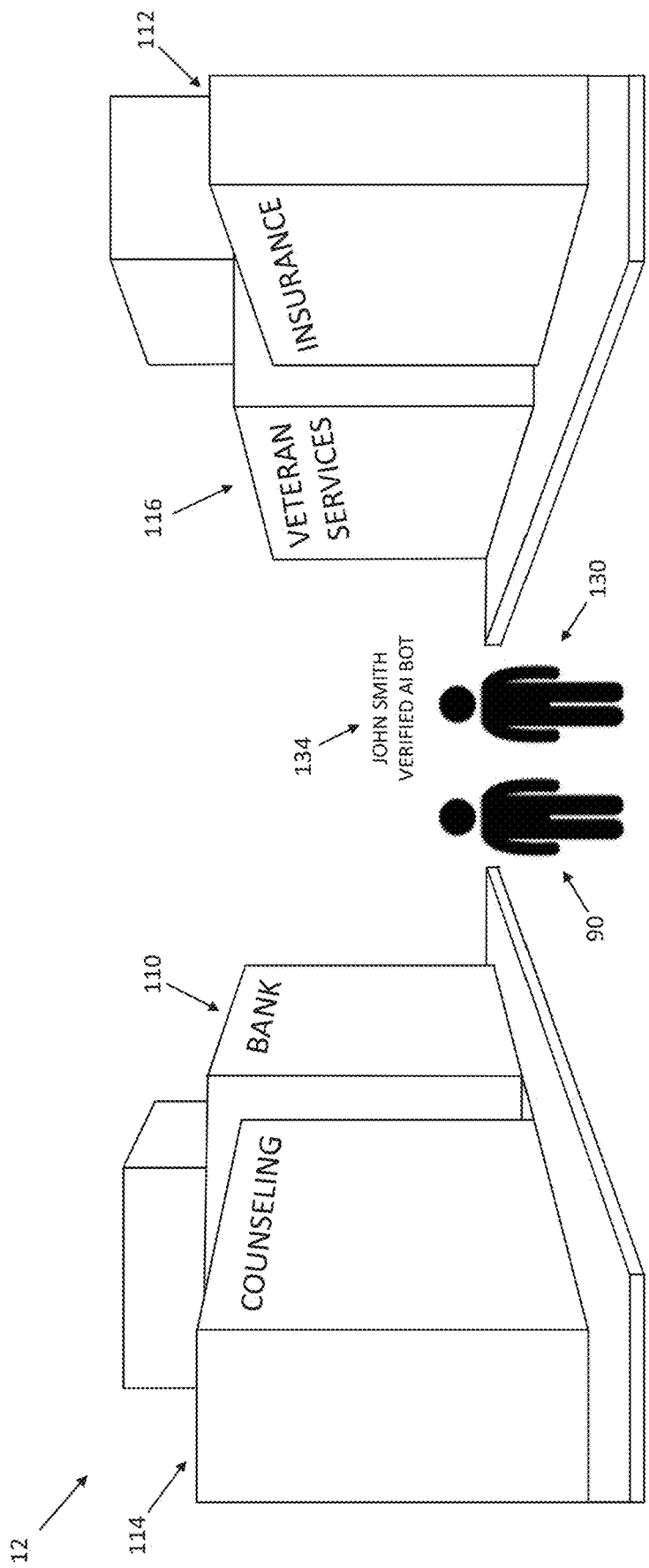
FIG. 19 illustrates visual information being presented in a metaverse that a particular AI avatar is representative of an AI bot associated with an actual user of the metaverse, in accordance with embodiments described herein.

FIG. 17 illustrates an example AI avatar 130 that has been deployed in a metaverse 12 by an associated user 16 such that the AI avatar 130 may be monetized by simulating the associated user 16 in the metaverse 12 when the associated user 16 is not currently interacting with the metaverse 12

(e.g., when the associated user 16 is asleep or simply logged off of the metaverse 12). For example, as illustrated in FIG. 17, if an associated user 16 has a new product or service that the user 16 is trying to sell via the metaverse 12, the AI avatar 130 may be programmed to autonomously present information 132 relating to the product or service to avatars 90 of other users 16 of the metaverse 12 when the associated user 16 is not logged into the particular metaverse 12, wherein the information 132 relating to the product of service may be interacted with by an avatar 90 of another user 16 of the metaverse 12 to enable the user 16 to purchase the good or service. In certain embodiments, the metaverse user affiliation system 26 may be configured to display a verification that a particular AI avatar 130 is, indeed, associated with a particular metaverse user 16. Furthermore, in certain embodiments, the metaverse user affiliation system 26 may be configured to provide visual information 134 via a metaverse 12 of whether a particular AI avatar 130 being presented via the metaverse 12 is representative of an actual user 16 of the metaverse 12 (e.g., FIG. 18) or, rather, is representative of an AI bot associated an actual user 16 (e.g., FIG. 19). As such, other metaverse users 16 may not only confirm that they are interacting with at least a verified AI bot associated with another actual user 16, but also whether they are interacting with the actual user 16 or an AI bot directly associated with (and representing) the actual user 16.

Figure 20:
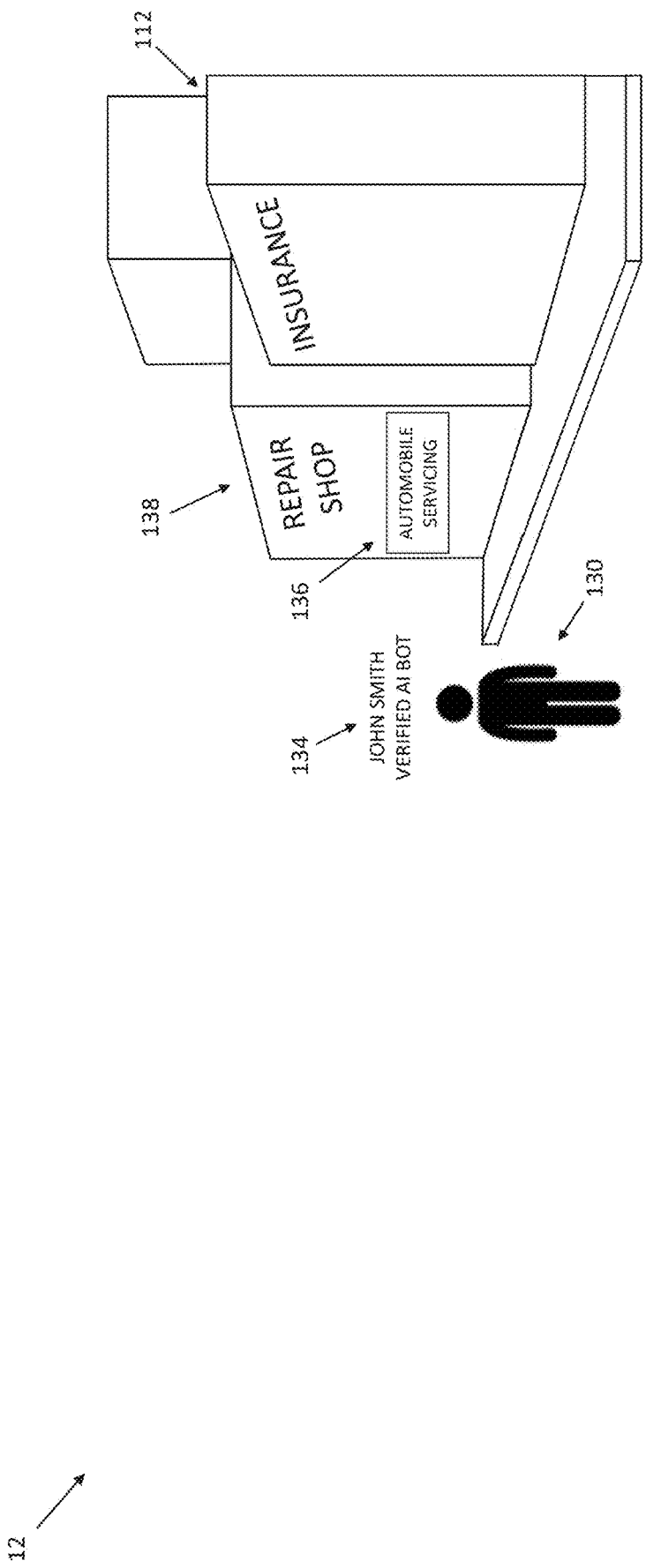
FIG. 20 illustrates an example AI avatar that has been deployed in a metaverse by an associated user such that the AI avatar may be used by the associated user to schedule servicing of an automobile at a repair shop, in accordance with embodiments described herein.
Figure 21:
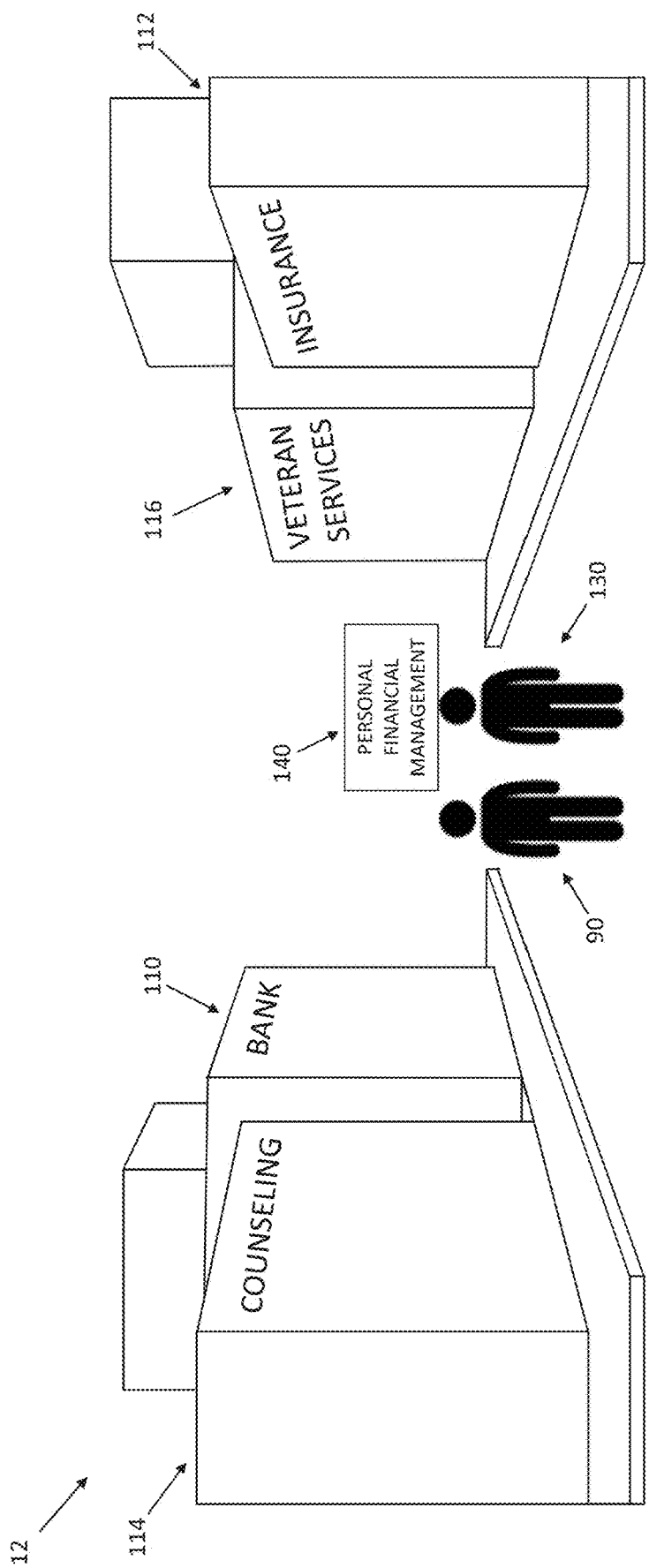
FIG. 21 illustrates an example AI avatar that has been deployed in a metaverse by an associated user such that the AI avatar may be used to provide personal financial management services, in accordance with embodiments described herein.
Figure 22:
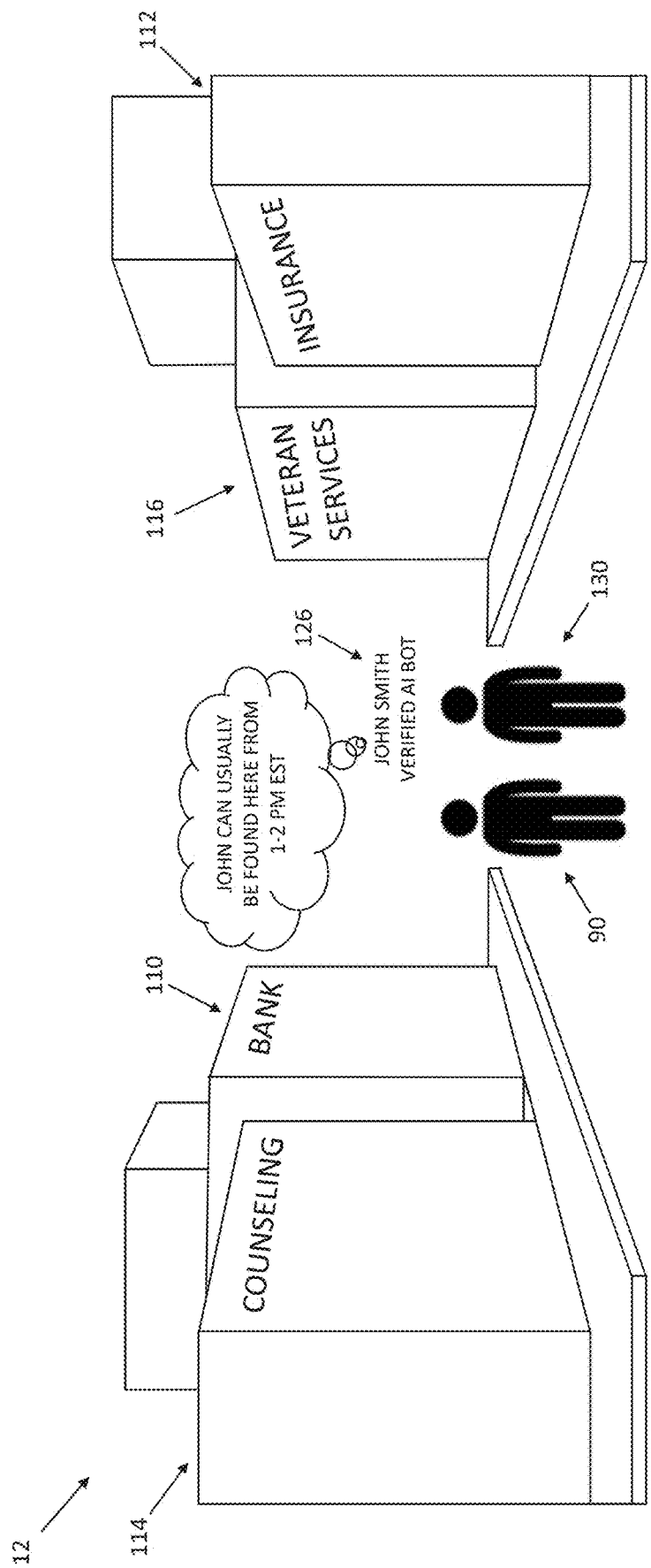
FIG. 22 illustrates visual information being presented by an AI avatar in a metaverse that an associated user is usually available in a virtual area of the metaverse during a particular time frame, in accordance with embodiments described herein.
Figure 23:
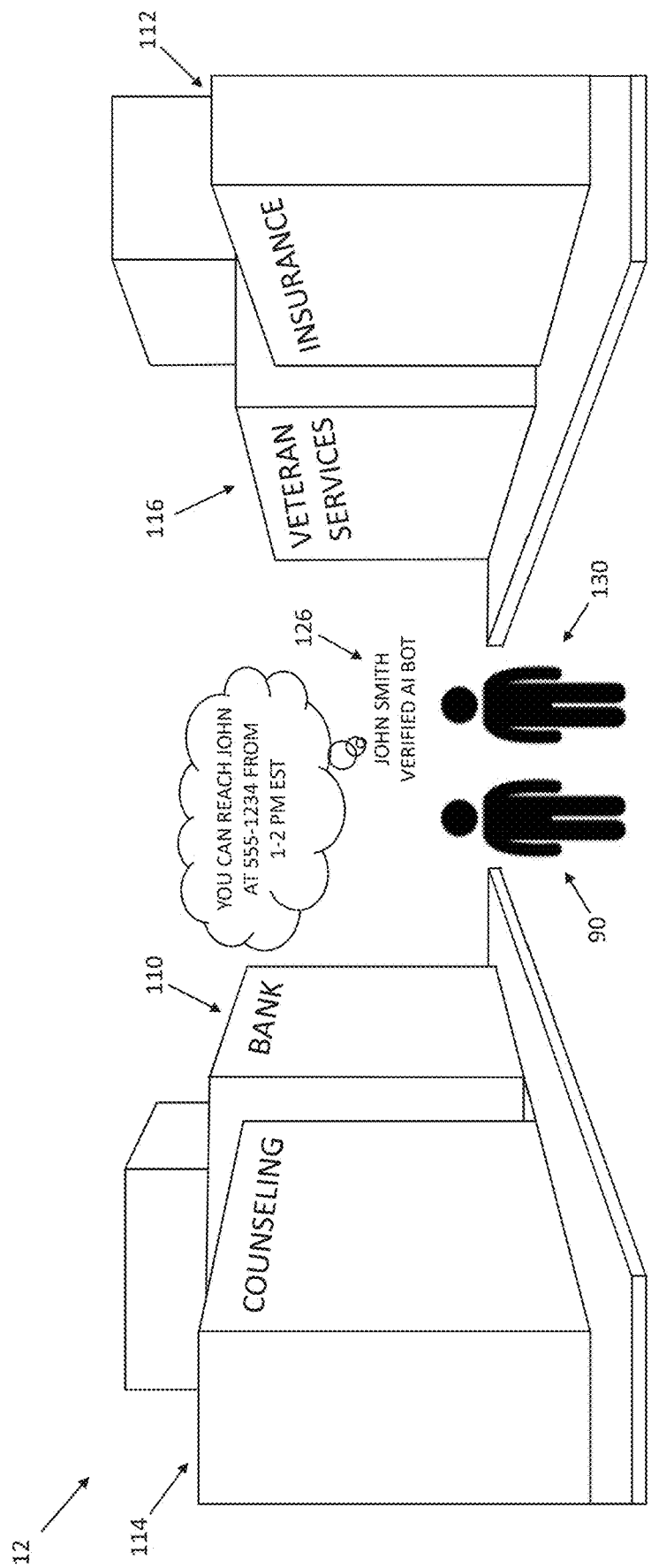
FIG. 23 illustrates visual information being presented by an AI avatar in a metaverse how and when an associated user may be contact in the real world, in accordance with embodiments described herein.

For example, in certain embodiments, the AI avatars 130 described herein may be configured by their associated users 16 to be deployed within various metaverses 12 to find answers to questions for the associated users 16 to, for example, not require the associated users 16 to have to wait on hold, waiting for the answers to the questions. In addition, in certain embodiments, the AI avatars 130 described herein may be configured by their associated users 16 to be deployed within various metaverses 12 to make arrangement for specific services to be provided to the associated users 16. FIG. 20 illustrates an example AI avatar 130 that has been deployed in a metaverse 12 by an associated user 16 such that the AI avatar 130 may be used by the associated user 16 to schedule servicing 136 of an automobile at a repair shop 138. In certain embodiments, the AI avatar 130 may go to the virtual repair shop 138 in a metaverse 12 and check on the status of the automobile servicing 136 while the associated user 16 is asleep or otherwise logged off of the metaverse 12. In addition, in certain embodiments, the AI avatars 130 described herein may be configured by their associated users 16 to be deployed within various metaverses 12 to autonomously provide services for an associated user 16 to other metaverse users 16. FIG. 21 illustrates an example AI avatar 130 that has been deployed in a metaverse 12 by an associated user 16 such that the AI avatar 130 may be used to provide personal financial management services 140 (or other goods or services) to other metaverse users 16.

In addition, in certain embodiments, AI avatars 130 may be configured to provide other metaverse users 16 with information relating to when the best times and places to meet the metaverse users 16 associated with the AI avatars 130 (e.g., to provide services to, or receive services from, the associated users), for example, while the associated metaverse users 16 are asleep or otherwise logged off certain metaverses 12. For example, in certain embodiments, an AI avatar 130 may be configured to let other metaverse users 16 know that an associated metaverse user 16 is usually available between the hours of 1-2 PM EST in a particular virtual area of a particular metaverse 12 (e.g., FIG. 22) and/or that the associated metaverse user 16 may be contacted (e.g., via a phone call, a text message, an email message, and so forth) in the real world between the hours of 1-2 PM EST using specific contact means (e.g., a phone number, an email address, a social media account, and so forth; e.g., FIG. 23). As such, the AI avatars 130 described herein may function as virtual assistants that take actions (e.g., sending and receiving requests for information, searching for and consolidating information, and so forth) for associated users 16 in an autonomous manner, not requiring any active feedback from the associated users 16 while performing the actions.

In certain embodiments, the functionality of the AI avatars 130 described herein may be at least partially dictated by the user affiliation information of their respective users 16, as described in greater detail herein. For example, in certain embodiments, the information displayed as being associated with AI avatars 130 and/or the functionality provided by the AI avatars 130 may be at least partially dictated by the user affiliation information of their respective users 16, as described in greater detail herein. As but one non-limiting example, in certain embodiments, a user 16 associated with a particular AI avatar 130 may wish for the AI avatar 130 to only be interacted with by other metaverse users 16 that share a particular user affiliation, as described in greater detail herein.

As described in greater detail herein, the embodiments described herein also generally relate to systems and methods for providing virtual education in metaverses 12. In certain embodiments, receiving and/or providing virtual education in metaverses may be used as a metric for performance of metaverse users 16 in metaverse games that are implemented in the metaverses 12. As such, each of the examples illustrated in FIGS. 24-31 and described in the associated paragraphs may serve as game-related interactions in metaverse games, as described in greater detail herein.

Figure 24:
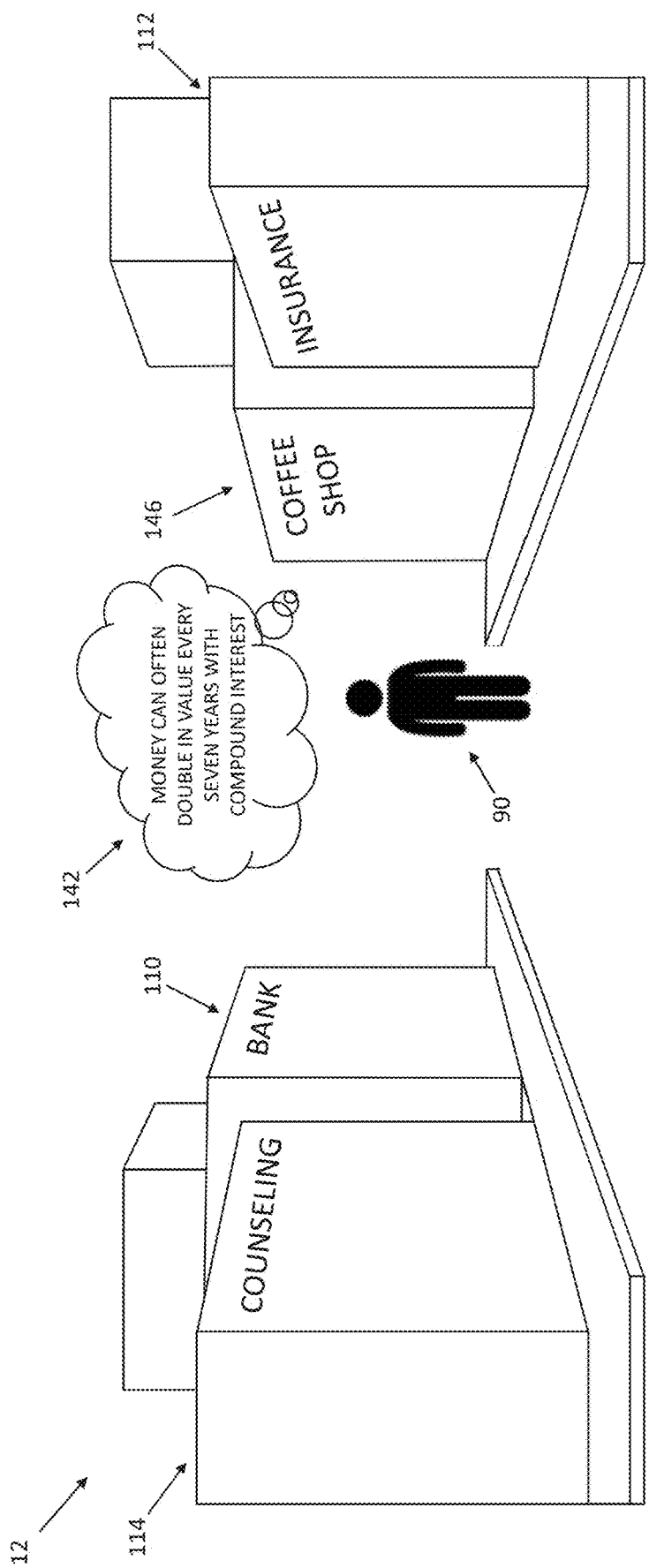
FIG. 24 illustrates a metaverse user being provided with virtual financial education in a metaverse, in accordance with embodiments described herein.
Figure 25:
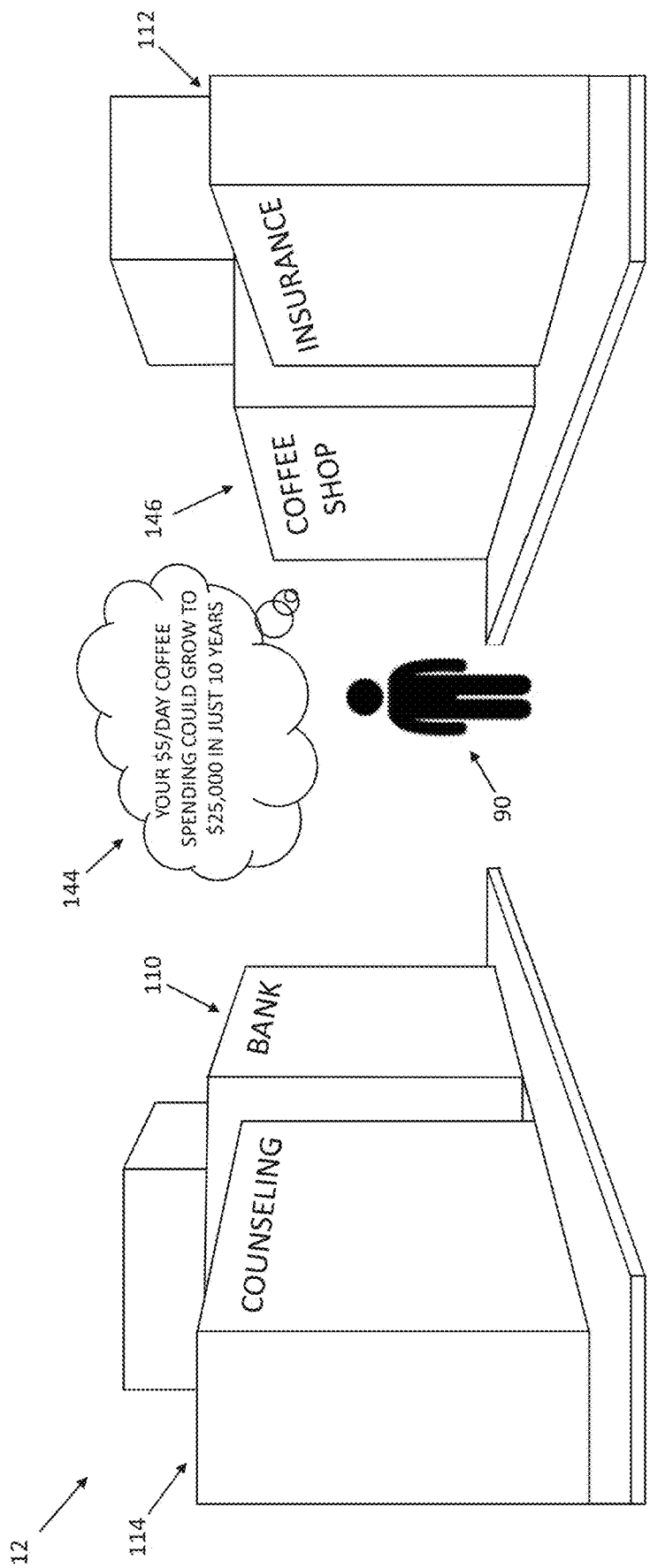
FIG. 25 illustrates a metaverse user being provided with additional virtual financial education in a metaverse, in accordance with embodiments described herein.
Figure 26:
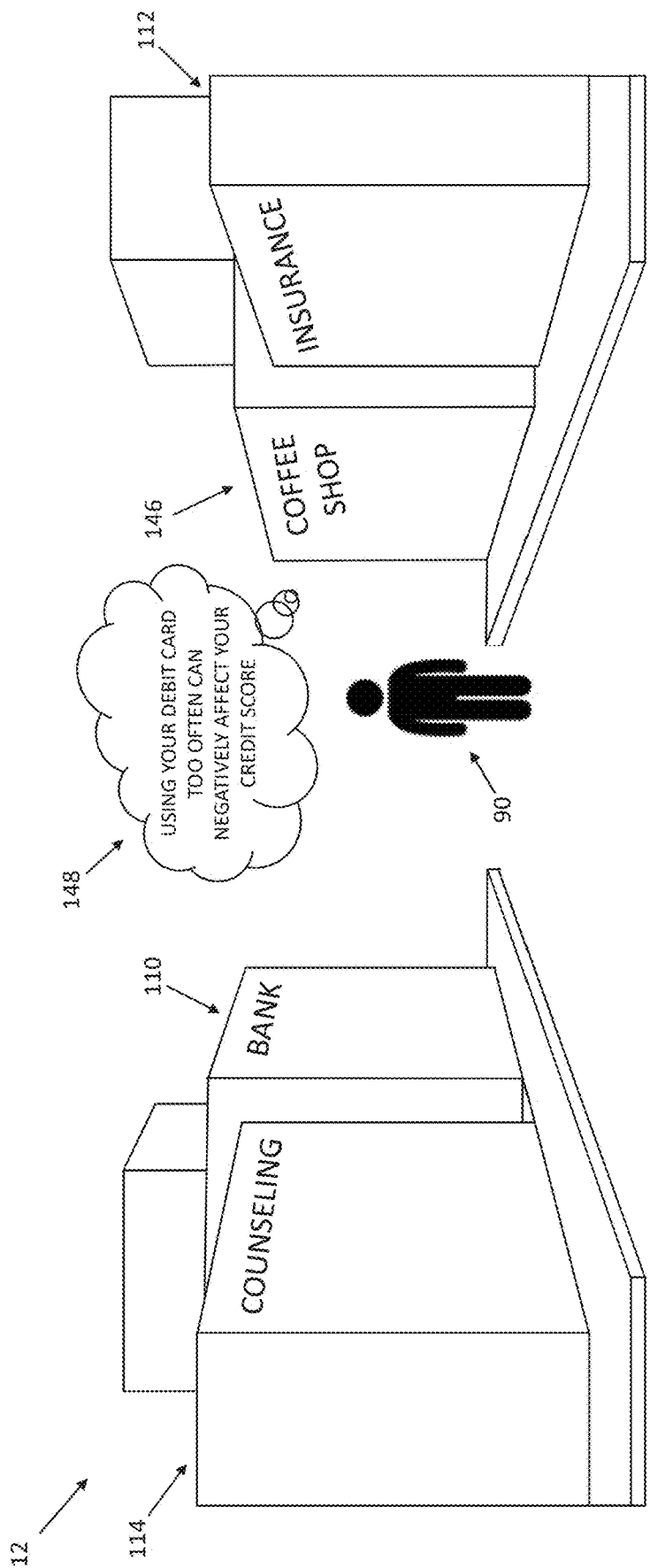
FIG. 26 illustrates a metaverse user being provided with virtual debit card education in a metaverse, in accordance with embodiments described herein.

As illustrated in FIG. 24, in certain embodiments, metaverse users 16 may be virtually educated with information 142 regarding financial literacy relating to real-time simulation of how interest compounds over certain time periods, such as over 5 years, over 10 years, over 30 years, and so forth. In certain embodiments, such virtual financial education may be initiated when a user makes a particular purchase at a virtual storefront. In addition, as illustrated in FIG. 25, in certain embodiments, when an avatar 90 associated with a metaverse user 16 is next to a particular metaverse location, the metaverse user 16 may be presented with information 144 relating to how much daily spending at the metaverse location (or its analogous real-world location(s)) could grow over time with interest. For example, if a metaverse user 16 gets close to a virtual coffee shop 146, the metaverse user 16 may be presented with their average daily (or monthly, annual, and so forth) coffee spending, and shown how much their average daily (or monthly, annual, and so forth) coffee spending could grow over time with interest. As another example illustrated in FIG. 26, in certain embodiments, a metaverse user 16 could be virtually educated with information 148 regarding the effect of the number of times a debit card (or other debt-related instrument) has been used has on credit score. In each of these scenarios, three-dimensional (3D) videos may pop up to illustrate the consequences of certain actions (e.g., this will be the impact on your life if you stick with your current actions).

Figure 27:
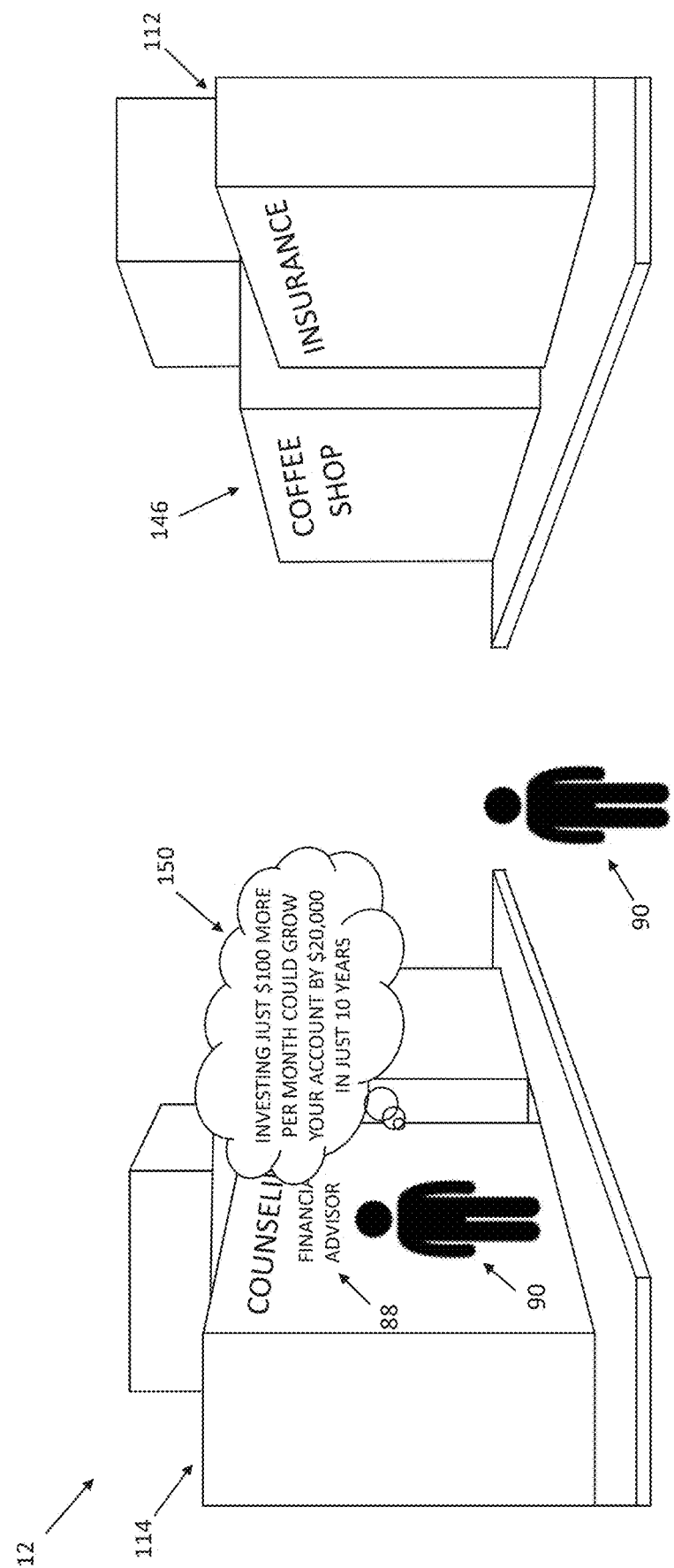
FIG. 27 illustrates a metaverse user being provided with additional virtual financial education in a metaverse, in accordance with embodiments described herein.

In certain embodiments, real human-to-human advice may be provided by a financial advisor avatar 90 (e.g., that is controlled by a real-world user 16) to an avatar 90 of a particular metaverse user 16 to, for example, provide advice on investments and/or to illustrated potential financial outcomes that are personalized for the particular metaverse user 16. For example, as illustrated in FIG. 27, in certain embodiments, the particular metaverse user 16 may be presented with information 150 relating to how much a financial account of theirs could grow if the metaverse user 16 invested an additional $100 per month, based on actual numbers. It will be appreciated that, in addition to having a real-world user 16 controlling an avatar 90 to provide other users 16 with virtual education in a metaverse 12, in other embodiments, real-world users 16 may control other types of avatars 90 for providing any of the other types of virtual education described herein.

In certain embodiments, providing such information to metaverse users 16 may become somewhat overwhelming (e.g., when the metaverse users 16 are children). As such, in certain embodiments, the amount and/or frequency of such visual education may be limited, for example, based on settings that are selected by the respective metaverse users 16 and/or guardians of the respective metaverse users 16.

Figure 28:
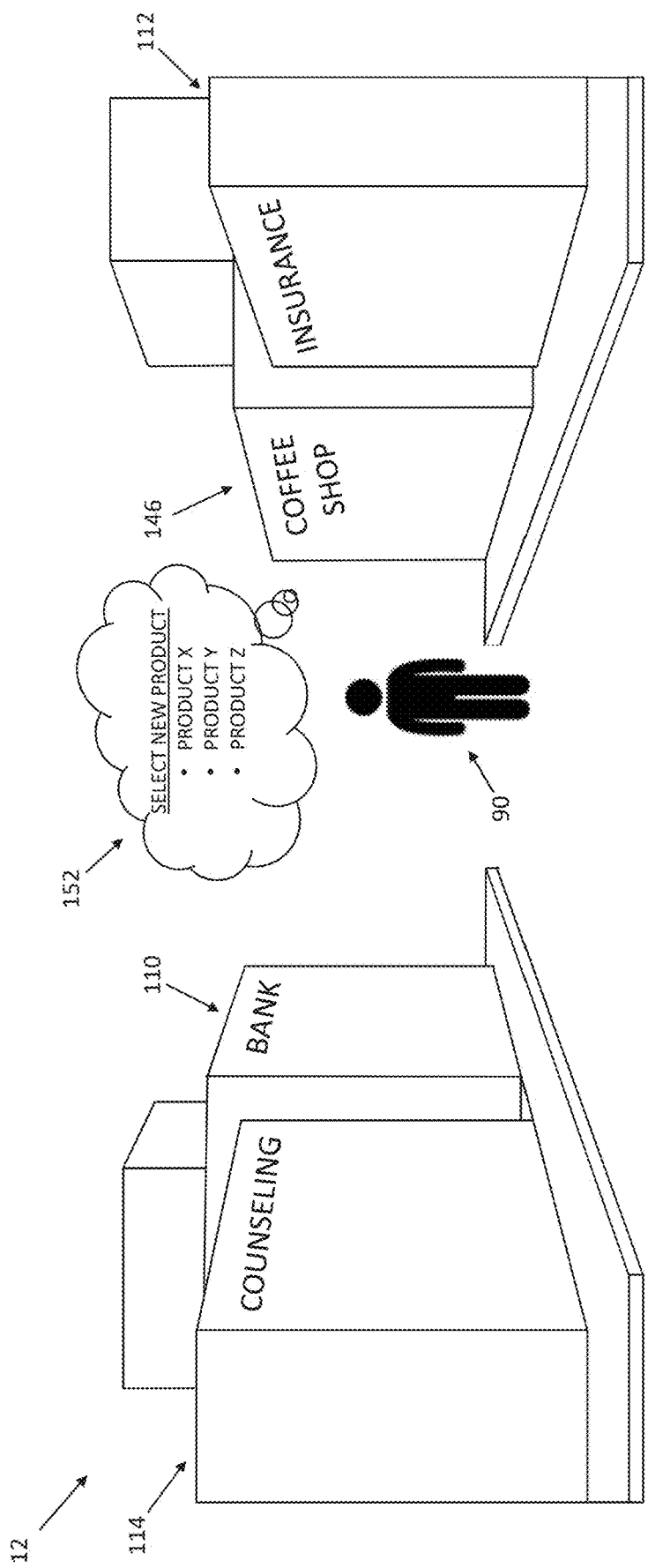
FIG. 28 illustrates a metaverse user being presented polls in a metaverse, in accordance with embodiments described herein.

As illustrated in FIG. 28, in certain embodiments, polls 152 may be used to receive real-time feedback on certain topics that are of particular interest to merchants or other entities in the metaverses 12, for example, potential products and/or services that might become available from the merchants or other entities, satisfaction with current products and/or services available from the merchants or other entities, satisfaction with storefront(s) associated with the merchants or other entities, and so forth. In certain embodiments, metaverse users 16 may also be incentivized to participate in such polls 152. for example, by providing an extra percentage cash back on purchases of goods and/or services provided by the merchants or other entities.

In certain embodiments, the educational programs that are provided to a metaverse user 16 may be tailored (e.g., customized) based on personal attributes of the metaverse user 16 and/or affiliations of the metaverse user 16, as described in greater detail herein. For example, if a metaverse user 16 likes video games, then video game language may be used to explain certain topics, or if a metaverse user 16 likes sports, then sports language may be used to explain certain topics.

Many different types of educational programs may be implemented in metaverses 12 in addition to the financial education described above. As but one non-limiting example, in certain embodiments, wellness education may be provided to metaverse users 16. For example, certain education programs may be focused on veterans, who may be more open on certain topics in a metaverse 12 because of the anonymity it offers. As illustrated in FIG. 29, based on responses of a metaverse user 16 to certain wellness education questions, mental health assistance (e.g., from a partner such as Wounded Warriors) could be provided in the virtual environment of a metaverse 12 by a virtual wellness counselor (e.g., to, hopefully, allow the metaverse user 16 to be more open and receptive to help). In addition, in certain embodiments, certain virtual areas (e.g., virtual Zen gardens, virtual fish tanks, and so forth, for stress relief) within a metaverse 12 may be presented to metaverse users 16 when it is determined that the virtual areas may be beneficial to the metaverse users 16 based on a determination of a wellness status of the metaverse users 16. In addition, in certain embodiments, virtual charitable contribution spots may be established in metaverses 12 to enable other metaverse users 16 to donate virtual currencies to certain organizations that are associated with improving particular types of wellness in metaverse users 16.

Figure 30:
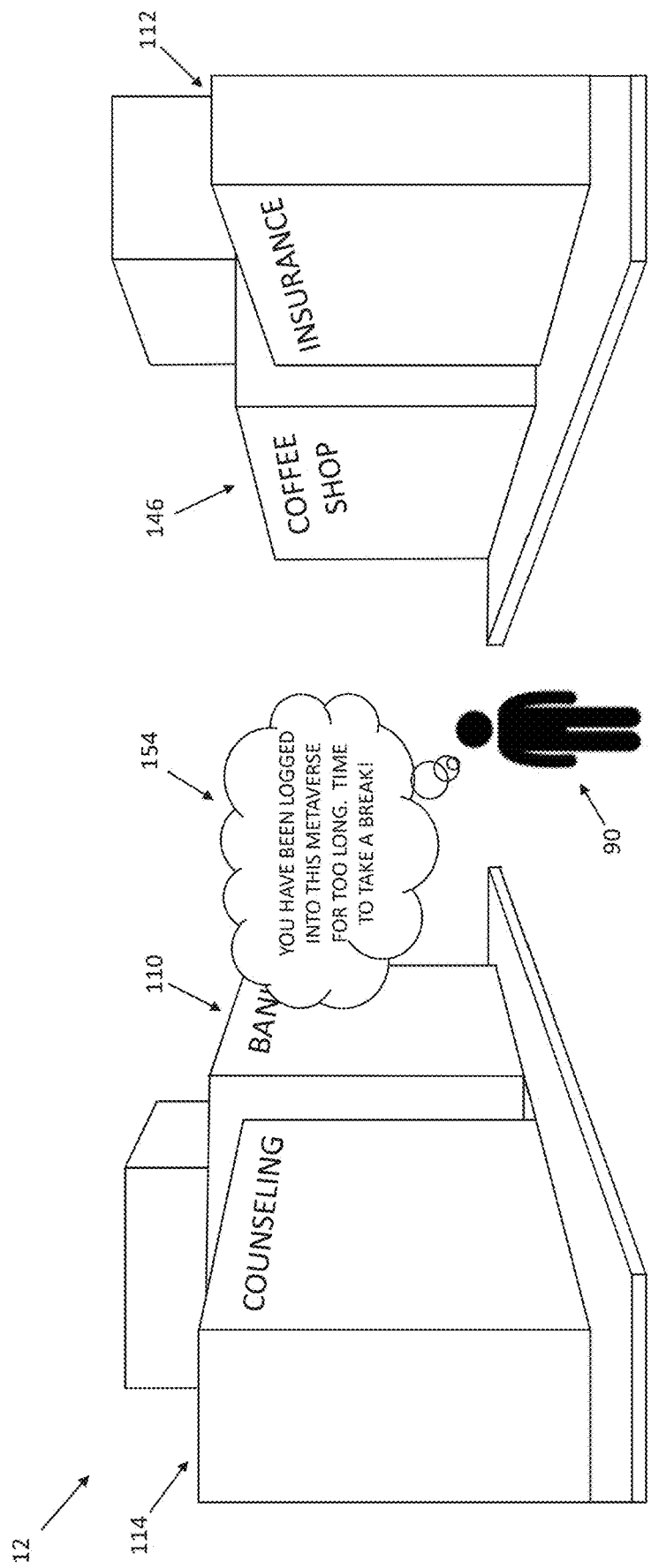
FIG. 30 illustrates a metaverse user being provided with additional virtual financial education in a metaverse, in accordance with embodiments described herein.
Figure 31:
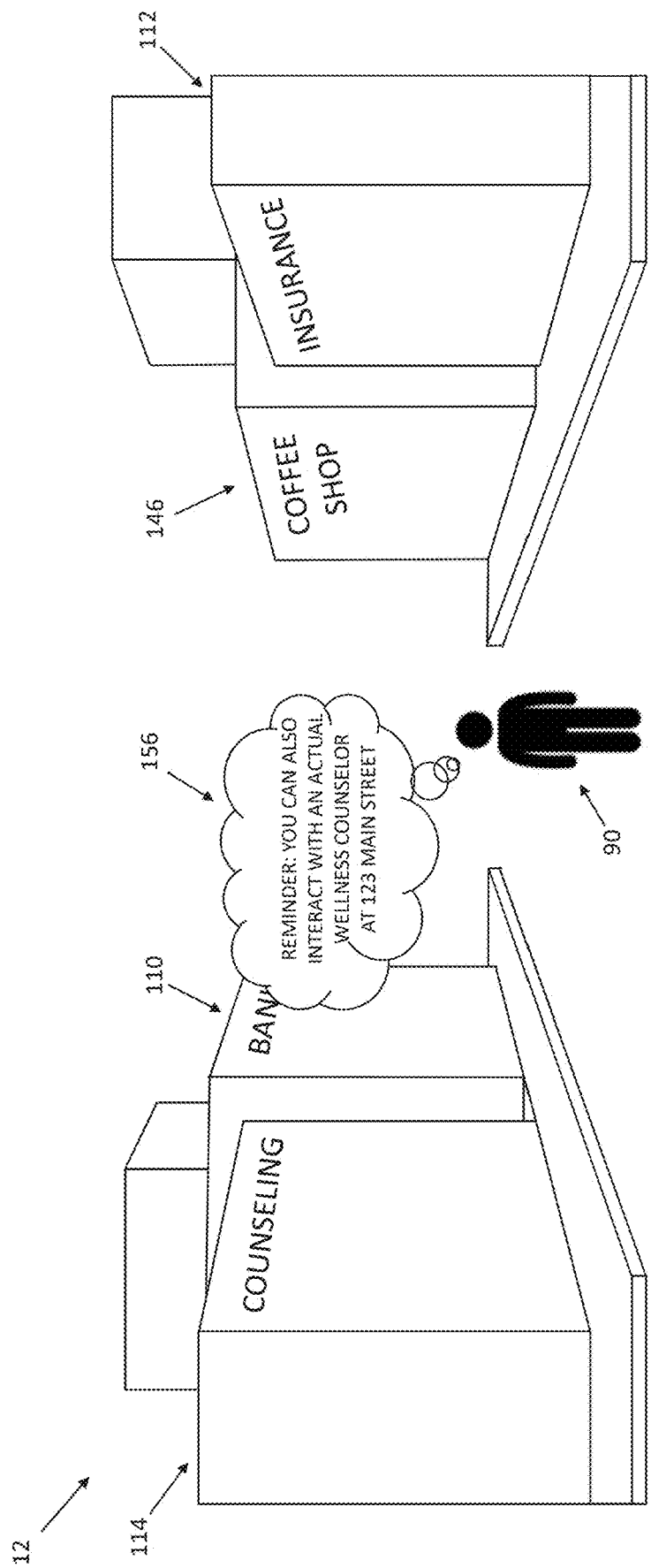
FIG. 31 illustrates a metaverse user being provided with additional virtual financial education in a metaverse, in accordance with embodiments described herein.

As illustrated in FIG. 30, another example of wellness education could be to provide reminders and warnings 154 to metaverse users 16 when it is determined that the metaverse users 16 have spent too much time in one or more metaverses 12 to make sure that the metaverse users 16 stay relatively healthy. For example, a metaverse user 16 may be prompted to take a break (e.g., to log off of a metaverse) and/or to spend time exercising after spending more than a certain number of hours of a certain time period. In addition, in certain embodiments, data from health tracking applications may also be used to determine whether a particular metaverse user 16 is getting enough exercise, and so forth, and could be used to incentivize the particular metaverse user 16 to exercise more often. In addition, as illustrated in FIG. 31, in certain embodiments, if it is determined that certain metaverse users 16 are not getting a lot of exercise, the metaverse users 16 may be provided with a prompt 156 to interact with real world corollaries of certain metaverse entities. Conversely, in certain embodiments, if it is determined that certain metaverse users 16 are getting plenty of exercise, they may be provided with insurance policy discounts, which would further incentivize them to keep exercising regularly to stay in shape. In certain embodiments, metaverse users 16 may be provided with visual indications of the effects of good/bad exercise habits.

In addition, in certain embodiments, insurance education may be provided to metaverse users 16. For example, certain education programs may be directed toward educating metaverse users 16 on best practices relating to insurance, including specific benefits of insurance and certain precautions to take. In certain embodiments, the insurance education may be interactive, for example, where metaverse users 16 interact with educational videos. In such a scenario, metaverse users 16 may ask questions and have them answered by other metaverse users 16 without having to leave their home or wait on hold on the phone.

In addition, in certain embodiments, metaverse users 16 may be educated relating to an insurance claim process. For example, in certain embodiments, a virtual representation of a metaverse user's real world house may be displayed in a metaverse 12, and the metaverse user 12 may be guided regarding the best way to protect certain items and belongings in the metaverse 12. In addition, in certain embodiments, a metaverse user 16 may be educated on the best ways to insure digital objects, such as non-fungible tokens (NFTs) in metaverses 12.

In addition, in certain embodiments, employment opportunities may be presented to metaverse users 16 as a specific type of virtual education (i.e., education of a job market). In certain embodiments, target demographics for users 16 in a metaverse 12 may be used to determine which employment opportunities to present to which metaverse users 16. In addition, certain initiatives may be implemented to aid certain demographics (e.g., veterans and other members of the military community) in finding employment opportunities. In certain embodiments, if a metaverse user 16 is interested in a particular employment opportunity, a virtual interview could be initiated within the metaverse.

In addition, in certain embodiments, the virtual education described herein may be supplemented with improvements in accessibility features for certain metaverse users 16. For example, in certain embodiments, for visually-challenged metaverse users 16, improvements in the quality of voiceovers and/or closed captioning may be implemented. In addition, in certain embodiments, eye movements in the real world of metaverse users 16 may be used to cause virtual movements of their associated avatars 90 in metaverses 12. In addition, in certain embodiments, voice recognition may be used to generate subtitles to be presented in one or more metaverses 12.

As described in greater detail herein, the embodiments described herein also generally relate to systems and methods for presenting insurance-related information to users 16 within metaverses 12. In certain embodiments, being presented with and/or personally presenting insurance-related information in metaverses may be used as a metric for performance of metaverse users 16 in metaverse games that are implemented in the metaverses 12. As such, each of the examples illustrated in FIGS. 32-35 and described in the associated paragraphs may serve as game-related interactions in metaverse games, as described in greater detail herein.

Figure 32:
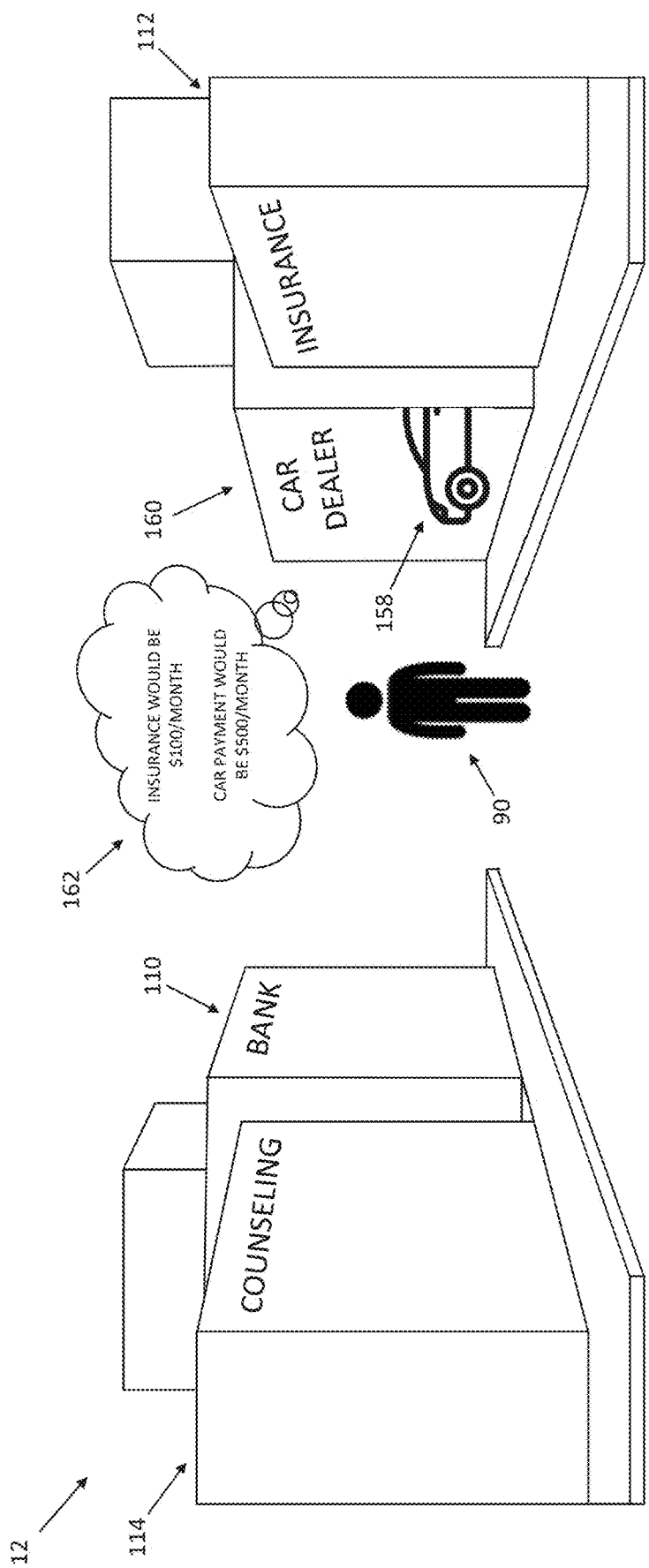
FIG. 32 illustrates a metaverse user being presented with virtual insurance-related data in a metaverse, in accordance with embodiments described herein.

As illustrated in FIG. 32, if a user 16 is browsing through a plurality of virtual vehicles 158 (e.g., that are representative of real-world vehicles) that are for sale via a virtual car dealership 160 in a metaverse 12, a virtual message 162 may be automatically presented to the user 16, which notifies the user 16 how much insurance would be for a particular virtual vehicle 158 that is currently being viewed by the user 16 via the virtual car dealership 160. As also illustrated in FIG. 32, in addition to a monthly insurance payment amount, in certain embodiments, a virtual message 162 may also advise the user 16 how much the monthly financial payment amount would be (e.g., to buy or lease the vehicle corresponding to the virtual vehicle 158). Although illustrated in FIG. 32 as being external to the virtual vehicle 158, in other embodiments, the virtual message 162 may instead be overlaid onto the virtual vehicle 158 currently being viewed by the user 16. In certain embodiments, the overlaid insurance and payment amounts may be automatically calculated by the metaverse user affiliation system 26 based on insurance history data and/or financial history data for the user 16 viewing the virtual vehicle 158. In addition, in certain embodiments, the overlaid insurance and payment amounts may be automatically calculated by the metaverse user affiliation system 26 based on data received from an original equipment manufacturer (OEM) that manufactures the actual corresponding to the virtual vehicle 158 or from the virtual car dealership 160.

Figure 33:
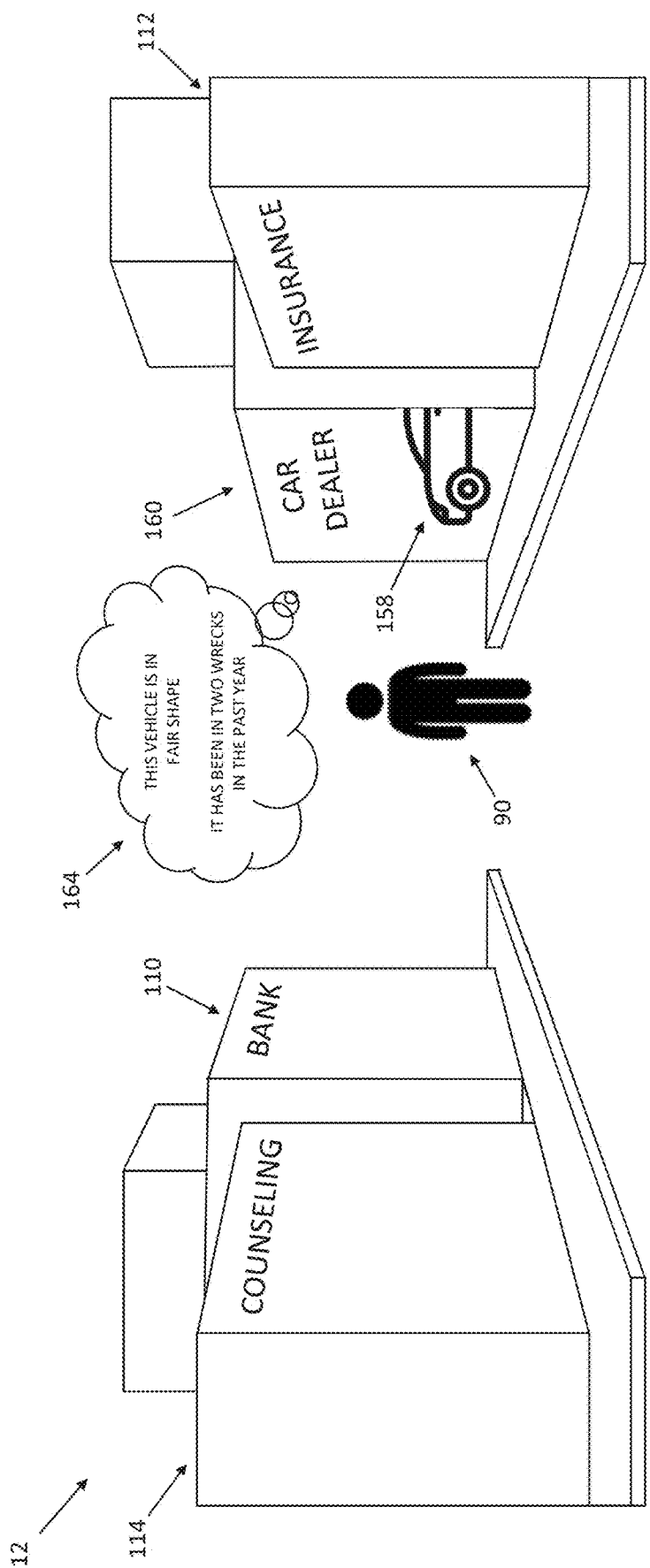
FIG. 33 illustrates a metaverse user being presented with additional virtual data in a metaverse, in accordance with embodiments described herein.
Figure 34:
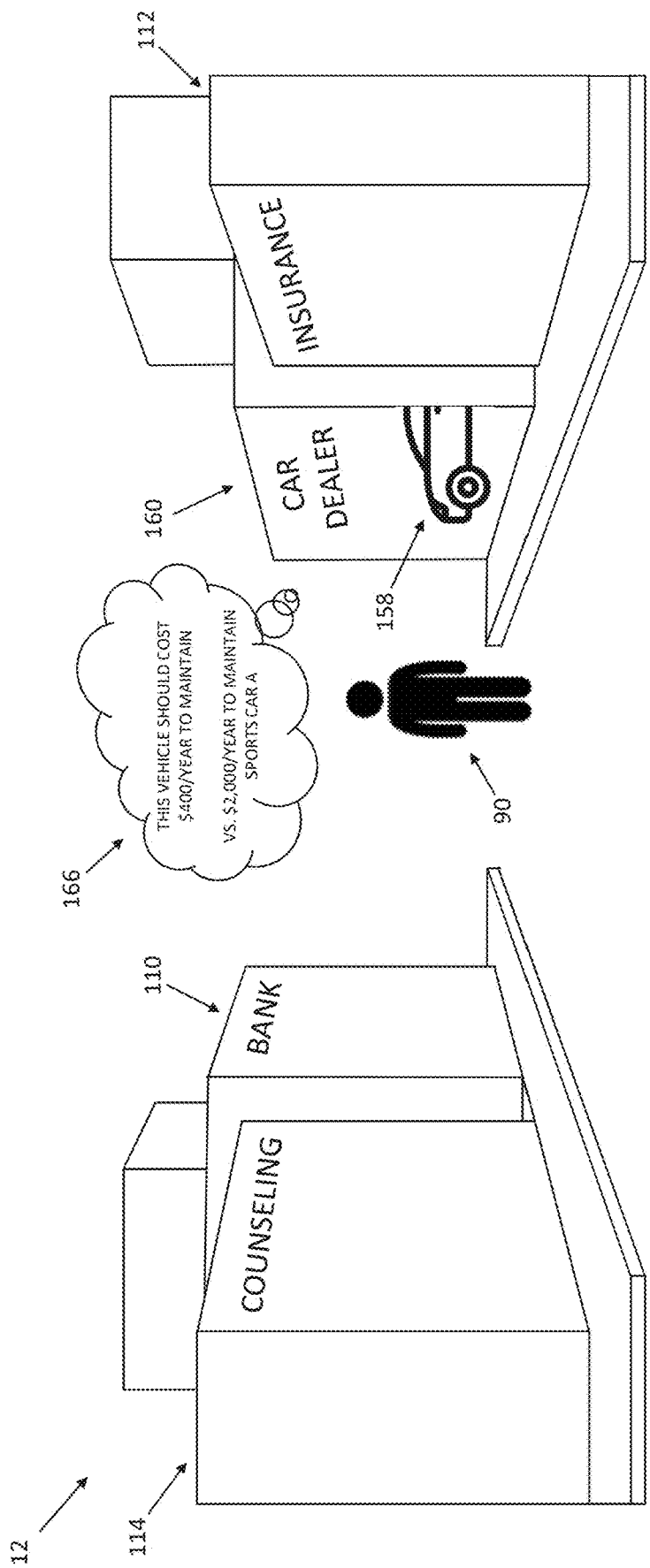
FIG. 34 illustrates a metaverse user being presented with additional virtual data in a metaverse, in accordance with embodiments described herein.
Figure 35:
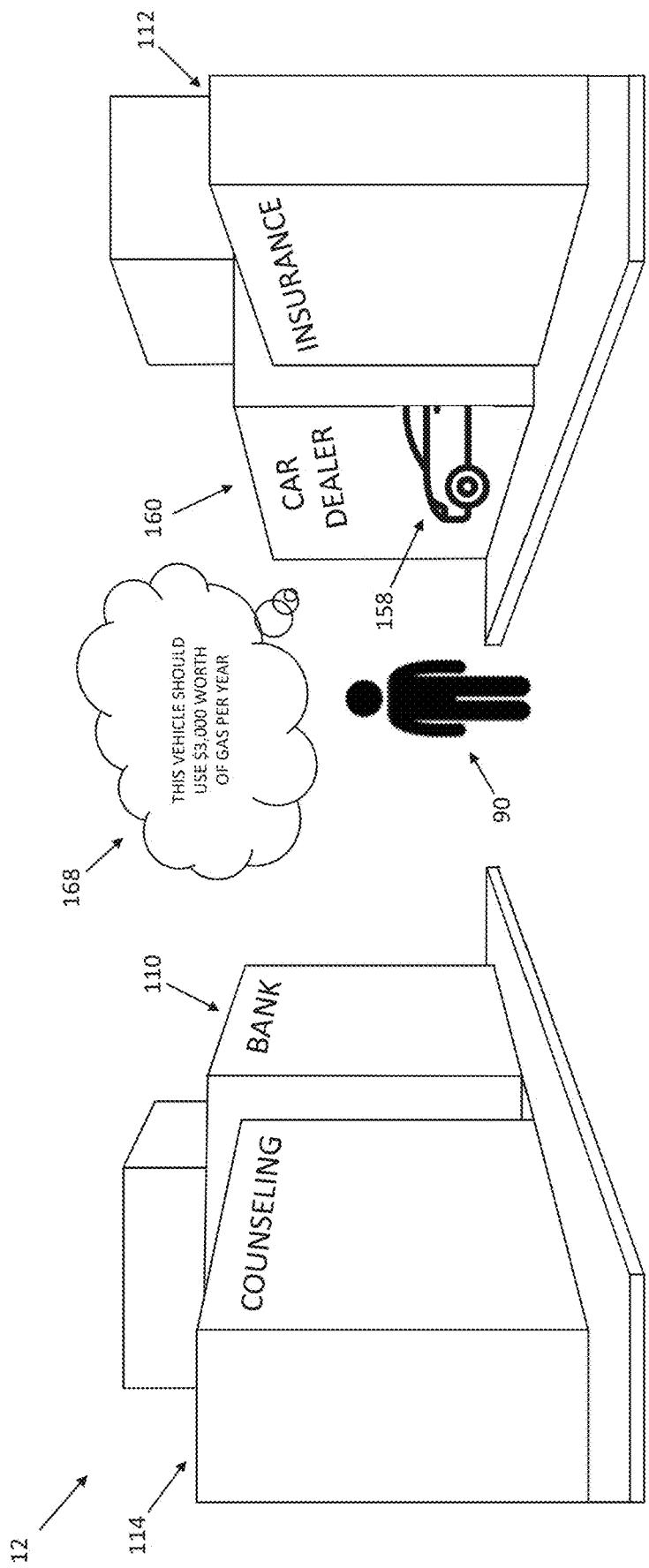
FIG. 35 illustrates a metaverse user being presented with additional virtual data in a metaverse, in accordance with embodiments described herein.

In addition, as illustrated in FIG. 33, in certain embodiments, a message 164 including real-time feedback regarding the condition and/or insurability of the virtual vehicle 158 may also be provided by the metaverse user affiliation system 26. For example, in certain embodiments, information from a vehicle history report may be presented for the virtual vehicle 158. In certain embodiments, for a new vehicle, not only insurance rates, but also the cost to maintain the vehicle may be presented to a user 16. For example, as illustrated in FIG. 34, a message 166 that a particular vehicle may cost approximately $400 per year to maintain, as opposed to a more expensive vehicle options that costs approximately $2.000 per year to maintain, may be presented. In addition, as illustrated in FIG. 35, in certain embodiments, a message 168 including estimated average annual fuel costs may be presented based, for example, on the state in which the user 16 lives, past history of fuel usage by the user 16, and tracking of common destinations for the user 16.

In certain embodiments, providing such insurance-related information to metaverse users 16 may become somewhat overwhelming. As such, in certain embodiments, the amount and/or frequency of such insurance-related information may be limited, for example, based on settings that are selected by the respective metaverse users 16 and/or guardians of the respective metaverse users 16. In addition, in certain embodiments, the insurance-related information that is provided to a metaverse user 16 may be tailored (e.g., customized) based on personal attributes of the metaverse user 16 and/or affiliations of the metaverse user 16, as described in greater detail herein.

In addition, in certain embodiments, a metaverse 12 may be used to present information regarding other types of insurance products, such as motorcycle insurance, pet insurance, or insurance on any type of personal property. Furthermore, in certain embodiments, information relating to how insurance rates may change by bundling various different types of insurance may be presented. In addition, in certain embodiments, a metaverse 12 may be used to present/share information to a metaverse user 16 when they have certain insurance claims. For example, virtual information relating to a particular claim may be presented to the metaverse user 16 in a way that was not possible before. As such, a metaverse 12 may facilitate the interaction of information to process insurance claims in a timelier manner (e.g., digital claim filing, utilizing conversational artificial intelligence, and so forth). In addition, in certain embodiments, claims adjusters may be contacted in the metaverse 12, further facilitating the processing of insurance claims.

In addition, certain embodiments, the insurance-related information presented to metaverse users 16 may be based at least in part on affiliation information 24 of the metaverse users 16, as described in greater detail herein. For example, in certain affiliations may grant particular insurance-related benefits for the metaverse users 16. As but one non-limiting example, certain insurance companies may provide lower insurance rates to metaverse users 16 that are affiliated with certain groups.

As described above, each of the metaverse functionalities described herein may be used as metrics for determining performance of metaverse users 16 in metaverses 12. In addition, any combinations of the metaverse functionalities described herein may be implemented in conjunction with each for certain metaverse games. For example, as but one non-limiting example, if a metaverse user 16 receives virtual education relating to financial investing, personal saving, and so forth, and then interacts with metaverse services relating to similar functions, a particular metaverse game may award the metaverse user 16 with more points than if the metaverse user 16 only received the virtual education relating to financial investing, personal saving, and so forth. In other words, in certain embodiments, certain metaverse games may award metaverse users 16 with more points for interacting with multiple metaverse functionalities described herein than if they interacted with only one metaverse functionality described herein. In such embodiments, points for interacting with the multiple metaverse functionalities described herein may be added together for a particular metaverse game, may be multiplied together for a particular metaverse game, and so forth.

Figure 36:
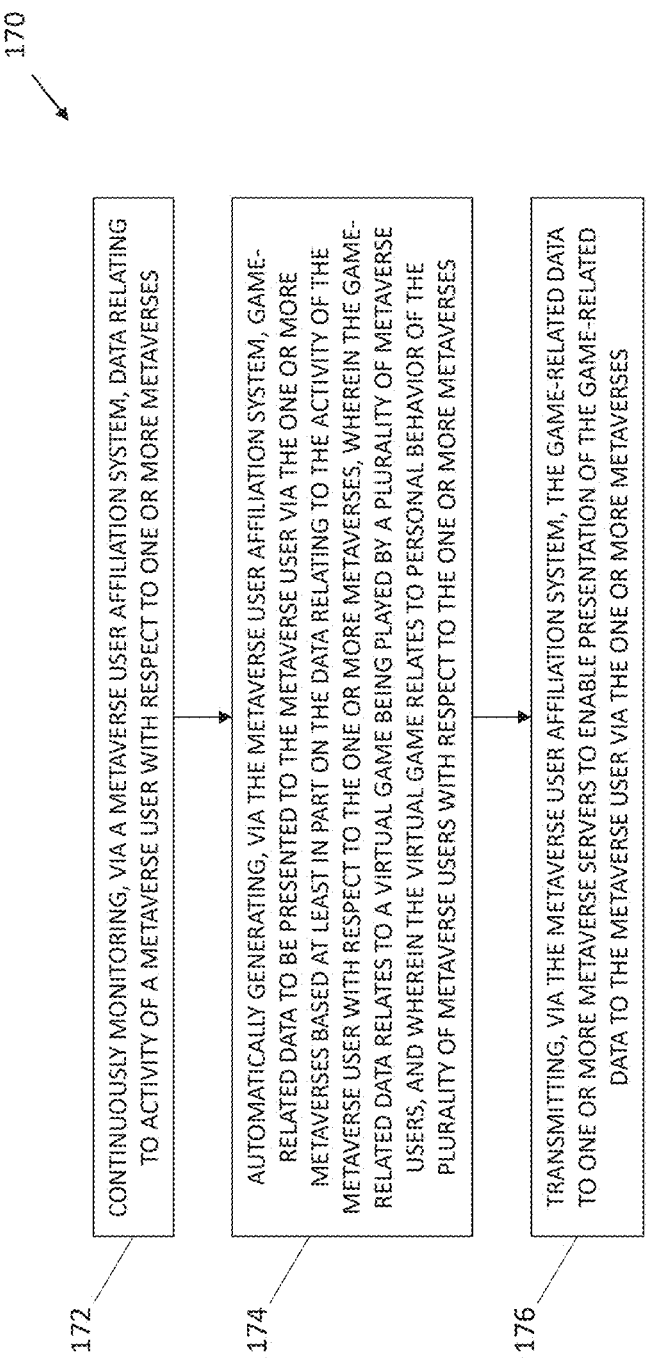
FIG. 36 is a flow diagram of a method for incentivizing interaction with metaverse functionalities in a gamified manner, in accordance with embodiments described herein.

FIG. 36 is a flow diagram of a method 170 for incentivizing interaction with metaverse functionalities in a gamified manner, as described in greater detail herein. In certain embodiments, the method 170 may include continuously monitoring, via a metaverse user affiliation system 26, data relating to activity 22 of a metaverse user 16 with respect to one or more metaverses 12 (block 172). In addition, in certain embodiments, the method 170 may include automatically generating, via the metaverse user affiliation system 26, game-related data to be presented to the metaverse user 16 via the one or more metaverses 12 based at least in part on the data relating to the activity 22 of the metaverse user 16 with respect to the one or more metaverses 12 (block 174). In certain embodiments, the game-related data may relate to a virtual game being played by a plurality of metaverse users 16. In addition, in certain embodiments, the virtual game may relate to personal behavior of the plurality of metaverse users 16 with respect to the one or more metaverses 12. In addition, in certain embodiments, the method 170 may include transmitting, via the metaverse user affiliation system 26, the game-related data to one or more metaverse servers 14 to enable presentation of the game-related data to the metaverse user 16 via the one or more metaverses 12 (block 176).

In addition, in certain embodiments, the method 170 may include determining, via the metaverse user affiliation system 26, one or more user affiliations of the metaverse user 16 based at least in part on the data relating to the activity 22 of the metaverse user 16. In addition, in certain embodiments, the method 170 may include automatically generating, via the metaverse user affiliation system 26, the game-related data to be presented to the metaverse user 16 via the one or more metaverses 12 based at least in part on the one or more user affiliations of the metaverse user 16.

In certain embodiments, the personal behavior of the plurality of metaverse users 16 may include investment performance of the plurality of metaverse users 16. In addition, in certain embodiments, the personal behavior of the plurality of metaverse users 16 may include personal savings of the plurality of metaverse users 16. In addition, in certain embodiments, the personal behavior of the plurality of metaverse users 16 may include performance of artificial intelligence (AI) avatars 130 deployed in the one or more metaverses 12 by the plurality of metaverse users 16.

In addition, in certain embodiments, the personal behavior of the plurality of metaverse users 16 may include receipt or provision of virtual education by the plurality of metaverse users 16. In addition, in certain embodiments, the virtual education may include financial education. In addition, in certain embodiments, the virtual education may include insurance education. In addition, in certain embodiments, the virtual education may include education relating to virtual employment opportunities. In addition, in certain embodiments, the virtual education may include personal wellness education. In addition, in certain embodiments, the personal behavior of the plurality of metaverse users 16 may include interaction with one or more polls in the one or more metaverses 12 by the plurality of metaverse users 16.

Figure 37:
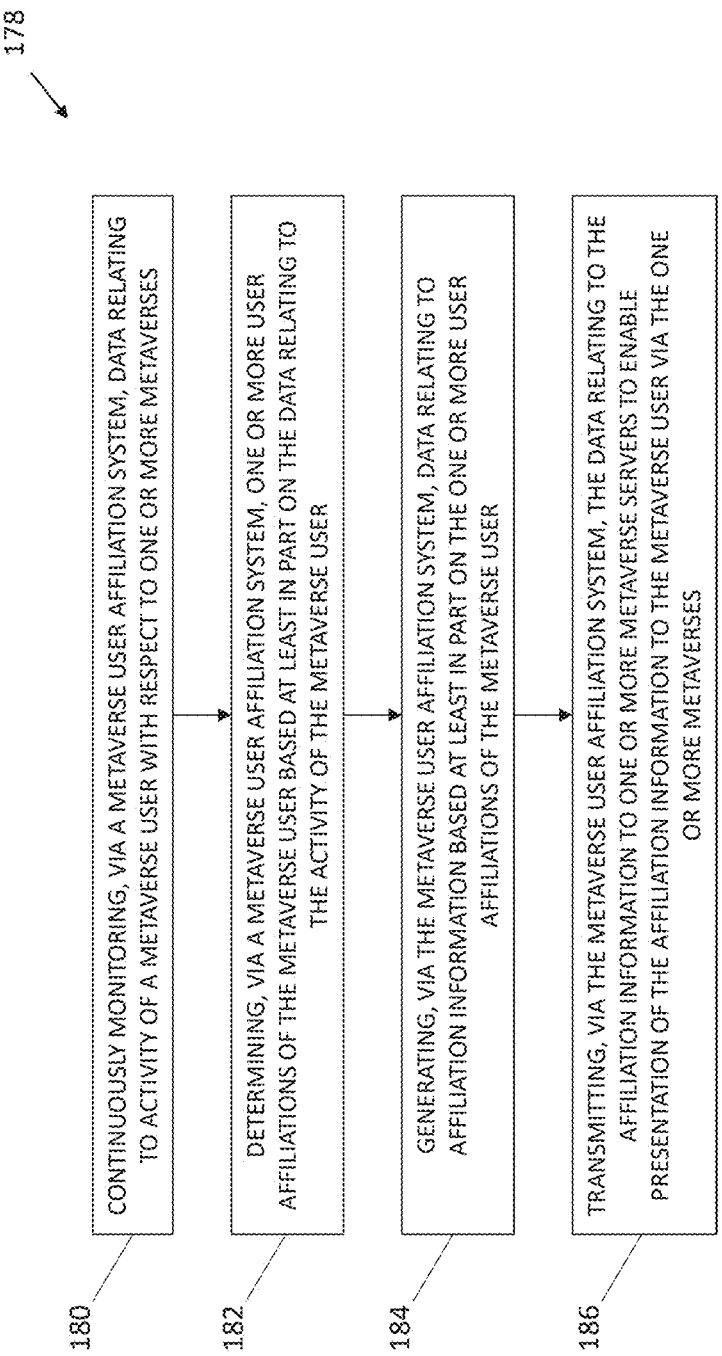
FIG. 37 is a flow diagram of a method for using a metaverse user affiliation system, in accordance with embodiments described herein.

FIG. 37 is a flow diagram of a method 178 for using the metaverse user affiliation system 26 described herein. In certain embodiments, the method 178 may include continuously monitoring, via the metaverse user affiliation system 26, data relating to activity 22 of a metaverse user 16 with respect to one or more metaverses 12 (block 180). In addition, in certain embodiments, the method 178 may include determining, via a metaverse user affiliation system 26, one or more user affiliations of the metaverse user 16 based at least in part on the data relating to the activity 22 of the metaverse user 16 (block 182). In addition, in certain embodiments, the method 178 may include generating, via the metaverse user affiliation system 26, data relating to affiliation information 24 based at least in part on the one or more user affiliations of the metaverse user 16 (block 184). In addition, in certain embodiments, the method 178 may include transmitting, via the metaverse user affiliation system 26, the data relating to the affiliation information 24 to one or more metaverse servers 14 to enable presentation of the affiliation information 24 to the metaverse user 16 via the one or more metaverses 12 (block 186).

As described in greater detail herein, the relating to the affiliation information 24 to one or more metaverse servers 14 to enable presentation of the affiliation information 24 to the metaverse user 16 via the one or more metaverses 12 may include presenting information (e.g., scoring, ranking, and so forth) of the metaverse user 16 and other metaverse users 16 that share affiliations (e.g., collectively as a team) when they are all participating in a particular metaverse game. In addition, in certain embodiments, the data relating to the activity 22 of the metaverse user 16 includes data relating to interactions of the metaverse user 16 with the one or more metaverses 12. In addition, in certain embodiments, the data relating to the activity 22 of the metaverse user 16 includes data manually entered by the metaverse user 16 via one or more computing devices 20.

In certain embodiments, the affiliation information 24 includes one or more visual representations indicative of the one or more user affiliations of the metaverse user 16 to be associated with one or more avatars 90 of one or more other metaverse users 16 presented to the metaverse user 16 via the one or more metaverses 12. The one or more other metaverse users 16 share at least one user affiliation of the one or more user affiliations with the metaverse user 16. In certain embodiments, the method 178 may include generating, via the metaverse user affiliation system 26, the data relating to the affiliation information 24 based at least in part on one or more privacy levels 92 manually entered by the one or more other metaverse users 16 via one or more computing devices 20.

In certain embodiments, the affiliation information 24 includes a virtual indication 102 that an area of the one or more metaverses 12 is frequently visited by one or more other metaverse users 16 that share at least one user affiliation of the one or more user affiliations with the metaverse user 16. In addition, in certain embodiments, the affiliation information 24 includes a virtual alert 104 that one or more other metaverse users 16 that share at least one user affiliation of the one or more user affiliations with the metaverse user 16 are currently in relative proximity to the metaverse user 16 in a metaverse 12 of the one or more metaverses 12. In addition, in certain embodiments, the affiliation information 24 includes a virtual indication that one or more other metaverse users 16 comprise a group 106 of metaverse users 16 that are associated with a particular organization of interest to the metaverse user 16. In addition, in certain embodiments, the affiliation information 24 includes a virtual complex 108 of virtual buildings 110, 112, 114, 116 that are associated with a particular organization of interest to the metaverse user 16. A combination of the virtual buildings 110, 112, 114, 116 changes over time based at least in part on the one or more user affiliations of the metaverse user 16.

In addition, in certain embodiments, the method 178 may include storing, via the metaverse user affiliation system 26, the data relating to the activity 22 of the metaverse user 16 and/or the data relating to the affiliation information 24 in a distributed ledger (e.g., a blockchain network) 54.

The embodiments described herein include the automatic analysis of activity of metaverse users 16 in metaverses 12 to facilitate the automatic creation of content (e.g., game-related content) to be presented to the metaverse users 16, for example, based on analysis of previous activity of other metaverse users 16 in the metaverses 12 that, for example, share common characteristics (e.g., affiliations) between them. For example, in certain embodiments, the metaverse user affiliation system 26 may include machine learning and/or other artificial intelligence algorithms that enable the metaverse user affiliation system 26 to be trained based on data relating to previous activity of other metaverse users 16 in metaverses 12 that, for example, share common characteristics (e.g., affiliations) with current metaverse users 16 for the purpose of automatically updating the type of metaverse content that is presented to the current metaverse users 16. As such, the metaverse user affiliation system 26 may be configured to continuously learn from the previous activity to know what types of metaverse content is likely to be more enjoyable and/or relevant to particular metaverse users 16. In this manner, the metaverse user affiliation system 26 may be trained to provide a better overall experience for future metaverse users 16 in the metaverses 12.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. It should be appreciated that any of the features and embodiments described herein may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

The invention claimed is:

1. A method, comprising:
continuously monitoring, via a metaverse user affiliation system, data relating to activity of a metaverse user with respect to one or more metaverses;
automatically generating, via the metaverse user affiliation system, game-related data to be presented to the metaverse user via the one or more metaverses based at least in part on the data relating to the activity of the metaverse user with respect to the one or more metaverses, wherein the game-related data relates to a virtual game being played by a plurality of metaverse users, wherein the virtual game relates to personal behavior of the plurality of metaverse users with respect to the one or more metaverses, wherein the personal behavior of the plurality of metaverse users comprises receipt or provision of virtual education by the plurality of metaverse users, and wherein the virtual education comprises insurance education;
utilizing, via the metaverse user affiliation system, a data conversion protocol to convert the game-related data into a metaverse data format specific to the one or more metaverses; and
transmitting, via the metaverse user affiliation system, the game-related data to one or more metaverse servers to enable presentation of the game-related data to the metaverse user via the one or more metaverses in response to the metaverse user approaching a particular virtual building of a virtual complex of virtual buildings presented in the one or more metaverses, wherein the particular virtual building is directly associated with the virtual game.

2. The method of claim 1, comprising:
determining, via the metaverse user affiliation system, one or more user affiliations of the metaverse user based at least in part on the data relating to the activity of the metaverse user; and
automatically generating, via the metaverse user affiliation system, the game-related data to be presented to the metaverse user via the one or more metaverses based at least in part on the one or more user affiliations of the metaverse user.

3. The method of claim 1, wherein the personal behavior of the plurality of metaverse users comprises investment performance of the plurality of metaverse users.

4. The method of claim 1, wherein the personal behavior of the plurality of metaverse users comprises personal savings of the plurality of metaverse users.

5. The method of claim 1, wherein the personal behavior of the plurality of metaverse users comprises performance of artificial intelligence (AI) avatars deployed in the one or more metaverses by the plurality of metaverse users.

6. The method of claim 1, wherein the virtual education comprises financial education.

7. The method of claim 1, wherein the virtual education comprises education relating to virtual employment opportunities.

8. The method of claim 1, wherein the virtual education comprises personal wellness education.

9. The method of claim 1, wherein the personal behavior of the plurality of metaverse users comprises interaction with one or more polls in the one or more metaverses by the plurality of metaverse users.

10. A metaverse user affiliation system, comprising:
one or more processors configured to execute instructions stored in memory, wherein the instructions, when executed by the one or more processors, are configured to cause the metaverse user affiliation system to:
continuously monitor data relating to activity of a metaverse user with respect to one or more metaverses;
automatically generate game-related data to be presented to the metaverse user via the one or more metaverses based at least in part on the data relating to the activity of the metaverse user with respect to the one or more metaverses, wherein the game-related data relates to a virtual game being played by a plurality of metaverse users, wherein the virtual game relates to personal behavior of the plurality of metaverse users with respect to the one or more metaverses, wherein the personal behavior of the plurality of metaverse users comprises receipt or provision of virtual education by the plurality of metaverse users, and wherein the virtual education comprises insurance education;
utilize a data conversion protocol to convert the game-related data into a metaverse data format specific to the one or more metaverses; and
transmit the game-related data to one or more metaverse servers to enable presentation of the game-related data to the metaverse user via the one or more metaverses in response to the metaverse user approaching a particular virtual building of a virtual complex of virtual buildings presented in the one or more metaverses, wherein the particular virtual building is directly associated with the virtual game.

11. The metaverse user affiliation system of claim 10, wherein the instructions, when executed by the one or more processors, are configured to cause the metaverse user affiliation system to:
   determine one or more user affiliations of the metaverse user based at least in part on the data relating to the activity of the metaverse user; and
   automatically generate the game-related data to be presented to the metaverse user via the one or more metaverses based at least in part on the one or more user affiliations of the metaverse user.

12. The metaverse user affiliation system of claim 10, wherein the personal behavior of the plurality of metaverse users comprises investment performance of the plurality of metaverse users.

13. The metaverse user affiliation system of claim 10, wherein the personal behavior of the plurality of metaverse users comprises personal savings of the plurality of metaverse users.

14. The metaverse user affiliation system of claim 10, wherein the personal behavior of the plurality of metaverse users comprises performance of artificial intelligence (AI) avatars deployed in the one or more metaverses by the plurality of metaverse users.

15. The metaverse user affiliation system of claim 10, wherein the virtual education comprises financial education education relating to virtual employment opportunities, or personal wellness education.

16. The metaverse user affiliation system of claim 10, wherein the personal behavior of the plurality of metaverse users comprises interaction with one or more polls in the one or more metaverses by the plurality of metaverse users.

17. A metaverse generation system, comprising:
a metaverse user affiliation system configured to:
   continuously monitor data relating to activity of a metaverse user with respect to one or more metaverses;
   automatically generate game-related data to be presented to the metaverse user via the one or more metaverses based at least in part on the data relating to the activity of the metaverse user with respect to the one or more metaverses;
   utilize a data conversion protocol to convert the game-related data into a metaverse data format specific to the one or more metaverses; and
   transmit the game-related data to one or more metaverse servers to enable presentation of the game-related data to the metaverse user via the one or more metaverses, wherein the game-related data relates to a virtual game being played by a plurality of metaverse users, and wherein the virtual game relates to personal behavior of the plurality of metaverse users with respect to the one or more metaverses, wherein the personal behavior of the plurality of metaverse users comprises receipt or provision of virtual education by the plurality of metaverse users, and wherein the virtual education comprises insurance education; and
one or more metaverse servers configured to:
   receive the game-related data; and
   present the game-related data to the metaverse user via the one or more metaverses in response to the metaverse user approaching a particular virtual building of a virtual complex of virtual buildings presented in the one or more metaverses, wherein the particular virtual building is directly associated with the virtual game.

* * * * *